US012645426B2

(12) United States Patent
Gope et al.

(10) Patent No.: US 12,645,426 B2
(45) Date of Patent: Jun. 2, 2026

(54) SYSTEM AND METHOD FOR ACCELERATING NEURAL NETWORKS

(71) Applicant: Arm Limited, Cambridge (GB)

(72) Inventors: Dibakar Gope, Austin, TX (US); Jesse Garrett Beu, Austin, TX (US); Milos Milosavljevic, Austin, TX (US)

(73) Assignee: Arm Limited, Cambridge (GB)

( * ) Notice: Subject to any disclaimer, the term of this patent is extended or adjusted under 35 U.S.C. 154(b) by 1136 days.

(21) Appl. No.: 17/554,024

(22) Filed: Dec. 17, 2021

(65) Prior Publication Data

US 2023/0195419 A1 Jun. 22, 2023

(51) Int. Cl.
G06F 7/544 (2006.01)
G06N 3/04 (2023.01)
(52) U.S. Cl.
CPC ............. *G06F 7/5443* (2013.01); *G06N 3/04* (2013.01); *G06F 2207/4824* (2013.01)
(58) Field of Classification Search
CPC .......... G06F 7/5443; G06F 2207/4824; G06F 7/462; G06N 3/04; G06N 3/045; G06N 3/048; G06N 3/063; G06N 3/02; G06N 3/0464; G06N 3/042
See application file for complete search history.

(56) References Cited

U.S. PATENT DOCUMENTS

| | | | |
|---|---|---|---|
| 7,366,873 B1 * | 4/2008 | Kohn | G06F 9/30038 |
| | | | 714/824 |
| 9,411,592 B2 * | 8/2016 | Valentine | G06F 9/30032 |

| | | | |
|---|---|---|---|
| 2017/0351948 A1 * | 12/2017 | Lee | G06N 3/084 |
| 2018/0046916 A1 * | 2/2018 | Dally | G06N 3/063 |
| 2023/0076138 A1 * | 3/2023 | Whatmough | G06N 3/063 |

OTHER PUBLICATIONS

Louizos et al., "Relaxed Quantization for Discretized Neural Networks," ICLR 2019, arXiv:1810.01875v1, Oct. 3, 2018.
Yang et al., "Quantization Networks," Proceedings of the IEEE/CVF Conference on Computer Vision and Pattern Recognition (CVPR), arXiv:1911.09464v2, Nov. 28, 2019, pp. 7308-7316.
Gong et al., "Differentiable Soft Quantization: Bridging Full-Precision and Low-Bit Neural Networks," ICCV 2019, arXiv:1908.05033v1, Aug. 14, 2019.
Jung et al., "Learning to Quantize Deep Networks by Optimizing Quantization Intervals with Task Loss," CVPR 2019, arXiv:1808.05779v3, Nov. 23, 2018.
Tschannen et al., "StrassenNets: Deep learning with a multiplication budget," ICML 2018, arXiv:171203942v3, Jun. 8, 2018.

* cited by examiner

*Primary Examiner* — James Trujillo
*Assistant Examiner* — Jakob Oscar Gudas
(74) *Attorney, Agent, or Firm* — Leveque Intellectual Property Law, P.C.

(57) ABSTRACT

A neural network system, method and apparatus are provided. A truth table matrix, an index vector and an input data tensor are read from a memory. At least a portion of the input data tensor is flattened into an input data vector. A scatter accumulate instruction is executed on the index vector and the input data vector to generate an intermediate vector. The truth table matrix and the intermediate vector are then multiplied to generate an output data vector.

16 Claims, 28 Drawing Sheets

Adder (Add)

Conditional Adder (CAdd)

Accumulator (Acc)

810 — Read Truth Table Matrix and Index Vector from Memory

820 — Read Input Data Tensor from Memory

830 — Flatten Input Data Tensor

840 — Execute Scatter Accumulate Instruction to Generate Intermediate Vector

850 — Multiply Truth Table Matrix and Intermediate Vector to Generate Output Data Vector

SYSTEM AND METHOD FOR ACCELERATING NEURAL NETWORKS

BACKGROUND

The present disclosure relates to computer systems. More particularly, the present disclosure relates to neural networks (NNs).

Artificial neural networks (ANNs), such as deep neural networks (DNNs), convolutional neural networks (CNNs), etc., are a popular solution to a wide array of challenging classification, recognition and regression problems. However, many ANN models require a large number of calculations involving a large number of weights and activations, which presents a significant challenge with respect to access, storage and performance, particularly for mobile and other power or storage-constrained devices. An ANN hardware accelerator accelerates these calculations, such as, for example, convolution operations performed by CNNs.

Typically, native convolution operations are not performed by a CNN due to the complicated dataflow and expensive datapaths that are usually required. Instead, native convolution operations are converted into generic matrix multiplication (GEMM) operations, and then the GEMM operations are executed more efficiently using optimized software libraries for a processor, such as a central processing unit (CPU), etc., specialized hardware, such as, for example, an ANN hardware accelerator, etc.

Quantizing ANN model parameters to numerical precisions of less than one byte (i.e., values less than 8 bits or sub-byte values) reduces the storage requirements of the ANN model while sacrificing accuracy when compared to the full-precision ANN model. Unfortunately, the execution of matrix multiplication kernels involving sub-byte weights and byte activations (or larger) on existing hardware ANN accelerators and CPUs is extremely inefficient.

DETAILED DESCRIPTION

Figure 1:
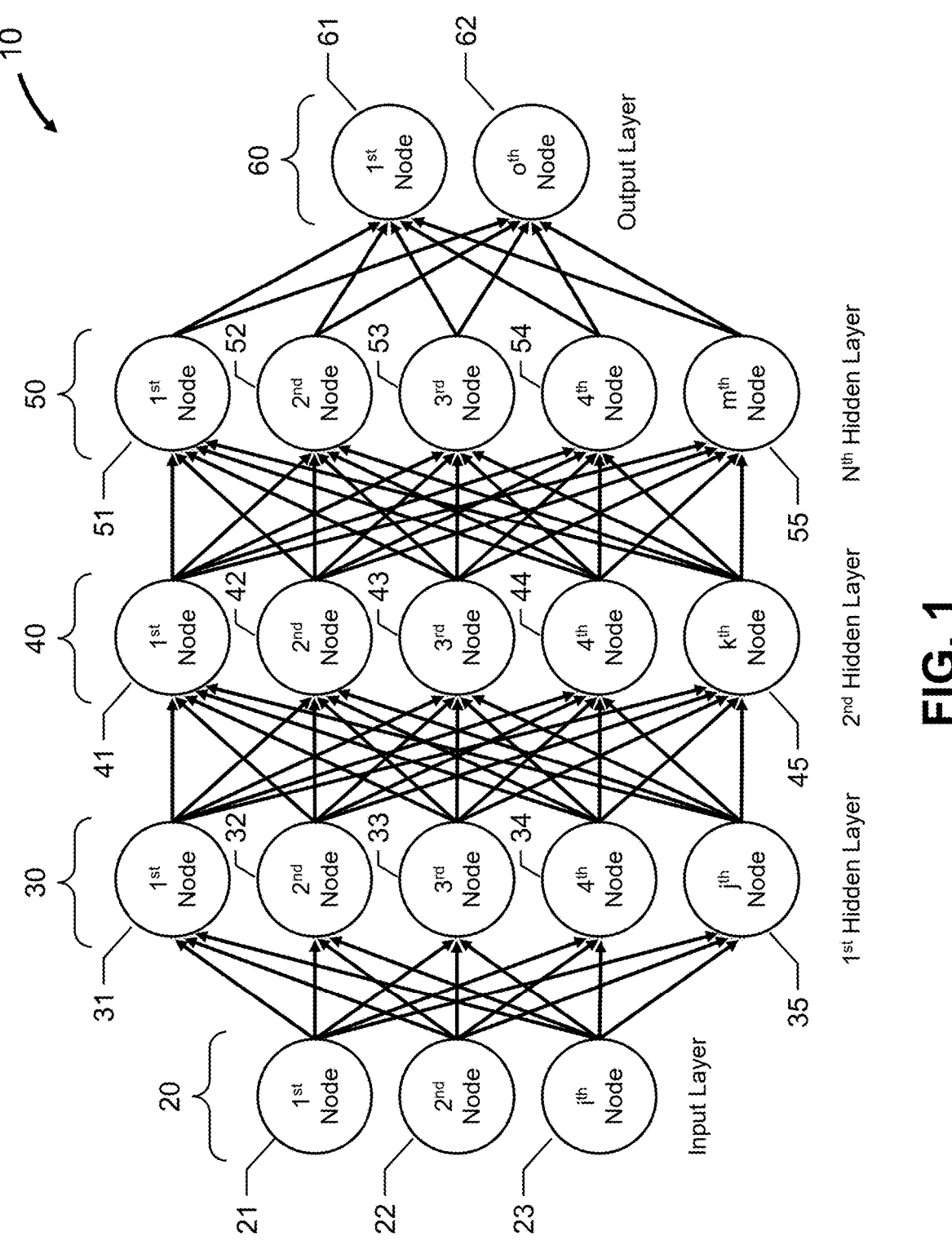
FIG. 1 depicts an ANN, in accordance with embodiments of the present disclosure.

Embodiments of the present disclosure will now be described with reference to the drawing figures, in which like reference numerals refer to like parts throughout.

Embodiments of the present disclosure advantageously provide an ultra-efficient technique for computing an aggressively quantized neural network layer for memory-constrained inference on the edge which provides the benefit of high throughput without requiring excessive ($N^2$) hardware cost for an N-wide SIMD scatter accumulate operation, and a parsimonious memoization technique that avoids redundant compute, increased memory overhead of naïve memoization. This matrix decomposition/restructuring method exploits memoization without enumerating and storing common subexpression outputs for all combinations of input weight matrix values.

More particularly, embodiments of the present disclosure advantageously provide a matrix decomposition/restructuring method that leverages a scatter accumulate operation to provide a large operation count reduction (e.g., six times or more) as compared to an equivalent matrix-multiply kernel. In many embodiments, a processor may perform the scatter accumulate operation using a novel single instruction multiple data (SIMD) scatter accumulate instruction. Generally, the processor includes an instruction decoder to control, inter alia, processing circuitry that performs the scatter accumulate instruction, as well as several registers to store data. The processor may be a CPU or a specialized processor, such as, for example, a graphics processing unit (GPU) processor, an ANN accelerator processor, a core of a multicore processor, etc. In other embodiments, an ANN accelerator crossbar array may perform the scatter accumulate operation.

In one embodiment, a system includes a processor configured to read, from a memory, a truth table matrix and an index vector; read, from the memory, an input data tensor; flatten at least a portion of the input data tensor into an input data vector; execute a scatter accumulate instruction on the index vector and the input data vector to generate an intermediate vector; and multiply the truth table matrix and the intermediate vector to generate an output data vector. The truth table matrix and the index vector are generated based on a flattened weight matrix formed from a weight tensor having a weight matrix for each input channel, and each weight tensor forms one row of the flattened weight matrix. The input data tensor has an input data matrix for each input channel.

An ANN models the relationships between input data or signals and output data or signals using a network of interconnected nodes that is trained through a learning process. The nodes are arranged into various layers, including, for example, an input layer, one or more hidden layers, and an output layer. The input layer receives input data, such as, for example, image data, and the output layer generates output data, such as, for example, a probability that the image data contains a known object. Each hidden layer provides at least a partial transformation of the data that are input to the hidden layer to produce the data that are output by the hidden layer. A DNN has multiple hidden layers in order to model complex, nonlinear relationships between input data and output data.

In a fully-connected, feedforward ANN, each node is connected to all of the nodes in the preceding layer, as well as to all of the nodes in the subsequent layer. For example, each input layer node is connected to each hidden layer node, each hidden layer node is connected to each input layer node and each output layer node, and each output layer node is connected to each hidden layer node. Additional hidden layers are similarly interconnected. Each connection has a weight value, and each node has an activation function, such as, for example, a linear function, a step function, a sigmoid function, a tanh function, a rectified linear unit (ReLU) function, etc., that determines the output of the node based on the weighted sum of the inputs to the node. The input data propagates from the input layer nodes, through respective connection weights to the hidden layer nodes, and then through respective connection weights to the output layer nodes.

More particularly, at each input node, input data is provided to the activation function for that node, and the output of the activation function is then provided as an input data value to each hidden layer node. At each hidden layer node, the input data value received from each input layer node is multiplied by a respective connection weight, and the resulting products are summed or accumulated into an activation value that is provided to the activation function for that node. The output of the activation function is then provided as an input data value to each output layer node. At each output layer node, the output data value received from each hidden layer node is multiplied by a respective connection weight, and the resulting products are summed or accumulated into an activation value that is provided to the activation function for that node. The output of the activation function is then provided as output data. Additional hidden layers may be similarly configured to process data.

FIG. 1 depicts ANN 10, in accordance with an embodiment of the present disclosure.

ANN 10 includes input layer 20, one or more hidden layers 30, 40, 50, etc., and output layer 60. Input layer 20 includes one or more input nodes 21, 22, 23, etc. Hidden layer 30 includes one or more hidden nodes 31, 32, 33, 34, 35, etc. Hidden layer 40 includes one or more hidden nodes 41, 42, 43, 44, 45, etc. Hidden layer 50 includes one or more hidden nodes 51, 52, 53, 54, 55, etc. Output layer 60 includes one or more output nodes 61, 62, etc. Generally, ANN 10 includes N hidden layers, input layer 20 includes "i" nodes, hidden layer 30 includes "j" nodes, hidden layer 40 includes "k" nodes, hidden layer 50 includes "m" nodes, and output layer 60 includes "o" nodes.

In one embodiment, N equals 3, i equals 3, j, k and m equal 5 and o equals 2. Input node 21 is coupled to hidden nodes 31 to 35, input node 22 is coupled to hidden nodes 31 to 35, and input node 23 is coupled to hidden nodes 31 to 35. Hidden node 31 is coupled to hidden nodes 41 to 45, hidden node 32 is coupled to hidden nodes 41 to 45, hidden node 33 is coupled to hidden nodes 41 to 45, hidden node 34 is coupled to hidden nodes 41 to 45, and hidden node 35 is coupled to hidden nodes 41 to 45. Hidden node 41 is coupled to hidden nodes 51 to 55, hidden node 42 is coupled to hidden nodes 51 to 55, hidden node 43 is coupled to hidden nodes 51 to 55, hidden node 44 is coupled to hidden nodes 51 to 55, and hidden node 45 is coupled to hidden nodes 51 to 55. Hidden node 51 is coupled to output nodes 61 and 62, hidden node 52 is coupled to output nodes 61 and 62, hidden node 53 is coupled to output nodes 61 and 62, hidden node 54 is coupled to output nodes 61 and 62, and hidden node 55 is coupled to output nodes 61 and 62.

Many other variations of input, hidden and output layers are clearly possible, including hidden layers that are locally-connected, rather than fully-connected, to one another.

Training an ANN includes optimizing the connection weights between nodes by minimizing the prediction error of the output data until the ANN achieves a particular level of accuracy. One method is backpropagation, or backward propagation of errors, which iteratively and recursively determines a gradient descent with respect to the connection weights, and then adjusts the connection weights to improve the performance of the network.

A multi-layer perceptron (MLP) is a fully-connected ANN that has an input layer, an output layer and one or more hidden layers. MLPs may be used for natural language processing applications, such as machine translation, speech recognition, etc. Other ANNs include recurrent neural networks (RNNs), long short-term memories (LSTMs), sequence-to-sequence models that include an encoder RNN and a decoder RNN, shallow neural networks, etc.

A CNN is a variation of an MLP that may be used for classification or recognition applications, such as image recognition, speech recognition, etc. A CNN has an input layer, an output layer and multiple hidden layers including convolutional layers, pooling layers, normalization layers, fully-connected layers, etc. Each convolutional layer applies a sliding dot product or cross-correlation to an input volume, applies an activation function to the results, and then provides the activation or output volume to the next layer. Convolutional layers typically use the ReLU function as the activation function. In certain embodiments, the activation function is provided in a separate activation layer, such as, for example, a ReLU layer. A pooling layer reduces the dimensions of the output volume received from the preceding convolutional layer, and may calculate an average or a maximum over small clusters of data, such as, for example, 2×2 matrices. In certain embodiments, a convolutional layer and a pooling layer may form a single layer of a CNN. The fully-connected layers follow the convolutional and pooling layers, and include a flatten layer and a classification layer, followed by a normalization layer that includes a normalization function, such as the SoftMax function. The output layer follows the last fully-connected layer; in certain embodiments, the output layer may include the normalization function.

Figure 2:
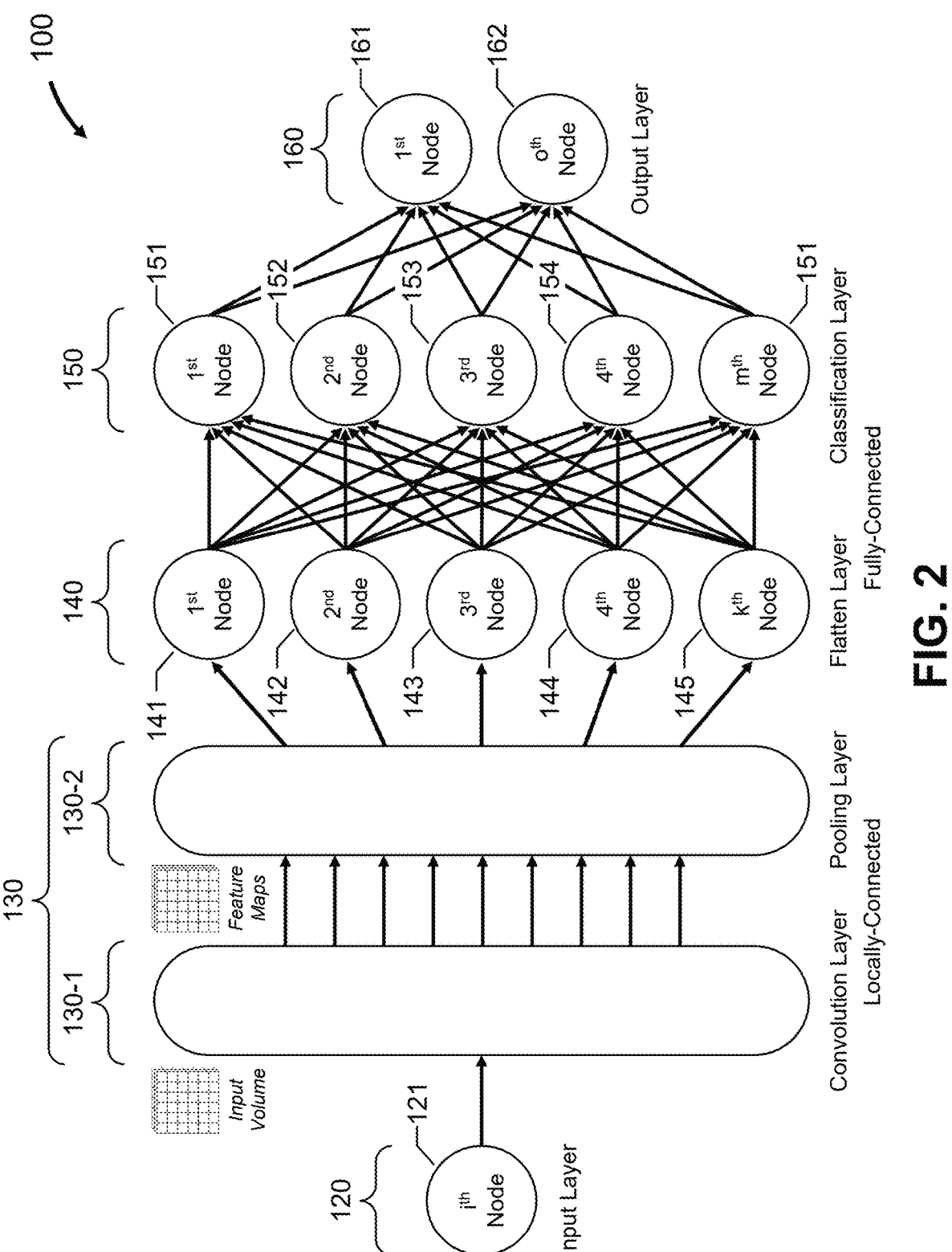
FIG. 2 depicts a CNN, in accordance with embodiments of the present disclosure.

FIG. 2 depicts CNN 100, in accordance with an embodiment of the present disclosure. CNN 100 includes input layer 120, one or more hidden layers, such as convolutional layer 130-1, pooling layer 130-2, hidden (flatten) layer 140, hidden (classification) layer 150, etc., and output layer 160. Many other variations of input, hidden and output layers are contemplated.

Input layer 120 includes one or more input nodes 121, etc., that present the input data, such as a color image, as an input volume to the first convolutional layer, e.g., convolutional layer 130-1. The input volume is a three-dimensional matrix that has a width, a height and a depth. For example, input data that represent a color image are presented as an input volume that is 512 pixels×512 pixels×3 channels (red, green, blue); other input volume dimensions may also be used, such as 32×32×3, 64×64×3, 128×128×3, etc., 32×32× 1, 64×64×1, 128×128×1, 512×512×1, etc.

Convolutional layer 130-1 is locally-connected to input layer 120, and includes a plurality of nodes that are connected to local regions in the input volume (not depicted for clarity). For a CNN that uses a standard convolution, each node computes a dot product between the node's weights and the respective local region of the input volume. An activation function is then applied to the results of each convolution calculation to produce an output volume that is provided as an input volume to the subsequent layer. The activation function may be applied by each convolutional layer node or by the nodes of a subsequent locally-connected ReLU layer.

Pooling layer 130-2 is locally-connected to convolutional layer 130-1, and includes a plurality of nodes that are connected to local regions in the input volume (not depicted for clarity). Pooling layer 130-2 also produces an output volume that is provided as the input volume to the subsequent layer, such as, for example, another convolutional layer 130-1, a flatten layer 140, etc. In certain embodiments, convolutional layer 130-1 and pooling layer 130-2 form a single hidden layer 130. Similarly, in certain embodiments, convolutional layer 130-1, a ReLU layer and pooling layer 130-2 form a single hidden layer 130. Generally, the output volumes of the convolutional and pooling layers may be described as feature maps, and one or more single hidden layers 130 form a feature learning portion of CNN 100.

Hidden layer 140 is a "flatten" layer that is locally-connected to pooling layer 130-2, and includes one or more hidden (flatten) nodes 141, 142, 143, 144, 145, etc. Hidden (flatten) layer 140 "flattens" the output volume produced by the preceding pooling layer 130-2 into a column vector, which is provided to the subsequent, fully-connected hidden layer 150.

Hidden layer 150 is a classification layer that is fully-connected to hidden (flatten) layer 140, and includes one or more hidden (classification) nodes 151, 152, 153, 154, 155, etc.

Output layer 160 includes one or more output nodes 161, 162, etc., and is fully-connected to hidden (classification) layer 150. Fully-connected output layer 160 receives the classification results output by hidden (classification) layer 150, and each node outputs a predicted class score. A normalization function, such as a SoftMax function, may be applied to the predicted class scores by output layer 160, or, alternatively, by an additional layer interposed between hidden (classification) layer 150 and output layer 160.

Similar to ANNs, training a CNN includes optimizing the connection weights between nodes by minimizing the prediction error of the output data until the CNN achieves a particular level of accuracy. As noted above, backpropagation may be used to iteratively and recursively determines a gradient descent with respect to the connection weights, and then adjusts the connection weights to improve the performance of the network. Matrix multiplication operations, and, more particularly, multiply-and-accumulate (MAC) operations, are used extensively by CNNs, as well as other ANNs.

Figure 3A:
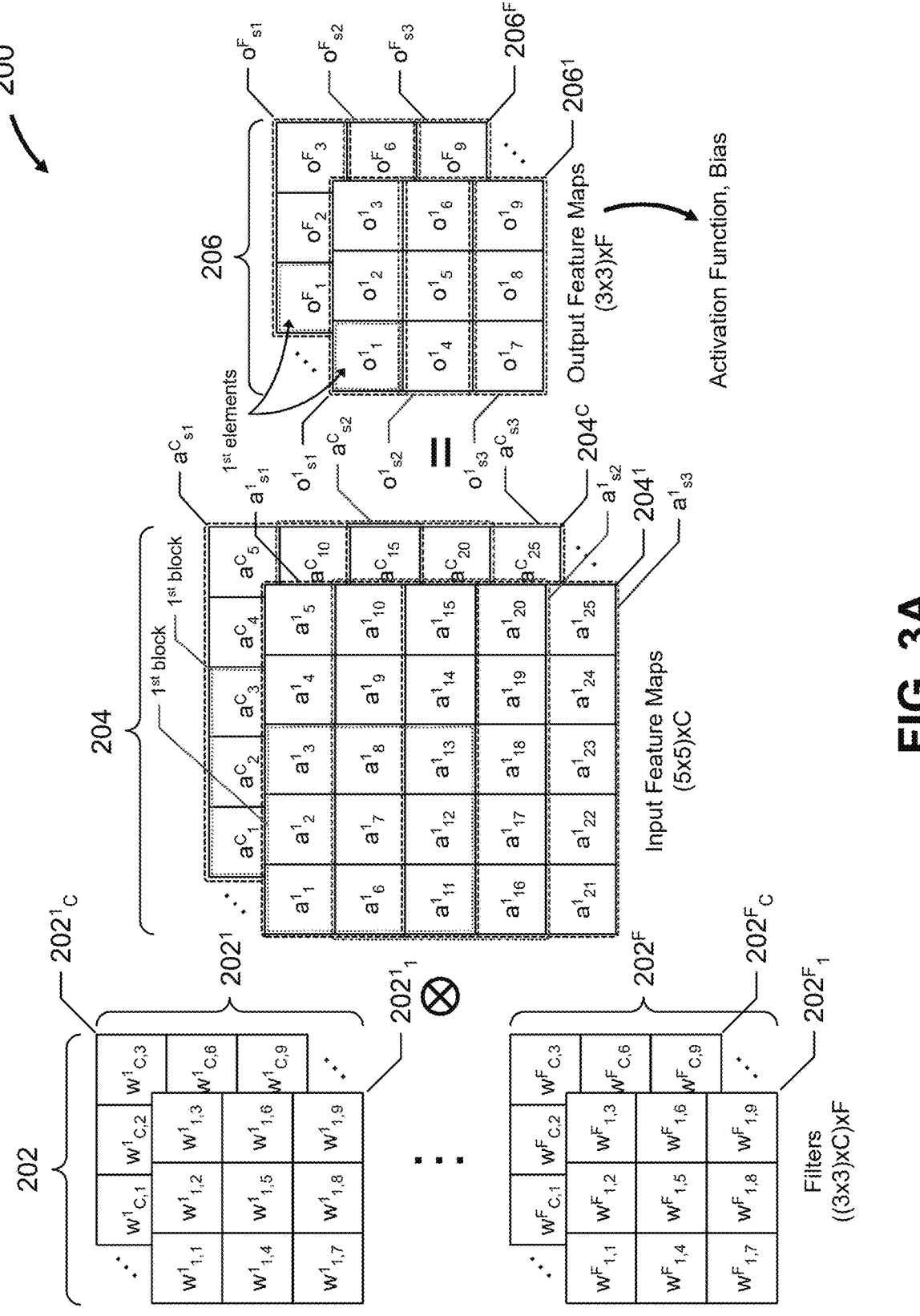
FIG. 3A depicts a convolutional layer calculation for a CNN, in accordance with an embodiment of the present disclosure.

FIG. 3A depicts convolutional layer calculation 200 for a CNN, in accordance with an embodiment of the present disclosure.

Convolutional layer calculation 200 convolves filter 202 with input feature maps 204 to produce output feature maps 206. Filter 202 includes F filter or weight sets $202^1$, . . . , $202^F$, and each filter set (weight set, kernel, etc.) includes C weight matrices, one 3×3 weight matrix for each channel (i.e., F is the number of filter or weight sets, and C is the number of channels). Other weight matrix dimensions may also be used, such as, for example, 2×2, 4×4, 5×5, etc. Input feature maps 204 include C input data matrices $204^1$, . . . , $204^C$, one 5×5 input data matrix for each channel. Other input data matrix dimensions may also be used, such as, for example, 4×4, 6×6, etc. Output feature maps 206 include F output data matrices $206^1$, . . . , $206^F$, one 3×3 output data matrix for each filter or weight set. The dimensions of output feature maps 206 are determined by the number of filter sets (F), and the convolution-based relationship between the dimensions of the weight matrices (e.g., 3×3, etc.) and the dimensions of the input feature maps (e.g., 5×5, etc.).

In this embodiment, filter 202 includes F filter or weight sets $202^1$, . . . , $202^F$, and each weight set $202^i$ includes C weight matrices $202^i_1$, . . . , $202^i_C$, each of which is a 3×3 matrix associated with a particular channel. For example, weight set $202^1$ includes weight matrices $202^1_1$, . . . , $202^1_C$. Weight matrix $202^1_1$ is associated with the first channel and includes weights $w^1_{1,1}$, $w^1_{1,2}$, $w^1_{1,3}$, $w^1_{1,4}$, $w^1_{1,5}$, $w^1_{1,6}$, $w^1_{1,7}$, $w^1_{1,8}$ and $w^1_{1,9}$. The remaining weight matrices $202^1_i$ are similarly configured, for example, weight matrix $202^1_C$ is associated with the last channel and includes weights $w^1_{C,1}$, $w^1_{C,2}$, $w^1_{C,3}$, $w^1_{C,4}$, $w^1_{C,5}$, $w^1_{C,6}$, $w^1_{C,7}$, $w^1_{C,8}$ and $w^1_{C,9}$ (certain weights not depicted for clarity).

Weight set $202^F$ includes weight matrices $202^F_1$, . . . , $202^F_C$. Weight matrix $202^F_1$ is associated with the first channel and includes weights $w^F_{1,1}$, $w^F_{1,2}$, $w^F_{1,3}$, $w^F_{1,4}$, $w^F_{1,5}$, $w^F_{1,6}$, $w^F_{1,7}$, $w^F_{1,8}$ and $w^F_{1,9}$. The remaining weight matrices $202^F_i$ are similarly configured, for example, weight matrix $202^F_C$ is associated with the last channel and includes weights $w^F_{C,1}$, $w^F_{C,2}$, $w^F_{C,3}$, $w^F_{C,4}$, $w^F_{C,5}$, $w^F_{C,6}$, $w^F_{C,7}$, $w^F_{C,8}$ and $w^F_{C,9}$ (certain weights not depicted for clarity). There may be one filter or weight set, two filter or weight sets, three filter or weight sets, etc.; typically, the number of filter or weight sets F may be a power of 2, i.e., 2, 4, 8, 16, 32, 64, 12, 256, etc.

In this embodiment, input feature maps 204 include C input data matrices $204^1$, . . . , $204^C$, one 5×5 input data matrix for each channel. For example, input data matrix $204^1$ is associated with the first channel and includes activations $a^1_1$, $a^1_2$, $a^1_3$, $a^1_4$, $a^1_5$, $a^1_6$, $a^1_7$, $a^1_8$, $a^1_9$, $a^1_{10}$, $a^1_{11}$, $a^1_{12}$, $a^1_{13}$, $a^1_{14}$, $a^1_{15}$, $a^1_{16}$, $a^1_{17}$, $a^1_{18}$, $a^1_{19}$, $a^1_{20}$, $a^1_{21}$, $a^1_{22}$, $a^1_{23}$, $a^1_{24}$ and $a^1_{25}$. The remaining input data matrices are similarly configured, for example, input data matrix $204^C$ is associated with the last channel C and includes activations $a^C_1$, $a^C_2$, $a^C_3$, $a^C_4$, $a^C_5$, $a^C_6$, $a^C_7$, $a^C_8$, $a^C_9$, $a^C_{10}$, $a^C_{11}$, $a^C_{12}$, $a^C_{13}$, $a^C_{14}$, $a^C_{15}$, $a^C_{16}$, $a^C_{17}$, $a^C_{18}$, $a^C_{19}$, $a^C_{20}$, $a^C_{21}$, $a^C_{22}$, $a^C_{23}$, $a^C_{24}$ and $a^C_{25}$ (certain activations not depicted for clarity). There may be one channel, two channels, three channels, etc.; typically, the number of channels C may be a power of 2, i.e., 2, 4, 8, 16, 32, 64, 12, 256, etc.

In this embodiment, output feature maps 206 include F output data matrices $206^1$, . . . , $206^F$, one 3×3 output data matrix for each filter or weight set. For example, output data matrix $206^1$ is associated with the first filter or weight set and includes output elements $o^1_1$, $o^1_2$, $o^1_3$, $o^1_4$, $o^1_5$, $o^1_6$, $o^1_7$, $o^1_8$ and $o^1_9$. The remaining output data matrices are similarly configured, for example, output data matrix $206^F$ is associated with the last filter or weight set and includes output elements $o^F_1$, $o^F_2$, $o^F_3$, $o^F_4$, $o^F_5$, $o^F_6$, $o^F_7$, $o^F_8$ and $o^F_9$ (certain output elements not depicted for clarity). Typically, each output data matrix $206^1$ is associated with a different output channel.

For ease of explanation, in this embodiment, each input data matrix $204^1$, . . . , $204^C$ may be divided into three sectors. The first sector spans the first (top), second and third rows, the second sector spans the second, third and fourth rows, and the third sector spans the third, fourth and fifth (bottom) rows. The first, second and third sectors for input data matrix $204^1$ are sectors $a^1_{s1}$, $a^1_{s2}$ and $a^1_{s2}$.

Sector $a^1_{s1}$ includes activations $a^1_1$, $a^1_2$, $a^1_3$, $a^1_4$, $a^1_5$, $a^1_6$, $a^1_7$, $a^1_8$, $a^1_9$, $a^1_{10}$, $a^1_{11}$, $a^1_{12}$, $a^1_{13}$, $a^1_{14}$ and $a^1_{15}$, from which three blocks are formed, i.e., a first block (activations $a^1_1$, $a^1_2$, $a^1_3$, $a^1_6$, $a^1_7$, $a^1_8$, $a^1_{11}$, $a^1_{12}$ and $a^1_{13}$), a second block (activations $a^1_2$, $a^1_3$, $a^1_4$, $a^1_7$, $a^1_8$, $a^1_9$, $a^1_{12}$, $a^1_{13}$ and $a^1_{14}$), and a third block (activations $a^1_3$, $a^1_4$, $a^1_5$, $a^1_8$, $a^1_9$, $a^1_{10}$, $a^1_{13}$, $a^1_{14}$ and $a^1_{15}$). The second and third blocks are not depicted for clarity.

Sector $a^1_{s2}$ includes activations $a^1_6$, $a^1_7$, $a^1_8$, $a^1_9$, $a^1_{10}$, $a^1_{11}$, $a^1_{12}$, $a^1_{13}$, $a^1_{14}$, $a^1_{15}$, $a^1_{16}$, $a^1_{17}$, $a^1_{18}$, $a^1_{19}$ and $a^1_{20}$, from which three blocks are formed, i.e., a first block (activations $a^1_6$, $a^1_7$, $a^1_8$, $a^1_{11}$, $a^1_{12}$, $a^1_{13}$, $a^1_{16}$, $a^1_{17}$ and $a^1_{18}$), a second block activations (activations $a^1_7$, $a^1_8$, $a^1_9$, $a^1_{12}$, $a^1_{13}$, $a^1_{14}$, $a^1_{17}$, $a^1_{18}$ and $a^1_{19}$), and a third block (activations $a^1_8$, $a^1_9$, $a^1_{10}$, $a^1_{13}$, $a^1_{14}$, $a^1_{15}$, $a^1_{18}$, $a^1_{19}$ and $a^1_{20}$). The second and third blocks are not depicted for clarity.

Sector $a^1_{s3}$ includes activations $a^1_{11}$, $a^1_{12}$, $a^1_{13}$, $a^1_{14}$, $a^1_{15}$, $a^1_{16}$, $a^1_{17}$, $a^1_{18}$, $a^1_{19}$, $a^1_{20}$, $a^1_{21}$, $a^1_{22}$, $a^1_{23}$, $a^1_{24}$ and $a^1_{25}$, from which three blocks of elements are formed, i.e., a first block (activations $a^1_{11}$, $a^1_{12}$, $a^1_{13}$, $a^1_{16}$, $a^1_{17}$, $a^1_{18}$, $a^1_{21}$, $a^1_{22}$ and $a^1_{23}$), a second block (activations $a^1_{12}$, $a^1_{13}$, $a^1_{14}$, $a^1_{17}$, $a^1_{18}$, $a^1_{19}$, $a^1_{22}$, $a^1_{23}$ and $a^1_{24}$), and a third block (activations $a^1_{13}$, $a^1_{14}$, $a^1_{15}$, $a^1_{18}$, $a^1_{19}$, $a^1_{20}$, $a^1_{23}$, $a^1_{24}$ and $a^1_{25}$). The second and third blocks are not depicted for clarity.

Sectors $a^1_{s1}$, $a^1_{s2}$ and $a^1_{s3}$ of the remaining input data matrices $204^i$ are similarly configured. For example, the first, second and third sectors for input data matrix $204^C$ are sectors $a^C_{s1}$, $a^C_{s2}$ and $a^C_{s2}$.

Each output data matrix $206^1$, . . . , $206^F$ may also be divided into three sectors in this embodiment. Generally, for output data matrix $206^i$, the first sector (i.e., sector $o^i_{s1}$) spans the first (top) row, the second sector (i.e., sector $o^i_{s2}$) spans the second row, and the third sector (i.e., sector $o^i_{s3}$) spans the third (bottom) row. For example, the first, second and third sectors for output data matrix $206^1$ are sectors $o^1_{s1}$, $o^1_{s2}$ and $o^1_{s2}$; the first, second and third sectors for output data matrix $206^F$ are sectors $o^F_{s1}$, $o^F_{s2}$ and $o^F_{s2}$; etc.

Generally, sector $o^i_1$ includes output elements $o^i_1$, $o^i_2$, $o^i_3$, sector $o^i_{s2}$ includes output elements $o^i_4$, $o^i_5$, $o^i_6$, and sector $o^i_{s2}$ includes output elements $o^i_7$, $o^i_8$, $o^i_9$. For example, sector $o^1_{s1}$ includes output elements $o^1_1$, $o^1_2$, $o^1_3$, sector $o^1_{s2}$ includes output elements $o^1_4$, $o^1_5$, $o^1_6$, and sector $o^1_{s2}$ includes output elements $o^1_7$, $o^1_8$, $o^1_9$; sector $o^F_{s1}$ includes output elements $o^F_1$, $o^F_2$, $o^F_3$, sector $o^F_{s2}$ includes output elements $o^F_4$, $o^F_5$, $o^F_6$, and sector $o^F_{s2}$ includes output elements $o^F_7$, $o^F_8$, $o^F_9$; etc.

With respect to sector $o^i_{s1}$, output element $o^i_1$ of output data matrix $206^i$ is the sum of the dot products of weight matrices $202^i_1$, . . . , $202^i_C$ and the first blocks within sectors $a^1_{s1}$, . . . , $a^C_{s1}$ of input data matrices $204^1$, . . . , $204^C$, respectively. Output element $o^i_2$ of output data matrix $206^i$ is the sum of the dot products of weight matrices $202^i_1$, . . . , $202^i_C$ and the second blocks within sectors $a^1_{s1}$, . . . , $a^C_{s1}$ of input data matrices $204^1$, $204^C$, respectively. And, output element $o^i_3$ of output data matrix $206^i$ is the sum of the dot products of weight matrices $202^i_1$, . . . , $202^i_C$ and the third blocks within sectors $a^1_{s1}$, . . . , $a^C_{s1}$ of input data matrices $204^1$, . . . , $204^C$, respectively.

As an example, the calculation of the output elements within output data matrix $206^1$ is as follows.

Output element $o^1_1$ is the sum of the dot products of weight matrices $202^1_1$, . . . , $202^1_C$, and the first blocks within sectors $a^1_{s1}$, . . . , $a^C_{s1}$ of input data matrices $204^1$, . . . , $204^C$, respectively, i.e., output element $o^1_1$ is equal to $w^1_{1,1} \cdot a^1_1 + w^1_{1,2} \cdot a^1_2 + w^1_{1,3} \cdot a^1_3 + w^1_{1,4} \cdot a^1_6 + w^1_{1,5} \cdot a^1_7 + w^1_{1,6} \cdot a^1_8 + w^1_{1,7} \cdot a^1_{11} + w^1_{1,8} \cdot a^1_{12} + w^1_{1,9} \cdot a^1_{13}, \ldots, w^1_{C,1} \cdot a^C_1 + w^1_{C,2} \cdot a^C_2 + w^1_{C,3} \cdot a^C_3 + w^1_{C,4} \cdot a^C_6 + w^1_{C,5} \cdot a^C_7 + w^1_{C,6} \cdot a^C_8 + w^1_{C,7} \cdot a^C_{11} + w^1_{C,8} \cdot a^C_{12} + w^1_{C,9} \cdot a^C_{13}$. Output element $o^1_2$ is the sum of the dot products of weight matrices $202^1_1$, . . . , $202^1_C$, and the second blocks within sectors $a^1_{s1}$, . . . , $a^C_{s1}$ of input data matrices $204^1$, . . . , $204^C$, respectively, i.e., output element $o^1_2$ is equal to $w^1_{1,1} \cdot a^1_2 + w^1_{1,2} \cdot a^1_3 + w^1_{1,3} \cdot a^1_4 + w^1_{1,4} \cdot a^1_7 + w^1_{1,5} \cdot a^1_8 + w^1_{1,6} \cdot a^1_9 + w^1_{1,7} \cdot a^1_{12} + w^1_{1,8} \cdot a^1_{13} + w^1_{1,9} \cdot a^1_{14}, \ldots, w^1_{C,1} \cdot a^C_2 + w^1_{C,2} \cdot a^C_3 + w^1_{C,3} \cdot a^C_4 + w^1_{C,4} \cdot a^C_7 + w^1_{C,5} \cdot a^C_8 + w^1_{C,6} \cdot a^C_9 + w^1_{C,7} \cdot a^C_{12} + w^1_{C,8} \cdot a^C_{13} + w^1_{C,9} \cdot a^C_{14}$. Output element $o^1_3$ is the sum of the dot products of weight matrices $202^1_1$, . . . , $202^1_C$, and the third blocks within sectors $a^1_{s1}$, . . . , $a^C_{s1}$ of input data matrices $204^1$, . . . , $204^C$, respectively, i.e., output element $o^1_3$ is equal to $w^1_{1,1} \cdot a^1_2 + w^1_{1,2} \cdot a^1_3 + w^1_{1,3} \cdot a^1_4 + w^1_{1,4} \cdot a^1_7 + w^1_{1,5} \cdot a^1_8 + w^1_{1,6} \cdot a^1_9 + w^1_{1,7} \cdot a^1_{12} + w^1_{1,8} \cdot a^1_{13} + w^1_{1,9} \cdot a^1_{14}, \ldots, w^1_{C,1} \cdot a^C_2 + w^1_{C,2} \cdot a^C_3 + w^1_{C,3} \cdot a^C_4 + w^1_{C,4} \cdot a^C_7 + w^1_{C,5} \cdot a^C_8 + w^1_{C,6} \cdot a^C_9 + w^1_{C,7} \cdot a^C_{12} + w^1_{C,8} \cdot a^C_{13} + w^1_{C,9} \cdot a^C_{14}$.

With respect to the sector $o^i_{s2}$, output element $o^i_4$ of output data matrix $206^i$ is the sum of the dot products of weight matrices $202^i_1$, . . . , $202^i_C$ and the first blocks within sectors $a^1_{s2}$, . . . , $a^C_{s2}$ of input data matrices $204^1$, . . . , $204^C$, respectively. Output element $o^i_5$ of output data matrix $206^i$ is the sum of the dot products of weight matrices $202^i_1$, . . . , $202^i_C$ and the second blocks within sectors $a^1_{s2}$, . . . , $a^C_{s2}$ of input data matrices $204^1$, . . . , $204^C$, respectively. And, output element $o^i_6$ of output data matrix $206^i$ is the sum of the dot products of weight matrices $202^i_1$, . . . , $202^i_C$ and the third blocks within sectors $a^1_{s2}$, . . . , $a^C_{s2}$ of input data matrices $204^1$, . . . , $204^C$, respectively. As an example, the calculation of the output elements within output data matrix $206^1$ is as follows.

Output element $o^1_4$ is the sum of the dot products of weight matrices $202^1_1$, . . . , $202^1_C$, and the first blocks within sectors $a^1_{s2}$, . . . , $a^C_{s2}$ of input data matrices $204^1$, . . . , $204^C$, respectively, i.e., output element $o^1_4$ is equal to $w^1_{1,1} \cdot a^1_6 + w^1_{1,2} \cdot a^1_7 + w^1_{1,3} \cdot a^1_8 + w^1_{1,4} \cdot a^1_{11} + w^1_{1,5} \cdot a^1_{12} + w^1_{1,6} \cdot a^1_{13} + w^1_{1,7} \cdot a^1_{16} + w^1_{1,8} \cdot a^1_{17} + w^1_{1,9} \cdot a^1_{18}, \ldots, w^1_{C,1} \cdot a^C_6 + w^1_{C,2} \cdot a^C_7 + w^1_{C,3} \cdot a^C_8 + w^1_{C,4} \cdot a^C_{11} + w^1_{C,5} \cdot a^C_{12} + w^1_{C,6} \cdot a^C_{13} + w^1_{C,7} \cdot a^C_{16} + w^1_{C,8} \cdot a^C_{17} + w^1_{C,9} \cdot a^C_{18}$. Output element $o^1_5$ is the sum of the dot products of weight matrices $202^1_1$, . . . , $202^1_C$, and the second blocks within sectors $a^1_{s2}$, . . . , $a^C_{s2}$ of input data matrices $204^1$, . . . , $204^C$, respectively, i.e., output element $o^1_5$ is equal to $w^1_{1,1} \cdot a^1_7 + w^1_{1,2} \cdot a^1_8 + w^1_{1,3} \cdot a^1_9 + w^1_{1,4} \cdot a^1_{12} + w^1_{1,5} \cdot a^1_{13} + w^1_{1,6} \cdot a^1_{14} + w^1_{1,7} \cdot a^1_{17} + w^1_{1,8} \cdot a^1_{18} + w^1_{1,9} \cdot a^1_{19}, \ldots, w^1_{C,1} \cdot a^C_7 + w^1_{C,2} \cdot a^C_8 + w^1_{C,3} \cdot a^C_9 + w^1_{C,4} \cdot a^C_{12} + w^1_{C,5} \cdot a^C_{13} + w^1_{C,6} \cdot a^C_{14} + w^1_{C,7} \cdot a^C_{17} + w^1_{C,8} \cdot a^C_{18} + w^1_{C,9} \cdot a^C_{19}$. Output element $o^1_6$ is the sum of the dot products of weight matrices $202^1_1, \ldots, 202^1_C$, and the third blocks within sectors $a^1_{s2}, \ldots, a^C_{s2}$ of input data matrices $204^1, \ldots, 204^C$, respectively, i.e., output element $o^1_6$ is equal to $w^1_{1,1} \cdot a^1_8 + w^1_{1,2} \cdot a^1_9 + w^1_{1,3} \cdot a^1_{10} + w^1_{1,4} \cdot a^1_{13} + w^1_{1,5} \cdot a^1_{14} + w^1_{1,6} \cdot a^1_{15} + w^1_{1,7} \cdot a^1_{18} + w^1_{1,8} \cdot a^1_{19} + w^1_{1,9} \cdot a^1_{20}, \ldots, w^1_{C,1} \cdot a^C_8 + w^1_{C,2} \cdot a^C_9 + w^1_{C,3} \cdot a^C_{10} + w^1_{C,4} \cdot a^C_{13} + w^1_{C,5} \cdot a^C_{14} + w^1_{C,6} \cdot a^C_{15} + w^1_{C,7} \cdot a^C_{18} + w^1_{C,8} \cdot a^C_{19} + w^1_{C,9} \cdot a^C_{20}$.

With respect to the sector $o^i_{s3}$, output element $o^i_7$ of output data matrix $206^i$ is the sum of the dot products of weight matrices $202^i_1, \ldots, 202^i_C$ and the first blocks within sectors $a^1_{s3}, \ldots, a^C_{s3}$ of input data matrices $204^1, \ldots, 204^C$, respectively. Output element $o^i_8$ of output data matrix $206^i$ is the sum of the dot products of weight matrices $202^i_1, \ldots, 202^i_C$ and the second blocks within sectors $a^1_{s3}, \ldots, a^C_{s3}$ of input data matrices $204^1, \ldots, 204^C$, respectively. And, output element $o^i_9$ of output data matrix $206^i$ is the sum of the dot products of weight matrices $202^i_1, \ldots, 202^i_C$ and the third blocks within sectors $a^1_{s3}, \ldots, a^C_{s3}$ of input data matrices $204^1, \ldots, 204^C$, respectively. As an example, the calculation of the output elements within output data matrix $206^1$ is as follows.

Output element $o^1_7$ is the sum of the dot products of weight matrices $202^1_1, \ldots, 202^1_C$, and the first blocks within sectors $a^1_{s3}, \ldots, a^C_{s3}$ of input data matrices $204^1, \ldots, 204^C$, respectively, i.e., output element $o^1_7$ is equal to $w^1_{1,1} \cdot a^1_{11} + w^1_{1,2} \cdot a^1_{12} + w^1_{1,3} \cdot a^1_3 + w^1_{1,4} \cdot a^1_{16} + w^1_{1,5} \cdot a^1_{17} + w^1_{1,6} \cdot a^1_{18} + w^1_{1,7} \cdot a^1_{21} + w^1_{1,8} \cdot a^1_{22} + w^1_{1,9} \cdot a^1_{23}, \ldots, w^1_{C,1} \cdot a^C_{11} + w^1_{C,2} \cdot a^C_{12} + w^1_{C,3} \cdot a^C_{13} + w^1_{C,4} \cdot a^C_{16} + w^1_{C,5} \cdot a^C_{17} + w^1_{C,6} \cdot a^C_{18} + w^1_{C,7} \cdot a^C_{21} + w^1_{C,8} \cdot a^C_{22} + w^1_{C,9} \cdot a^C_{23}$. Output element $o^1_8$ is the sum of the dot products of weight matrices $202^1_1, \ldots, 202^1_C$, and the second blocks within sectors $a^1_{s3}, \ldots, a^C_{s3}$ of input data matrices $204^1, \ldots, 204^C$, respectively, i.e., output element $o^1_8$ is equal to $w^1_{1,1} \cdot a^1_{12} + w^1_{1,2} \cdot a^1_{13} + w^1_{1,3} \cdot a^1_{14} + w^1_{1,4} \cdot a^1_{17} + w^1_{1,5} \cdot a^1_{18} + w^1_{1,6} \cdot a^1_{19} + w^1_{1,7} \cdot a^1_{22} + w^1_{1,8} \cdot a^1_{23} + w^1_{1,9} \cdot a^1_{24}, \ldots, w^1_{C,1} \cdot a^C_{12} + w^1_{C,2} \cdot a^C_{13} + w^1_{C,3} \cdot a^C_{14} + w^1_{C,4} \cdot a^C_{17} + w^1_{C,5} \cdot a^C_{18} + w^1_{C,6} \cdot a^C_{19} + w^1_{C,7} \cdot a^C_{22} + w^1_{C,8} \cdot a^C_{23} + w^1_{C,9} \cdot a^C_{24}$. Output element $o^1_9$ is the sum of the dot products of weight matrices $202^1_1, \ldots, 202^1_C$, and the third blocks within sectors $a^1_{s3}, \ldots, a^C_{s3}$ of input data matrices $204^1, \ldots, 204^C$, respectively, i.e., output element $o^1_9$ is equal to $w^1_{1,1} \cdot a^1_{13} + w^1_{1,2} \cdot a^1_{14} + w^1_{1,3} \cdot a^1_{15} + w^1_{1,4} \cdot a^1_{18} + w^1_{1,5} \cdot a^1_{19} + w^1_{1,6} \cdot a^1_{20} + w^1_{1,7} \cdot a^1_{23} + w^1_{1,8} \cdot a^1_{24} + w^1_{1,9} \cdot a^1_{25}, \ldots, w^1_{C,1} \cdot a^C_{13} + w^1_{C,2} \cdot a^C_{14} + w^1_{C,3} \cdot a^C_{15} + w^1_{C,4} \cdot a^C_{18} + w^1_{C,5} \cdot a^C_{19} + w^1_{C,6} \cdot a^C_{20} + w^1_{C,7} \cdot a^C_{23} + w^1_{C,8} \cdot a^C_{24} + w^1_{C,9} \cdot a^C_{25}$.

Figure 3B:
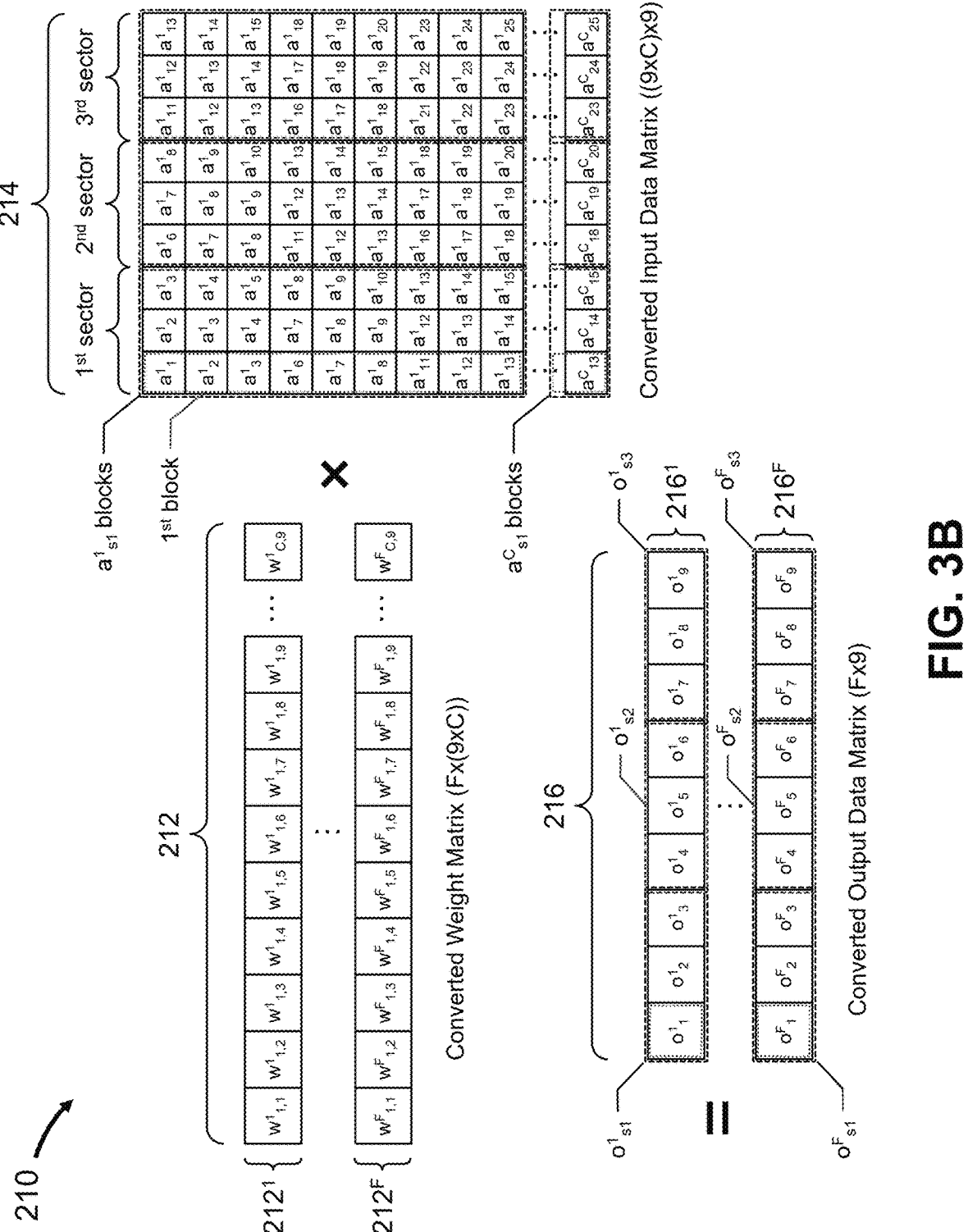
FIG. 3B depicts a converted convolutional layer calculation for a CNN, in accordance with an embodiment of the present disclosure.

FIG. 3B depicts converted convolutional layer calculation 210 for a CNN, in accordance with an embodiment of the present disclosure.

In one embodiment, the convolutional layer calculations for CNNs may be converted into generic matrix multiplication (GEMM) operations for processing by one or more ANN accelerators. Convolution layer calculation 200 is converted into a GEMM operation by converting filters 202 into converted weight matrix 212, converting input feature maps 204 into converted input data matrix 214, and then multiplying converted weight matrix 212 and converted input data matrix 214 to generate converted output data matrix 216. Because simple matrix multiplication is performed rather than a convolution operation, each output element within converted output data matrix 216 is the dot product of one row of converted weight matrix 212 and one column of converted input data matrix 214. Converted output data matrix 216 is then reformed into output feature maps 206.

Converted weight matrix 212 is a F×(9×C) matrix, and includes converted weight sets $212^1, 212^F$. Each weight set $202^i$ is flattened to form a respective converted weight set $212^i$, which forms a single row of converted weight matrix 212. For example, the first row of converted weight matrix 212 is converted weight set $212^1$, which includes weights $w^1_{1,1}$, $w^1_{1,2}$, $w^1_{1,3}$, $w^1_{1,4}$, $w^1_{1,5}$, $w^1_{1,6}$, $w^1_{1,7}$, $w^1_{1,8}$, $w^1_{1,9}, \ldots, w^1_{C,1}$, $w^1_{C,2}$, $w^1_{C,3}$, $w^1_{C,4}$, $w^1_{C,5}$, $w^1_{C,6}$, $w^1_{C,7}$, $w^1_{C,8}$, $w^1_{C,9}$; the last row of converted weight matrix 212 is converted weight set $212^F$, which includes weights $w^F_{1,1}$, $w^F_{1,2}$, $w^F_{1,3}$, $w^F_{1,4}$, $w^F_{1,5}$, $w^F_{1,6}$, $w^F_{1,7}$, $w^F_{1,8}$, $w^F_{1,9}, \ldots, w^F_{C,1}$, $w^F_{C,2}$, $w^F_{C,3}$, $w^F_{C,4}$, $w^F_{C,5}$, $w^F_{C,6}$, $w^F_{C,7}$, $w^F_{C,8}$, $w^F_{C,9}$; etc. Certain weights are not depicted for clarity.

Converted input data matrix 214 is a ((9×C)×9) matrix, and includes the blocks of each sector of input data matrices $204^1, \ldots, 204^C$, i.e., the first, second and third blocks of sectors $a^1_{s1}, a^1_{s2}, a^1_{s3}, \ldots, a^C_{s1}, a^C_{s2}$ and $a^C_{s3}$, respectively. Generally, each block is flattened to form a portion of a single column of converted input data matrix 214.

With respect to the first sector, the first column of converted input data matrix 214 includes the first blocks from sectors $a^1_{s1}, \ldots, a^C_{s1}$, i.e., activations $a^1_1, a^1_2, a^1_3, a^1_6, a^1_7, a^1_8, a^1_{11}, a^1_{12}, a^1_{13}, \ldots, a^C_1, a^C_2, a^C_3, a^C_6, a^C_7, a^C_8, a^C_{11}, a^C_{12}$ and $a^C_{13}$. The second column of converted input data matrix 214 includes the second blocks from sectors $a^1_{s1}, \ldots, a^C_{s1}$, i.e., activations $a^1_2, a^1_3, a^1_4, a^1_7, a^1_8, a^1_9, a^1_{12}, a^1_{13}, a^1_{14}, \ldots, a^C_2, a^C_3, a^C_4, a^C_7, a^C_8, a^C_9, a^C_{12}, a^1_3, a^C_{14}$. The third column of converted input data matrix 214 includes the third blocks from sectors $a^1_{s1}, \ldots, a^C_{s1}$, i.e., activations $a^1_3, a^1_4, a^1_5, a^1_8, a^1_9, a^1_{10}, a^1_{13}, a^1_{14}, a^1_{15}, \ldots, a^C_3, a^C_4, a^C_5, a^C_8, a^C_9, a^C_{10}, a^C_{13}, a^C_{14}$ and $a^C_{15}$. Certain activations are not depicted for clarity.

With respect to the second sector, the fourth column of converted input data matrix 214 includes the first blocks from sectors $a^1_{s2}, \ldots, a^C_{s2}$, i.e., activations $a^1_6, a^1_7, a^1_8, a^1_{11}, a^1_{12}, a^1_{13}, a^1_{16}, a^1_{17}, a^1_{18}, \ldots, a^C_6, a^C_7, a^C_8, a^C_{11}, a^C_{12}, a^C_{13}, a^C_{16}, a^C_{17}, a^C_{18}$. The fifth column of converted input data matrix 214 includes the second blocks from sectors $a^1_{s2}, \ldots, a^C_{s2}$, i.e., activations $a^1_7, a^1_8, a^1_9, a^1_{12}, a^1_{13}, a^1_{14}, a^1_{17}, a^1_{18}, a^1_{19}, \ldots, a^C_7, a^C_8, a^C_9, a^C_{12}, a^C_{13}, a^C_{14}, a^C_{17}, a^C_{18}$ and $a^C_{19}$. The sixth column of converted input data matrix 214 includes the third blocks from sectors $a^1_{s2}, \ldots, a^C_{s2}$, i.e., activations $a^1_8, a^1_9, a^1_{10}, a^1_{13}, a^1_{14}, a^1_{15}, a^1_{18}, a^1_{19}, a^1_{20}, \ldots, a^C_8, a^C_9, a^C_{10}, a^C_{13}, a^C_{14}, a^C_{15}, a^C_{18}, a^C_{19}$ and $a^C_{20}$. Certain activations are not depicted for clarity.

With respect to the third sector, the seventh column of converted input data matrix 214 includes the first blocks from sectors $a^1_{s3}, \ldots, a^C_{s3}$, i.e., activations $a^1_{11}, a^1_{12}, a^1_{13}, a^1_{16}, a^1_{17}, a^1_{18}, a^1_{21}, a^1_{22}, a^1_{23}, \ldots, a^C_{11}, a^C_{12}, a^C_{13}, a^C_{16}, a^C_{17}, a^C_{18}, a^C_{21}, a^C_{22}$ and $a^C_{23}$. The eighth column of converted input data matrix 214 includes the second blocks from sectors $a^1_{s3}, \ldots, a^C_{s3}$, i.e., activations $a^1_{12}, a^1_{13}, a^1_{14}, a^1_{17}, a^1_{18}, a^1_{19}, a^1_{22}, a^1_{23}, a^1_{24}, \ldots, a^C_{12}, a^C_{13}, a^C_{14}, a^C_{17}, a^C_{18}, a^C_{19}, a^C_{22}, a^C_{23}$ and $a^C_{24}$. The ninth column of converted input data matrix 214 includes the third blocks from sectors $a^1_{s3}, \ldots, a^C_{s3}$, i.e., activations $a^1_{13}, a^1_{14}, a^1_{15}, a^1_{18}, a^1_{19}, a^1_{20}, a^1_{23}, a^1_{24}, a^1_{25}, \ldots, a^C_{13}, a^C_{14}, a^C_{15}, a^C_{18}, a^C_{19}, a^C_{20}, a^C_{23}, a^C_{24}$ and $a^C_{25}$. Certain activations are not depicted for clarity.

Converted output data matrix 216 is an F×9 matrix, and includes flattened versions of output data matrices $206^1, \ldots, 206^F$, i.e., converted output data matrices $216^1, \ldots$ and $216^F$. Each converted output data matrix $216^i$ may also be arranged into sectors, which include the same output elements as the respective sectors of output feature maps 206. In other words, each converted output data matrix 216$^i$ includes sectors $o^i_{s1}$, $o^i_{s2}$ and $o^i_{s3}$. Sector $o^i_{s1}$ includes output elements $o^i_1$, $o^i_2$ and $o^i_3$, sector $o^i_{s2}$ includes output elements $o^1_4$, $o^i_5$ and $o^i_6$, and sector $o^i_{s3}$ includes output elements $o^1_7$, $o^1_8$ and $o^i_9$.

More particularly, converted output data matrix 216$^1$ includes sectors $o^1_{s1}$, $o^1_{s2}$ and $o^1_{s3}$; sector $o^1_{s1}$ includes output elements $o^1_1$, $o^1_2$ and $o^1_3$, sector $o^1_{s2}$ includes output elements $o^1_4$, $o^1_5$ and $o^1_6$, and sector $o^1_{s3}$ includes output elements $o^1_7$, $o^1_8$ and $o^1_9$. Similarly, output data matrix 216$^F$ includes sectors $o^F_{s1}$, $o^F_{s2}$ and $o^F_{s3}$; sector $o^F_{s1}$ includes output elements $o^F_1$, $o^F_2$ and $o^F_3$, sector $o^F_{s2}$ includes output elements $o^F_4$, $o^F_5$ and $o^F_6$, and sector $o^F_{s3}$ includes output elements $o^F_7$, $o^F_8$ and $o^F_9$.

As an example, the calculation of output elements of converted output data matrix 216$^1$ is as follows.

Output element $o^1_1$ is the dot product of the first row of converted weight matrix 212, i.e., converted weight set 212$^1$, and the first column of converted input data matrix 214. More particularly, output element $o^1_1$ is equal to $w^1_{1,1} \cdot a^1_1 + w^1_{1,2} \cdot a^1_2 + w^1_{1,3} \cdot a^1_3 + w^1_{1,4} \cdot a^1_6 + w^1_{1,5} \cdot a^1_7 + w^1_{1,6} \cdot a^1_8 + w^1_{1,7} \cdot a^1_{11} + w^1_{1,8} \cdot a^1_{12} + w^1_{1,9} \cdot a^1_{13}, \ldots, w^1_{C,1} \cdot a^C_1 + w^1_{C,2} \cdot a^C_2 + w^1_{C,3} \cdot a^C_3 + w^1_{C,4} \cdot a^C_6 + w^1_{C,5} \cdot a^C_7 + w^1_{C,6} \cdot a^C_8 + w^1_{C,7} \cdot a^C_{11} + w^1_{C,8} \cdot a^C_{12} + w^1_{C,9} \cdot a^C_{13}$. As shown above, output element $o^1_1$ of converted output data matrix 216 is equal to output element $o^1_1$ of output feature maps 206.

Output element $o^1_2$ is the dot product of the first row of converted weight matrix 212, i.e., converted weight set 212$^1$, and the second column of converted input data matrix 214. More particularly, output element $o^1_2$ is equal to $w^1_{1,1} \cdot a^1_2 + w^1_{1,2} \cdot a^1_3 + w^1_{1,3} \cdot a^1_4 + w^1_{1,4} \cdot a^1_7 + w^1_{1,5} \cdot a^1_8 + w^1_{1,6} \cdot a^1_9 + w^1_{1,7} \cdot a^1_{12} + w^1_{1,8} \cdot a^1_{13} + w^1_{1,9} \cdot a^1_{14}, \ldots, w^1_{C,1} \cdot a^C_2 + w^1_{C,2} \cdot a^C_3 + w^1_{C,3} \cdot a^C_4 + w^1_{C,4} \cdot a^C_7 + w^1_{C,5} \cdot a^C_8 + w^1_{C,6} \cdot a^C_9 + w^1_{C,7} \cdot a^C_{12} + w^1_{C,8} \cdot a^C_{13} + w^1_{C,9} \cdot a^C_{14}$. As shown above, output element $o^1_2$ of converted output data matrix 216 is equal to output element $o^1_2$ of output feature maps 206.

Output element $o^1_3$ is the dot product of the first row of converted weight matrix 212, i.e., converted weight set 212$^1$, and the third column of converted input data matrix 214. More particularly, output element $o^1_3$ is equal to $w^1_{1,1} \cdot a^1_2 + w^1_{1,2} \cdot a^1_3 + w^1_{1,3} \cdot a^1_4 + w^1_{1,4} \cdot a^1_7 + w^1_{1,5} \cdot a^1_8 + w^1_{1,6} \cdot a^1_9 + w^1_{1,7} \cdot a^1_{12} + w^1_{1,8} \cdot a^1_{13} + w^1_{1,9} \cdot a^1_{14}, \ldots, w^1_{C,1} \cdot a^C_2 + w^1_{C,2} \cdot a^C_3 + w^1_{C,3} \cdot a^C_4 + w^1_{C,4} \cdot a^C_7 + w^1_{C,5} \cdot a^C_8 + w^1_{C,6} \cdot a^C_9 + w^1_{C,7} \cdot a^C_{12} + w^1_{C,8} \cdot a^C_{13} + w^1_{C,9} \cdot a^C_{14}$. As shown above, output element $o^1_3$ of converted output data matrix 216 is equal to output element $o^1_3$ of output feature maps 206.

Output element $o^1_4$ is the dot product of the first row of converted weight matrix 212, i.e., converted weight set 212$^1$, and the fourth column of converted input data matrix 214. More particularly, output element $o^1_4$ is equal to $w^1_{1,1} \cdot a^1_6 + w^1_{1,2} \cdot a^1_7 + w^1_{1,3} \cdot a^1_8 + w^1_{1,4} \cdot a^1_{11} + w^1_{1,5} \cdot a^1_2 + w^1_{1,6} \cdot a^1_3 + w^1_{1,7} \cdot a^1_{16} + w^1_{1,8} \cdot a^1_{17} + w^1_{1,9} \cdot a^1_{18}, \ldots, w^1_{C,1} \cdot a^C_6 + w^1_{C,2} \cdot a^C_7 + w^1_{C,3} \cdot a^C_8 + w^1_{C,4} \cdot a^C_{11} + w^1_{C,5} \cdot a^C_{12} + w^1_{C,6} \cdot a^C_{13} + w^1_{C,7} \cdot a^C_{16} + w^1_{C,8} \cdot a^C_{17} + w^1_{C,9} \cdot a^C_{18}$. As shown above, output element $o^1_4$ of converted output data matrix 216 is equal to output element $o^1_4$ of output feature maps 206.

Output element $o^1_5$ is the dot product of the first row of converted weight matrix 212, i.e., converted weight set 212$^1$, and the fifth column of converted input data matrix 214. More particularly, output element $o^1_5$ is equal to $w^1_{1,1} \cdot a^1_7 + w^1_{1,2} \cdot a^1_8 + w^1_{1,3} \cdot a^1_9 + w^1_{1,4} \cdot a^1_{12} + w^1_{1,5} \cdot a^1_{13} + w^1_{1,6} \cdot a^1_{14} + w^1_{1,7} \cdot a^1_{17} + w^1_{1,8} \cdot a^1_{18} + w^1_{1,9} \cdot a^1_{19}, \ldots, w^1_{C,1} \cdot a^C_7 + w^1_{C,2} \cdot a^C_8 + w^1_{C,3} \cdot a^C_9 + w^1_{C,4} \cdot a^C_{12} + w^1_{C,5} \cdot a^C_{13} + w^1_{C,6} \cdot a^C_{14} + w^1_{C,7} \cdot a^C_{17} + w^1_{C,8} \cdot a^C_{18} + w^1_{C,9} \cdot a^C_{19}$. As shown above, output element $o^1_5$ of converted output data matrix 216 is equal to output element $o^1_5$ of output feature maps 206.

Output element $o^1_6$ is the dot product of the first row of converted weight matrix 212, i.e., converted weight set 212$^1$, and the sixth column of converted input data matrix 214. More particularly, output element $o^1_6$ is equal to $w^1_{1,1} \cdot a^1_8 + w^1_{1,2} \cdot a^1_9 + w^1_{1,3} \cdot a^1_{10} + w^1_{1,4} \cdot a^1_{13} + w^1_{1,5} \cdot a^1_{14} + w^1_{1,6} \cdot a^1_{15} + w^1_{1,7} \cdot a^1_{18} + w^1_{1,8} \cdot a^1_{19} + w^1_{1,9} \cdot a^1_{20}, \ldots, w^1_{C,1} \cdot a^C_8 + w^1_{C,2} \cdot a^C_9 + w^1_{C,3} \cdot a^C_{10} + w^1_{C,4} \cdot a^C_{13} + w^1_{C,5} \cdot a^C_{14} + w^1_{C,6} \cdot a^C_{15} + w^1_{C,7} \cdot a^C_{18} + w^1_{C,8} \cdot a^C_{19} + w^1_{C,9} \cdot a^C_{20}$. As shown above, output element $o^1_6$ of converted output data matrix 216 is equal to output element $o^1_6$ of output feature maps 206.

Output element $o^1_7$ is the dot product of the first row of converted weight matrix 212, i.e., converted weight set 212$^1$, and the seventh column of converted input data matrix 214. More particularly, output element $o^1_7$ is equal to $w^1_{1,1} \cdot a^1_{11} + w^1_{1,2} \cdot a^1_{12} + w^1_{1,3} \cdot a^1_{13} + w^1_{1,4} \cdot a^1_{16} + w^1_{1,5} \cdot a^1_{17} + w^1_{1,6} \cdot a^1_{18} + w^1_{1,7} \cdot a^1_{21} + w^1_{1,8} \cdot a^1_{22} + w^1_{1,9} \cdot a^1_{23}, \ldots, w^1_{C,1} \cdot a^C_{11} + w^1_{C,2} \cdot a^C_{12} + w^1_{C,3} \cdot a^C_{13} + w^1_{C,4} \cdot a^C_{16} + w^1_{C,5} \cdot a^C_{17} + w^1_{C,6} \cdot a^C_{18} + w^1_{C,7} \cdot a^C_{21} + w^1_{C,8} \cdot a^C_{22} + w^1_{C,9} \cdot a^C_{23}$. As shown above, output element $o^1_7$ of converted output data matrix 216 is equal to output element $o^1_7$ of output feature maps 206.

Output element $o^1_8$ is the dot product of the first row of converted weight matrix 212, i.e., converted weight set 212$^1$, and the eighth column of converted input data matrix 214. More particularly, output element $o^1_8$ is equal to $w^1_{1,1} \cdot a^1_{12} + w^1_{1,2} \cdot a^1_{13} + w^1_{1,3} \cdot a^1_{14} + w^1_{1,4} \cdot a^1_{17} + w^1_{1,5} \cdot a^1_{18} + w^1_{1,6} \cdot a^1_{19} + w^1_{1,7} \cdot a^1_{22} + w^1_{1,8} \cdot a^1_{23} + w^1_{1,9} \cdot a^1_{24}, \ldots, w^1_{C,1} \cdot a^C_{12} + w^1_{C,2} \cdot a^C_{13} + w^1_{C,3} \cdot a^C_{14} + w^1_{C,4} \cdot a^C_{17} + w^1_{C,5} \cdot a^C_{18} + w^1_{C,6} \cdot a^C_{19} + w^1_{C,7} \cdot a^C_{22} + w^1_{C,8} \cdot a^C_{23} + w^1_{C,9} \cdot a^C_{24}$. As shown above, output element $o^1_8$ of converted output data matrix 216 is equal to output element $o^1_8$ of output feature maps 206.

Output element $o^1_9$ is the dot product of the first row of converted weight matrix 212, i.e., converted weight set 212$^1$, and the ninth column of converted input data matrix 214. More particularly, output element $o^1_9$ is equal to $w^1_{1,1} \cdot a^1_{13} + w^1_{1,2} \cdot a^1_{14} + w^1_{1,3} \cdot a^1_{15} + w^1_{1,4} \cdot a^1_{18} + w^1_{1,5} \cdot a^1_{19} + w^1_{1,6} \cdot a^1_{20} + w^1_{1,7} \cdot a^1_{23} + w^1_{1,8} \cdot a^1_{24} + w^1_{1,9} \cdot a^1_{25}, \ldots, w^1_{C,1} \cdot a^C_{13} + w^1_{C,2} \cdot a^C_{14} + w^1_{C,3} \cdot a^C_{15} + w^1_{C,4} \cdot a^C_{18} + w^1_{C,5} \cdot a^C_{19} + w^1_{C,6} \cdot a^C_{20} + w^1_{C,7} \cdot a^C_{23} + w^1_{C,8} \cdot a^C_{24} + w^1_{C,9} \cdot a^C_{25}$. As shown above, output element $o^1_9$ of converted output data matrix 216 is equal to output element $o^1_8$ of output feature maps 206.

Embodiments of the present disclosure advantageously provide a collision-free SIMD scatter accumulate instruction that accumulates values from an input vector into an output vector at the output elements specified by the indices of an index vector. Different embodiments of the scatter accumulate operation account for different levels of anticipated collision, where a collision means two or more input elements adding to the same output accumulator. These embodiments include a no-collision embodiment, a subdivided embodiment in which no collisions occur within partial sub-vectors, and a full-collision embodiment. Weight-quantized ANN model layers may be tailored to accommodate these embodiments during training. In many embodiments, the SIMD scatter accumulate instruction advantageously improves throughput in the most computationally expensive portion of processing matrix multiplication involving sub-byte weights (e.g., 1-bit, 2-bits, 3-bits, 4-bits, etc.) and higher precision activations.

Embodiments of the present disclosure also advantageously provide an ANN accelerator crossbar array that accumulates values from an input vector into an output vector at the output elements specified by index control signals generated from the indices of an index vector. These embodiments also include a no-collision embodiment, a sub-divided embodiment in which no collisions occur within partial sub-vectors, and a full-collision embodiment.

Embodiments of the present disclosure also advantageously provide a matrix decomposition/restructuring method for sub-byte matrices that, in conjunction with the SIMD scatter accumulate instruction or ANN accelerator crossbar array, advantageously provide parsimonious memoization to accelerate the matrix multiplication of mixed-precision ANN layers. A mixed-precision ANN layer typically multiplies lower-precision weights against higher-precision activations.

Generally, the matrix decomposition/restructuring method computes and caches the results of maximal subexpressions that are found across the recurring columns of the sub-byte matrix (i.e., binary matrix, ternary matrix, etc.), since such subexpressions repeat between the rows and, as such, are redundantly recomputed in naïve, brute-force matrix multiplication. The matrix decomposition/restructuring method then uses the cached results to efficiently compute products of the rows of the sub-byte matrix with the columns of the higher-precision matrix.

Matrix multiplication between sub-byte weights (binary weights, ternary weights, etc.) and higher-precision activations is becoming more important for machine learning (ML) applications in general, and for ANN workloads in particular, because, quite simply, multiplications are replaced by additions and subtractions. For example, ANN's with binary or ternary weights encode the weights as 1 bit or 2 bit numbers (respectively), while activations are represented using more bits, such as, for example, 8 bits (e.g., 8-bit integer), 16 bits (e.g., 16-bit integer), 32 bits (e.g., 32-bit integer or 32-bit floating point), etc. One obvious performance benefit of ANNs with sub-byte weights is the reduced model memory footprint. Embodiments support signed, unsigned, twos-compliment or ones-compliment values.

Additionally, using the previously computed results of common subexpressions, i.e., memoization, also improves performance. Memoization is an optimization technique that improves the execution speed of an application by caching the results of subexpressions computed on an input sequence and returning the cached results when the precomputed inputs recur. In the case of multiplication between a sub-byte matrix (i.e., binary matrix, ternary matrix, etc.) and a higher-precision matrix, common subexpressions are very likely to occur due to the reduced cardinality of the sub-byte values. However, certain memoization techniques may require additional memory to cache the results of common subexpressions for all combinations of input values.

A naïve method with memoization for matrix multiplication between sub-byte weights (i.e., binary weights, ternary weights, etc.) and higher-precision activations requires caching the results of common subexpressions for all combinations of the input weight values without regard to the recurrence frequency of any particular input sequence. Embodiments of the present disclosure advantageously provide a matrix decomposition/restructuring method for sub-byte matrices that provides parsimonious memoization during matrix multiplication between the sub-byte matrices and higher-precision matrices without incurring memory overhead cost.

Embodiments of the matrix decomposition/restructuring method, SIMD scatter accumulate instruction and ANN accelerator crossbar array advantageously improve vector acceleration of matrix multiplication kernels with sub-byte weights and higher-precision activations with reduced hardware overhead to attain the best performance with respect to area, energy and timing.

More particularly, embodiments of the present disclosure address several challenges created by multiplying sub-byte weights with higher-precision activations, including, inter alia, redundant computation due to cardinality of sub-byte compute in absence of memoization, increased memory overhead with naïve memoization to avoid redundant compute, and increased ($N^2$) hardware cost if implemented with a naively vectorized Scatter Accumulate operation with parsimonious memoization.

Figure 4A:
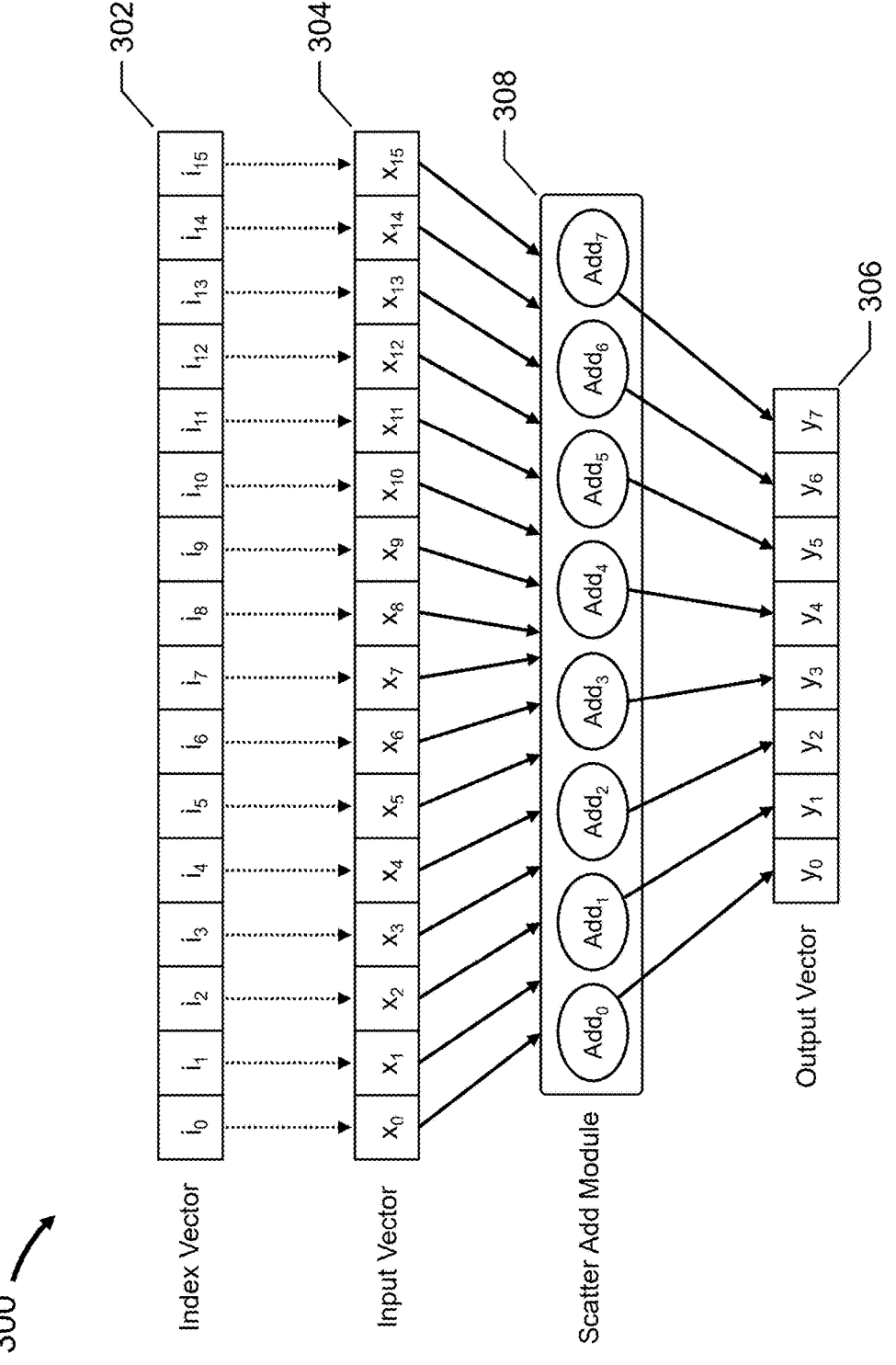
FIGS. 4A, 4B and 4C illustrate scatter add operations, in accordance with embodiments of the present disclosure.

FIG. 4A illustrates scatter add operation 300, in accordance with an embodiment of the present disclosure.

Scatter add operation 300 depicts a scatter accumulate module 308 that accumulates the values from input vector 304 into output vector 306 at the indices specified by index vector 302. Input vector 304 has 16 elements, i.e., $x_0$, $x_1$, $x_2$, $x_3$, $x_4$, $x_5$, $x_6$, $x_7$, $x_8$, $x_9$, $x_{10}$, $x_{11}$, $x_{12}$, $x_{13}$, $x_{14}$ and $x_{15}$, index vector 302 has $1_6$ elements, i.e., $i_0$, $i_1$, $i_2$, $i_3$, $i_4$, $i_5$, $i_6$, $i_7$, $i_8$, $i_9$, $i_{10}$, $i_{11}$, $i_{12}$, $i_{13}$, $i_{14}$ and $i_{15}$, and output vector 306 has 8 elements, i.e., $y_0$, $y_1$, $y_2$, $y_3$, $y_4$, $y_5$, $y_6$ and $y_7$. Scatter accumulate module 308 includes one adder circuit one for each element of output vector 306, i.e., $add_0$, $add_1$, $add_2$, $add_3$, $add_4$, $add_5$, $add_6$ and $add_7$ corresponding to $y_0$, $y_1$, $y_2$, $y_3$, $y_4$, $y_5$, $y_6$ and $y_7$, respectively. Each element of index vector 302 is associated with an element of input vector 304 (i.e., index $i_0$ is associated with input $x_0$, index $i_1$ is associated with input $x_1$, etc.), and identifies the $add_i$ circuit into which the associated element of input vector 304 is to be accumulated (i.e., an index value of 0 identifies $add_0$ circuit, an index value of 1 identifies $add_1$ circuit, etc.). If multiple elements or indices refer to the same $add_i$ circuit, then the respective contributions combine and produce a collision.

Figure 4B:
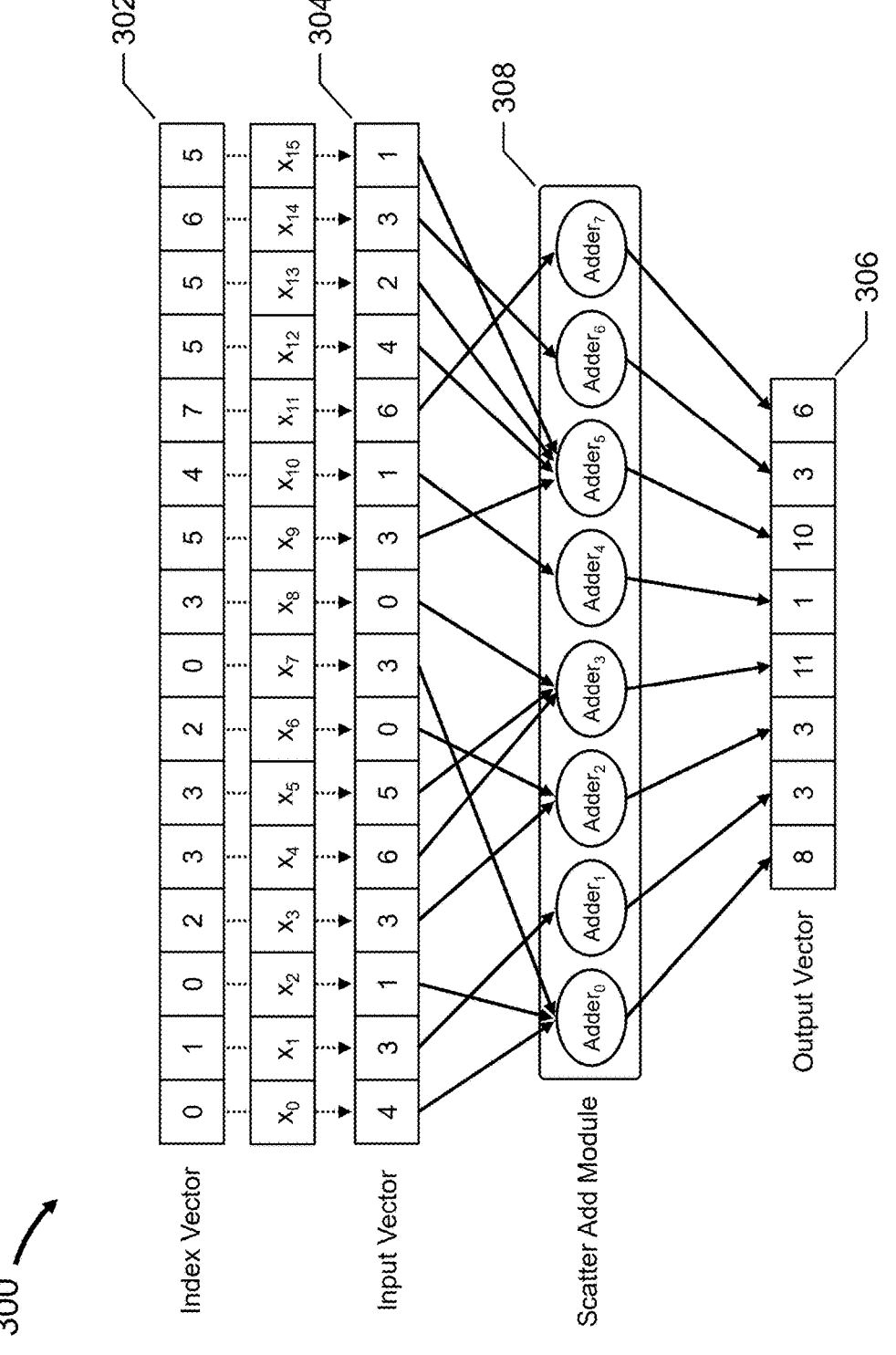

FIG. 4B illustrates another view of scatter add operation 300, in accordance with an embodiment of the present disclosure.

In this view, example values have been provided for index vector 302, input vector 304 and output vector 306. Index vector 302 includes the values, 0, 1, 0, 2, 3, 3, 2, 0, 3, 5, 4, 7, 5, 5, 6 and 5, and input vector 304 includes the values 4, 3, 1, 3, 6, 5, 0, 3, 0, 3, 1, 6, 4, 2, 3 and 1. Based on index vector 302, $add_0$ circuit accumulates $x_0$, $x_2$ and $x_7$ to generate $y_0$ (i.e., 4+1+3=8), $add_1$ circuit accumulates $x_1$ to generate $y_1$ (i.e., 3=3), $add_2$ circuit accumulates $x_3$ and $x_6$ to generate $y_2$ (i.e., 3+0=3), $add_3$ circuit accumulates $x_4$, $x_5$ and $x_8$ to generate $y_3$ (i.e., 6+5+0=$1_1$), $add_4$ circuit accumulates $x_{10}$ to generate $y_4$ (i.e., 1=1), $add_5$ circuit accumulates $x_9$, $x_{12}$, $x_{13}$ and $x_{15}$ to generate $y_5$ (i.e., 3+4+2+1=10), $add_6$ circuit accumulates $x_{14}$ to generate $y_6$ (i.e., 3=3) and $add_7$ circuit accumulates $x_{11}$ to generate $y_7$ (i.e., 6=6).

Figure 4C:
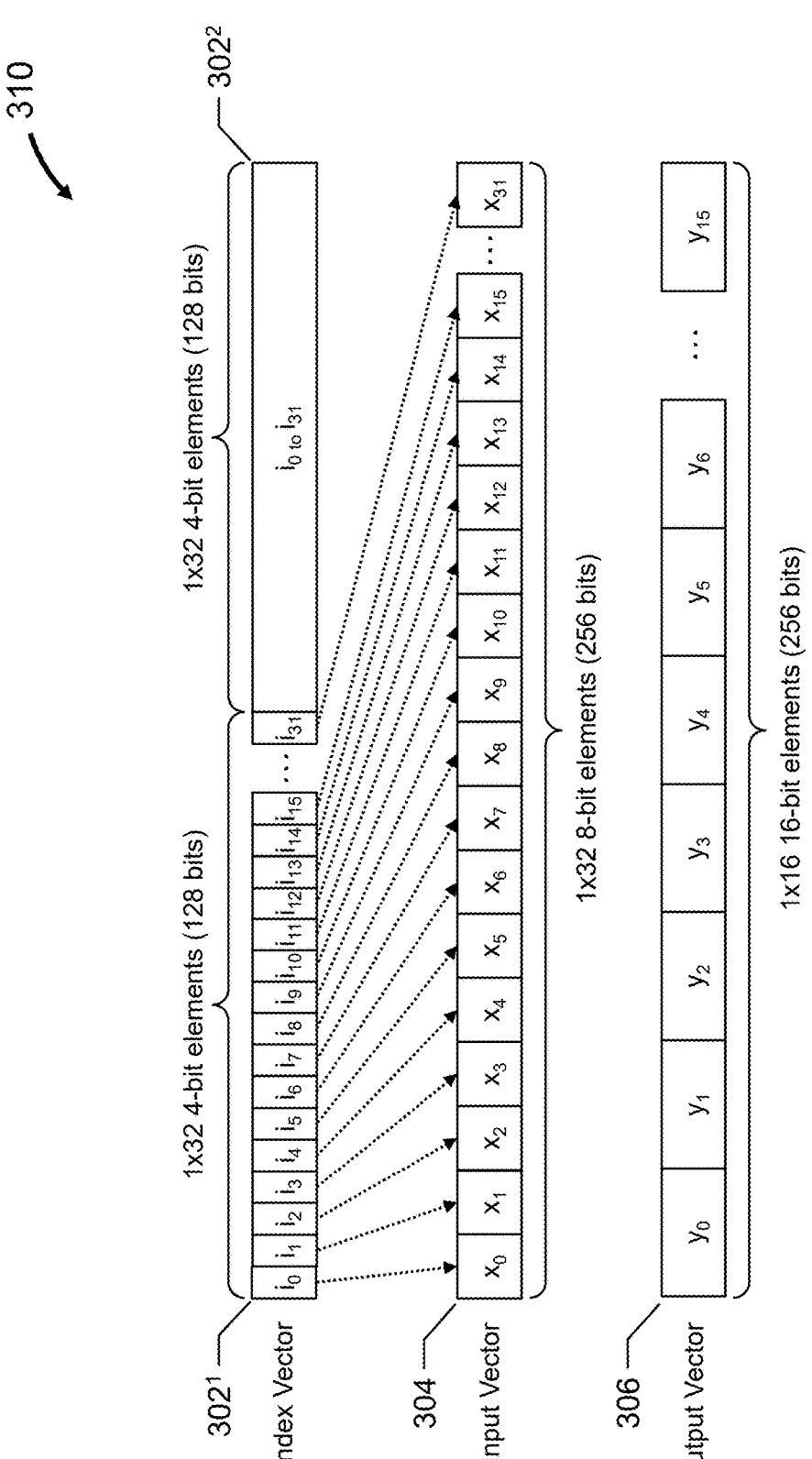

FIG. 4C illustrates a scatter add operation 310, in accordance with an embodiment of the present disclosure.

Input vector 304 has thirty-two (32) 8-bit elements, i.e., $x_0$, $x_1$, $x_2$, $x_3$, $x_4$, $x_5$, $x_6$, $x_7$, $x_8$, $x_9$, $x_{10}$, $x_{11}$, $x_{12}$, $x_{13}$, $x_{14}$, $x_{15}$, ..., $x_{31}$ (256 bits), index vector $302^1$ has thirty-two (32) 4-bit elements, i.e., $i_0$, $i_1$, $i_2$, $i_3$, $i_4$, $i_5$, $i_6$, $i_7$, $i_8$, $i_9$, $i_{10}$, $i_{11}$, $i_{12}$, $i_{13}$, $i_{14}$, $i_{15}$, ..., $i_{31}$ (128 bits), and output vector 306 has sixteen (16) 16-bit elements, i.e., $y_0$, $y_1$, $y_2$, $y_3$, $y_4$, $y_5$, $y_6$, $y_7$, ..., $y_{15}$ (256 bits). Scatter accumulate module (not depicted for clarity) includes one adder circuit one for each element of output vector 306 corresponding to $y_0$, $y_1$, $y_2$, $y_3$, $y_4$, $y_5$, $y_6$, $y_7$, ..., $y_{15}$, respectively. Each element of index vector 302 is associated with an element of input vector 304 (i.e., index $i_0$ is associated with input $x_0$, index $i_1$ is associated with input $x_1$, etc.), and identifies the $add_i$ circuit into which the associated element of input vector 304 is to be accumulated. An additional index vector $302^2$ is also depicted (discussed below). Index vector $302^2$ has thirty-two (32) 4-bit elements that are associated with the next input vector 304 (not depicted for clarity).

Figure 5A:
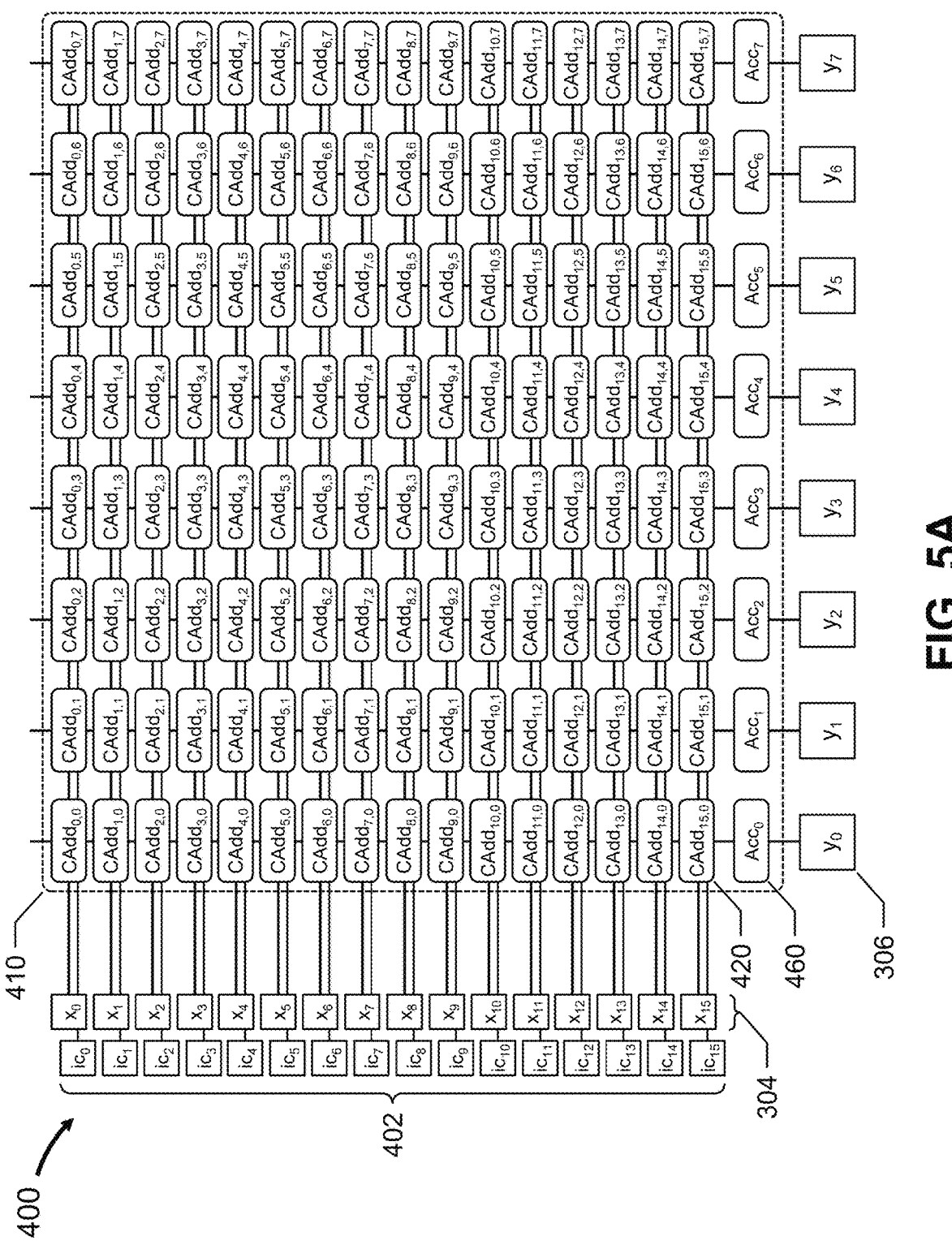
FIGS. 5A, 5B, 5C and 5D illustrate scatter accumulate operations, in accordance with embodiments of the present disclosure.

FIG. 5A illustrates scatter accumulate operation 400, in accordance with an embodiment of the present disclosure.

Scatter accumulate operation 400 depicts a naïve implementation that uses a crossbar array 410 with conditional adders (CAdd) 420 and accumulators (Acc) 460 to accumulate the values from input vector 304 into output vector 306 based on the values specified by index control vector 402. Input vector 304 has 16 elements, i.e., $x_0$, $x_1$, $x_2$, $x_3$, $x_4$, $x_5$, $x_6$, $x_7$, $x_8$, $x_9$, $x_{10}$, $x_{11}$, $x_{12}$, $x_{13}$, $x_{14}$ and $x_{15}$, index control vector 402 has 16 elements, i.e., $ic_0$, $ic_1$, $ic_2$, $ic_3$, $ic_4$, $ic_5$, $ic_6$, $ic_7$, $ic_8$, $ic_9$, $ic_{10}$, $ic_{11}$, $ic_{12}$, $ic_{13}$, $ic_{14}$ and $ic_{15}$, and output vector 306 has 8 elements, i.e., $y_0$, $y_1$, $y_2$, $y_3$, $y_4$, $y_5$, $y_6$ and $y_7$. Crossbar array 410 includes 16 rows and 8 columns. Each element of index control vector 402 is 8 bits wide, each bit is associated with one column of crossbar array 410, and each element $ic_i$ of index control vector 402 has one bit set to 1 and the remaining bits set to 0 to identify the corresponding element of output vector 306 (i.e., the corresponding column of crossbar array 410).

Crossbar array 410 includes 128 conditional adders 420 and 8 accumulators 460; other crossbar array 410 dimensions (i.e., rows and columns), conditional adder 420 and accumulator 460 configurations are also supported. The first row of crossbar array 410 includes 8 conditional adders 420 (i.e., $CAdd_{0,0}$, . . . , $CAdd_{0,7}$), the second row of 410 includes 8 conditional adders 420 (i.e., $CAdd_{1,0}$, . . . , $CAdd_{1,7}$), and so on; the last row of crossbar array 410 includes 8 conditional adders 420 (i.e., $CAdd_{15,0}$, . . . , $CAdd_{15,7}$). Similarly, the first column of crossbar array 410 includes 8 conditional adders 420 (i.e., $CAdd_{0,0}$, . . . , $CAdd_{15,0}$) and an accumulator 460 (i.e., $Acc_0$), the second column of crossbar array 410 includes 8 conditional adders 420 (i.e., $CAdd_{0,1}$, . . . , $CAdd_{15,1}$) and an accumulator 460 (i.e., $Acc_1$), and so on; the last column of crossbar array 410 includes 8 conditional adders 420 (i.e., $CAdd_{0,7}$, . . . , $CAdd_{15,7}$) and an accumulator 460 (i.e., $Acc_7$).

The conditional adders 420 within each row of crossbar array 410 are individually coupled to a register that stores one element of input vector 304 (e.g., $x_0$) and a register that stores one element of index control vector 402 (e.g., $ic_0$). The conditional adders 420 within each column of crossbar array 410 are coupled together in series, and the bottom conditional adder 420 of each column (e.g., $CAdd_{15,0}$) is coupled to an accumulator 460 (e.g., $Acc_0$), which is coupled to a register that stores one element of output vector 306 (e.g., $y_0$).

Figure 5B:
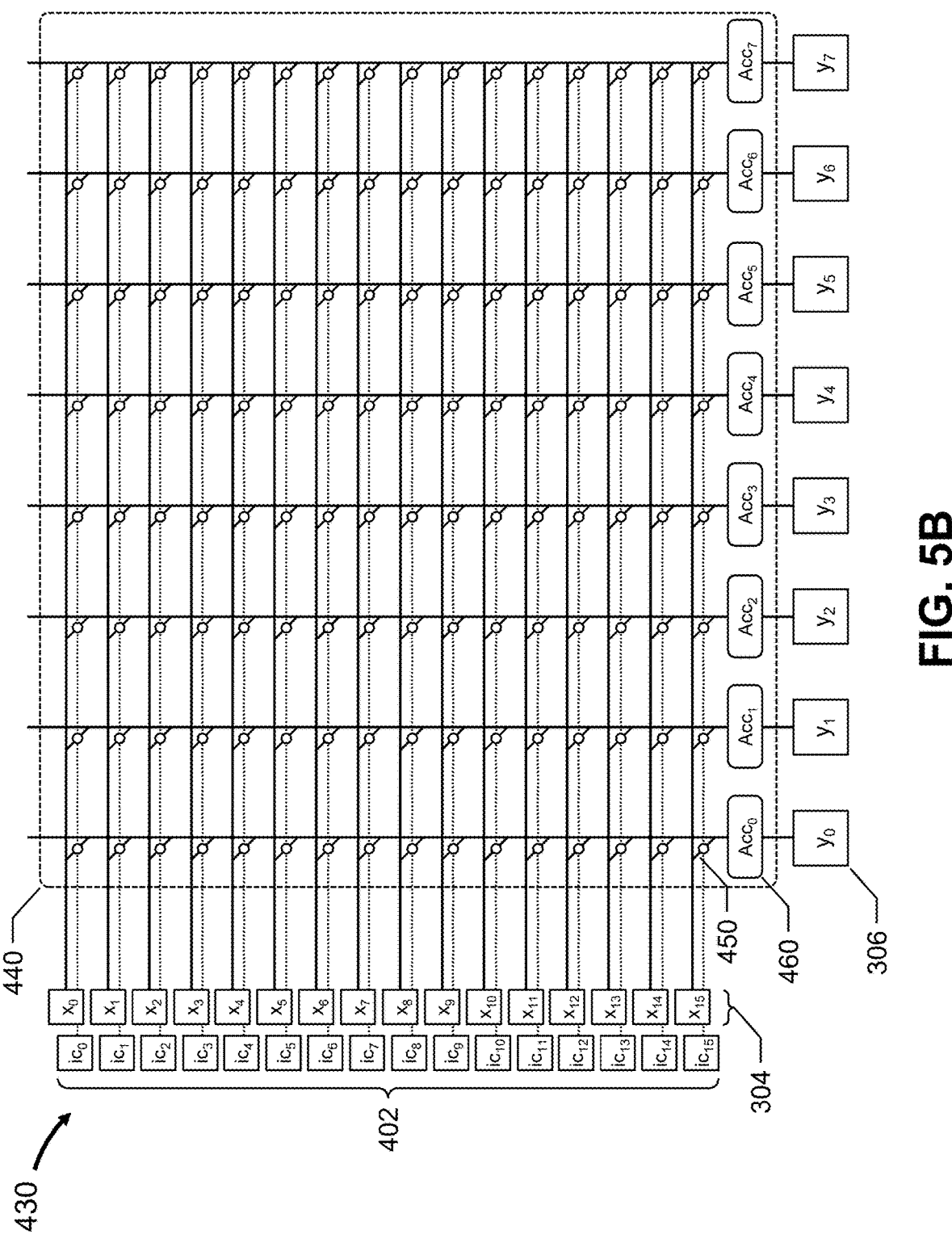
Figure 5C:
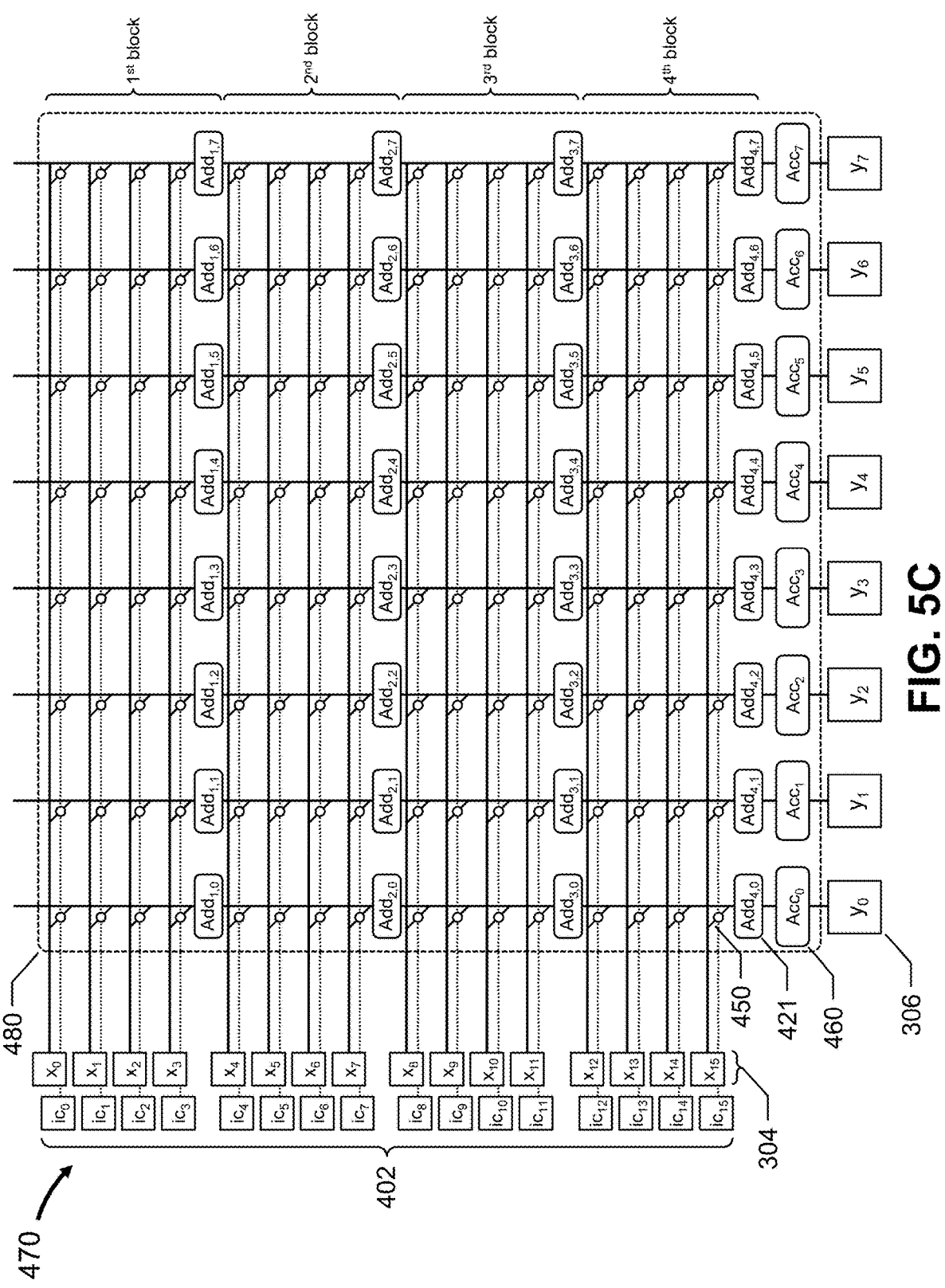
Figure 5D:
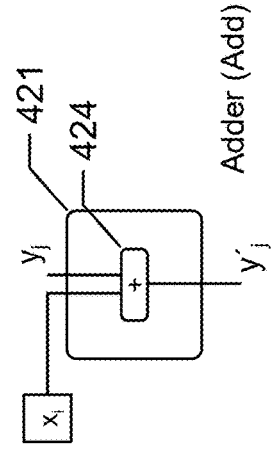
Figure 5D:
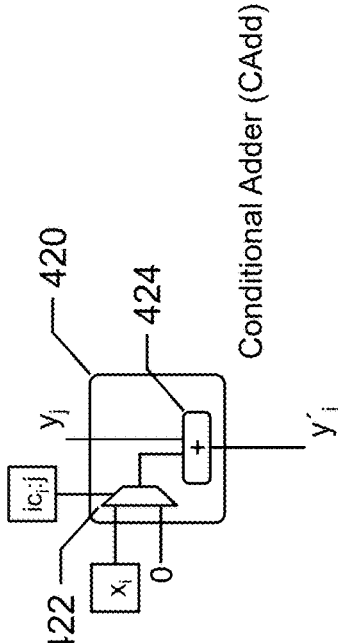
Figure 5D:
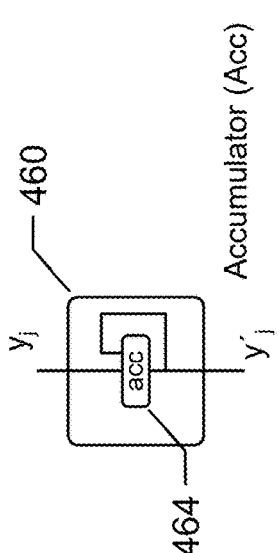

As depicted in FIG. 5D, each conditional adder 420 includes multiplexer 422 and adder circuit 424 and is located at row i and column j. Multiplexer 422 receives one element of input vector 304 (i.e., $x_i$) and one bit from the associated element of index control vector 402 (i.e., $ic_i$:j), and outputs the value of the element of input vector 304 when the bit from the element of index control vector 402 is equal to 1, and outputs a value of 0 when the bit from the element of index control vector 402 is equal to 0. Adder circuit 424 receives the output from multiplexer 422 and the value $y_j$ from the conditional adder 420 located in the row above (conditional adders $CAdd$ $420_{0,j}$ in the first row set this value to zero), adds the two values and outputs the new value $y'_j$. Accumulator 460 includes accumulator circuit 464 that receives and accumulates the value $y_j$, and then outputs the new accumulated value $y'_j$.

For example, to accumulate $x_0$, $x_2$ and $x_7$ into $y_0$, the value for the associated elements in index vector 302 are 0 (e.g., $i_0$, $i_2$ and $i_7$), the values for $ic_0$, $ic_2$ and $ic_7$ are 1 (binary 0000 0001), and three CAdds would contribute to element $y_0$ of output vector 306, i.e., $CAdd_{0,0}$, $CAdd_{2,0}$, and $CAdd_{7,0}$. Because a conditional adder 420 with multiplexer 422 and adder circuit 424 is placed at each intersection of crossbar array 410, the area and energy cost is increased by $O(N^2)$ to perform N additions (for an N-wide SIMD), and 1/N adder circuits 424 are used per operation.

Embodiments of the present disclosure also advantageously provide sub-vector collision free scatter accumulate operations that reduce the area and energy cost from $O(N^2)$ to $O(N)$. Avoidance of collisions in the scatter accumulate operation improves the throughput of computations involving sub-byte weights (e.g., five to six times) without excessively adding hardware cost. The forced absence of collisions within sub-vectors may be intentionally encouraged during ANN training.

FIG. 5B illustrates scatter accumulate operation 430, in accordance with an embodiment of the present disclosure.

Scatter accumulate operation 430 uses a crossbar array 440 with programmable impedance nodes (PINs) 450 at each intersection and an accumulator 460 directly before each element of output vector 306 to accumulate the values from input vector 304 into output vector 306 based on the values specified by index control vector 402. Crossbar array 440 includes 128 PINs 450 and 8 accumulators 460; other crossbar array 440 dimensions (i.e., rows and columns), PIN 450 and accumulator 460 configurations are also supported. The first column includes accumulator $Acc_0$, the second column includes accumulator $Acc_1$, and so on. In this embodiment, the elements of index vector 302 and index control vector 402 do not reference the same element of output vector 306, and multiple processing cycles are necessary to accumulate multiple elements of input vector 304 into a single output element of output vector 306.

During each processing cycle, each programmable impedance node 450 receives one element of input vector 304 (e.g., $x_0$) and one bit from the associated element of index control vector 402 (e.g., $ic_0$:0), changes to a low impedance state to pass the value of the element of input vector 304 when the bit from the element of index control vector 402 is equal to 1, and changes to a high impedance state to block the value of the element of input vector 304 when the bit from the element of index control vector 402 is equal to 0. Each accumulator 460 receives and accumulates each passed element $y_j$ in the column, and outputs the final accumulated value $y'_j$.

FIG. 5C illustrates scatter accumulate operation 470, in accordance with an embodiment of the present disclosure.

Scatter accumulate operation 470 uses a crossbar array 480 with programmable impedance nodes 450 at each intersection, adders 421 that divide each column into separate blocks or sub-vectors of consecutive index values, and an accumulator 460 directly before each element of output vector 306 to accumulate the values from input vector 304 into output vector 306 based on the values specified by index control vector 402. Crossbar array 480 includes 128 PINs 450, 32 adders 421 and 8 accumulators 460; other crossbar array 480 dimensions (i.e., rows and columns), block, adder 421 and accumulator 460 configurations are also supported.

Four blocks are depicted in FIG. 5C, i.e., a first block, a second block, a third block and a fourth block. The first block includes 8 adders 421 (i.e., $Add_{1,0}$, . . . . $Add_{1,7}$), the second block includes 8 adders 421 (i.e., $Add_{2,0}$, . . . . $Add_{2,7}$), the third block includes 8 adders 421 (i.e., $Add_{3,0}, \ldots Add_{3,7}$), and the fourth block includes 8 adders 421 (i.e., $Add_{4,0}, \ldots Add_{4,7}$). As depicted in FIG. 5D, adder 421 include adder circuit 424 that receives the passed element $x_i$ within the block and the value $y_j$ from the adder 421 located in the block above (adders $Add_{1,i}$ in the first block set this value to zero), adds the two values and outputs the new value $y'_j$.

In this embodiment, the elements of index vector 302 within each block do not reference the same element of output vector 306, so multiple processing cycles are not necessary and inter-block collisions, or references to the same output from different sub-vectors, are supported. The inter-block collision avoidance is a lesser constraint on the indices than full-collision avoidance, so inter-block collisions either happen naturally with higher probability or may be statistically discouraged during ANN training.

Referring to FIG. 4C, index vector $302^1$ has thirty two 4-bit elements, input vector 304 has thirty two 8-bit elements and output vector 306 has sixteen 16-bit elements. Four-bit indices represent 16 values in output vector 306 and are sufficient to exploit memoization over 4 consecutive rows of the sub-byte (e.g., binary, ternary, etc.) weight matrix. Generally, the scatter accumulate operation may be expressed in pseudocode. In certain embodiments, the scatter accumulate operation may be expressed as a "ScatterAccum" instruction:

ScatterAccum V0, V1, V2 //where V0 is output vector 306,

V1 is input vector 304, and V2 is index vector 302.

In one embodiment, input vector 304 is advanced by 256 bits with each load into the input register, index vector 302 is advanced by 128 bits with each load into the index register and 50% of the index register is consumed with each scatter accumulate operation. However, because the load width is 256 bits, this embodiment produces overlapping loads to the index register over the length of the kernel, i.e., input vector 304.

In another embodiment, the ScatterAccum instruction may be divided into two separate instructions, i.e., a ScatterAddTop instruction and ScatterAddBottom instruction. The ScatterAddTop instruction uses the upper 128 bits of index vector 302, while the ScatterAddBottom instruction uses the lower 128 bits of index vector 302. Advantageously, the kernel loop is unrolled once and written such that the index register is only loaded into once for every 2 loads to the input register, thereby saving 256 bits worth of load throughput per 2 iterations (i.e., a 25% reduction).

In certain embodiments, the scatter accumulate operation for iterating over an index vector and an input vector of N elements and performing a scatter accumulate operation to reduce them onto a 16-element output vector using the ScatterAddTop instruction and ScatterAddBottom instruction at 256-bit vector width may be expressed as:

```
LOAD C0                    // 256-bit Load
for ii in range((N/32)/2): // 64 elements per iteration, 32 elements
                              per vector scatter-accumulate operation,
                              loop unrolled once
LOAD A0                    // 256-bit Load, 1 input vector of 32 × 8 bits
LOAD B0                    // 256-bit Load, 2 index vectors of 32 × 4
                              bits (upper and lower 128b)
ScatterAccum Top           // Add A0 input vector into C0 using upper
C0, A0, B0                   128b B0 index vector
LOAD A1                    // 256-bit Load
ScatterAccumBottom         // Add A1 input vector into C0 using lower
C0, A1, B0                   128b B0 index vector
```

Figure 6A:
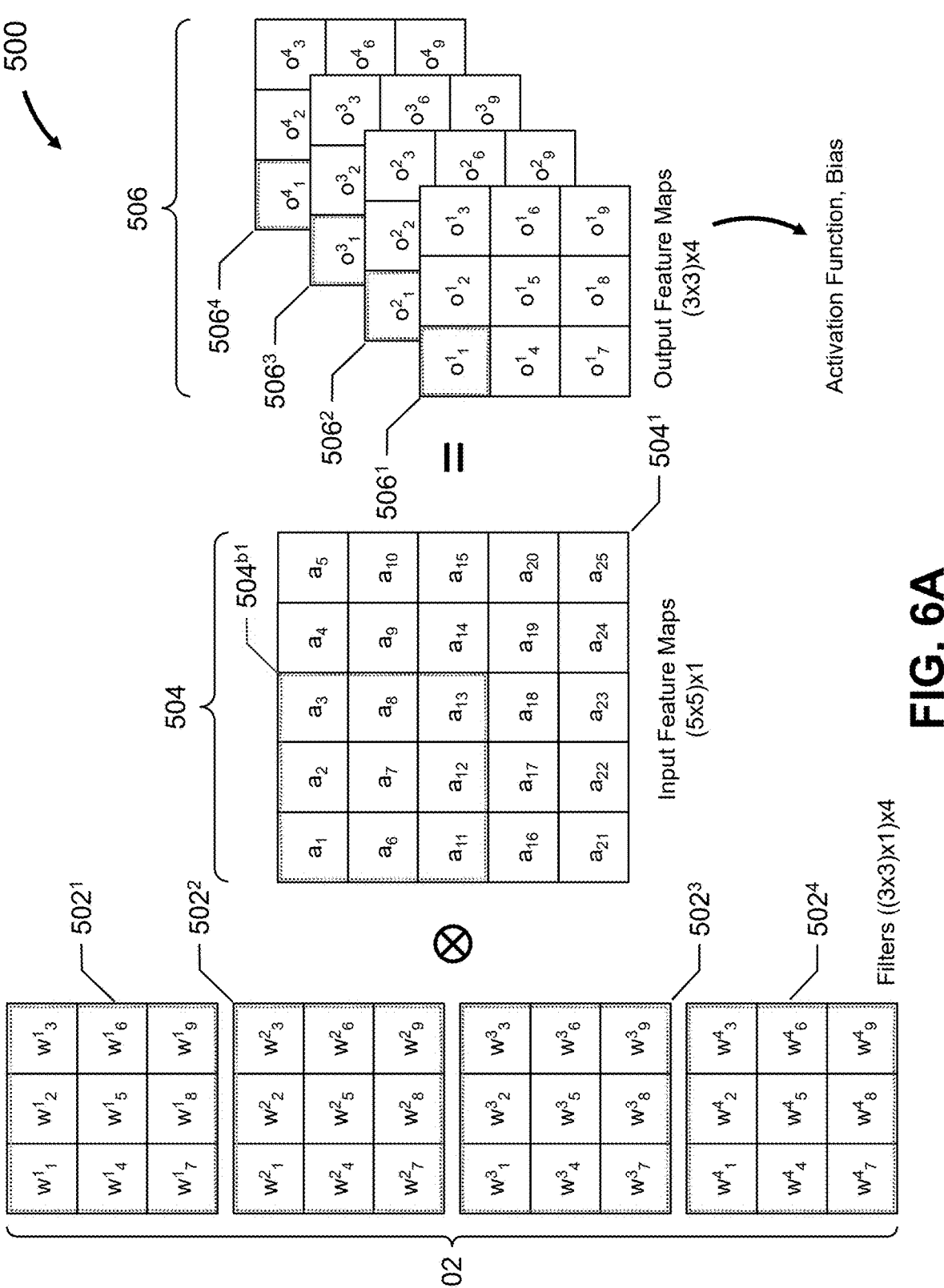
FIG. 6A depicts a convolutional layer calculation for a CNN, in accordance with an embodiment of the present disclosure.

FIG. 6A depicts convolutional layer calculation 500 for a CNN, in accordance with an embodiment of the present disclosure.

Convolutional layer calculation 500 presents a simplified version of convolutional layer calculation 200 that includes 4 filters and 1 channel (i.e., F equals 4 and C equals 1). Convolutional layer calculation 500 convolves filter 502 with input feature maps 504 to produce output feature maps 506. Filter 502 includes 4 filter or weight sets $502^1$, $502^2$, $502^3$ and $502^4$, including one 3×3 weight matrix. Input feature maps 504 includes one 5×5 input data matrix $504^1$, and the first block $504^{b1}$ within the first sector of input data matrix $504^1$ is also depicted. Output feature maps 506 include four 3×3 converted output data matrices $506^1$, $506^2$, $506^3$ and $506^4$.

Figure 6B:
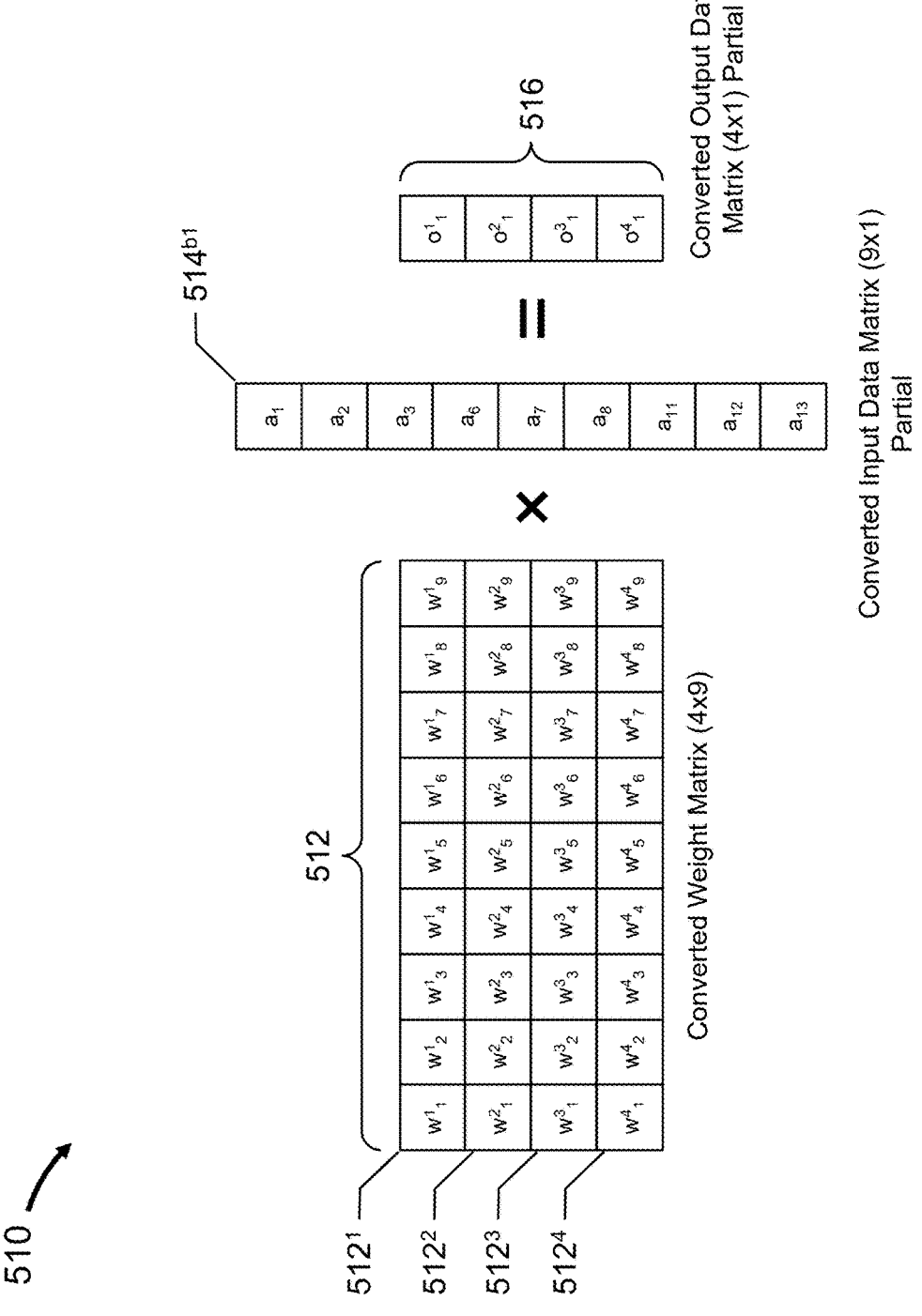
FIG. 6B depicts a converted convolutional layer calculation for a CNN, in accordance with an embodiment of the present disclosure.

FIG. 6B depicts converted convolutional layer calculation 510 for a CNN, in accordance with an embodiment of the present disclosure.

Converted weight matrix 512 is a 4×9 matrix, and includes converted weight sets $512^1$, $512^2$, $512^3$ and $512^4$. Each weight set $502^i$ is a 3×3 matrix that is flattened to form a respective converted weight set $512^i$, which forms a single row of converted weight matrix 512. More particularly, the first row of converted weight matrix 512 is converted weight set $512^1$ (i.e., weights $w^1_1$, $w^1_2$, $w^1_3$, $w^1_4$, $w^1_5$, $w^1_6$, $w^1_7$, $w^1_8$ and $w^1_9$), the second row of converted weight matrix 512 is converted weight set $512^2$ (i.e., weights $w^2_1$, $w^2_2$, $w^2_3$, $w^2_4$, $w^2_5$, $w^2_6$, $w^2_7$, $w^2_8$ and $w^2_9$), the third row of converted weight matrix 512 is converted weight set $512^3$ (i.e., weights $w^3_1$, $w^3_2$, $w^3_3$, $w^3_4$, $w^3_5$, $w^3_6$, $w^3_7$, $w^3_8$ and $w^3_9$), and the fourth row of converted weight matrix 512 is converted weight set $5124^1$ (i.e., weights $w^4_1$, $w^4_2$, $w^4_3$, $w^4_4$, $w^4_5$, $w^4_6$, $w^4_7$, $w^4_8$ and $w^4_9$).

Converted input data matrix 514 (partial) is a 9×1 matrix, and includes first block $504^{b1}$ of input data matrix $504^1$ which is flattened to form a single column.

Converted output data matrix 516 (partial) is an 4×1 matrix, and includes a flattened version (partial) of converted output data matrices $506^1$, $506^2$, $506^3$, and $506^4$, i.e., the first elements of converted output data matrices $506^1$, $506^2$, $506^3$, and $506^4$.

The calculation of first output elements $o^1_1$, $o^2_1$, $o^3_1$ and $o^4_1$ of converted output data matrices $506^1$, $506^2$, $506^3$, and $506^4$ is as follows.

Output element $o^1_1$ is the dot product of the first row of converted weight matrix 512, i.e., converted weight set $512^1$, and the first column of converted input data matrix 514, i.e., flattened first block $504^{b1}$. More particularly, output element $o^1_1$ is equal to $w^1_1 \cdot a_1 + w^1_2 \cdot a_2 + w^1_3 \cdot a_3 + w^1_4 \cdot a_6 + w^1_5 \cdot a_7 + w^1_6 \cdot a_8 + w^1_7 \cdot a_{11} + w^1_8 \cdot a_{12} + w^1_9 \cdot a_{13}$.

Output element $o^2_1$ is the dot product of the second row of converted weight matrix 512, i.e., converted weight set $512^2$, and the first column of converted input data matrix 514, i.e., flattened first block $504^{b1}$. More particularly, output element $o^2_1$ is equal to $w^2_1 \cdot a_1 + w^2_2 \cdot a_2 + w^2_3 \cdot a_3 + w^2_4 \cdot a_6 + w^2_5 \cdot a_7 + w^2_6 \cdot a_8 + w^2_7 \cdot a_{11} + w^2_8 \cdot a_{12} + w^2_9 \cdot a_{13}$.

Output element $o^3_1$ is the dot product of the second row of converted weight matrix 512, i.e., converted weight set $512^3$, and the first column of converted input data matrix 514, i.e., flattened first block $504^{b1}$. More particularly, output element $o^3_1$ is equal to $w^3_1 \cdot a_1 + w^3_2 \cdot a_2 + w^3_3 \cdot a_3 + w^3_4 \cdot a_6 + w^3_5 \cdot a_7 + w^3_6 \cdot a_8 + w^3_7 \cdot a_{11} + w^3_8 \cdot a_{12} + w^3_9 \cdot a_{13}$.

Output element $o^4_1$ is the dot product of the second row of converted weight matrix 512, i.e., converted weight set $512^4$, and the first column of converted input data matrix 514, i.e., flattened first block $504^{b1}$. More particularly, output element $o^4_1$ is equal to $w^4_1 \cdot a_1 + w^4_2 \cdot a_2 + w^4_3 \cdot a_3 + w^4_4 \cdot a_6 + w^4_5 \cdot a_7 + w^4_6 \cdot a_8 + w^4_7 \cdot a_{11} + w^4_8 \cdot a_{12} + w^4_9 \cdot a_{13}$.

Figure 6C:
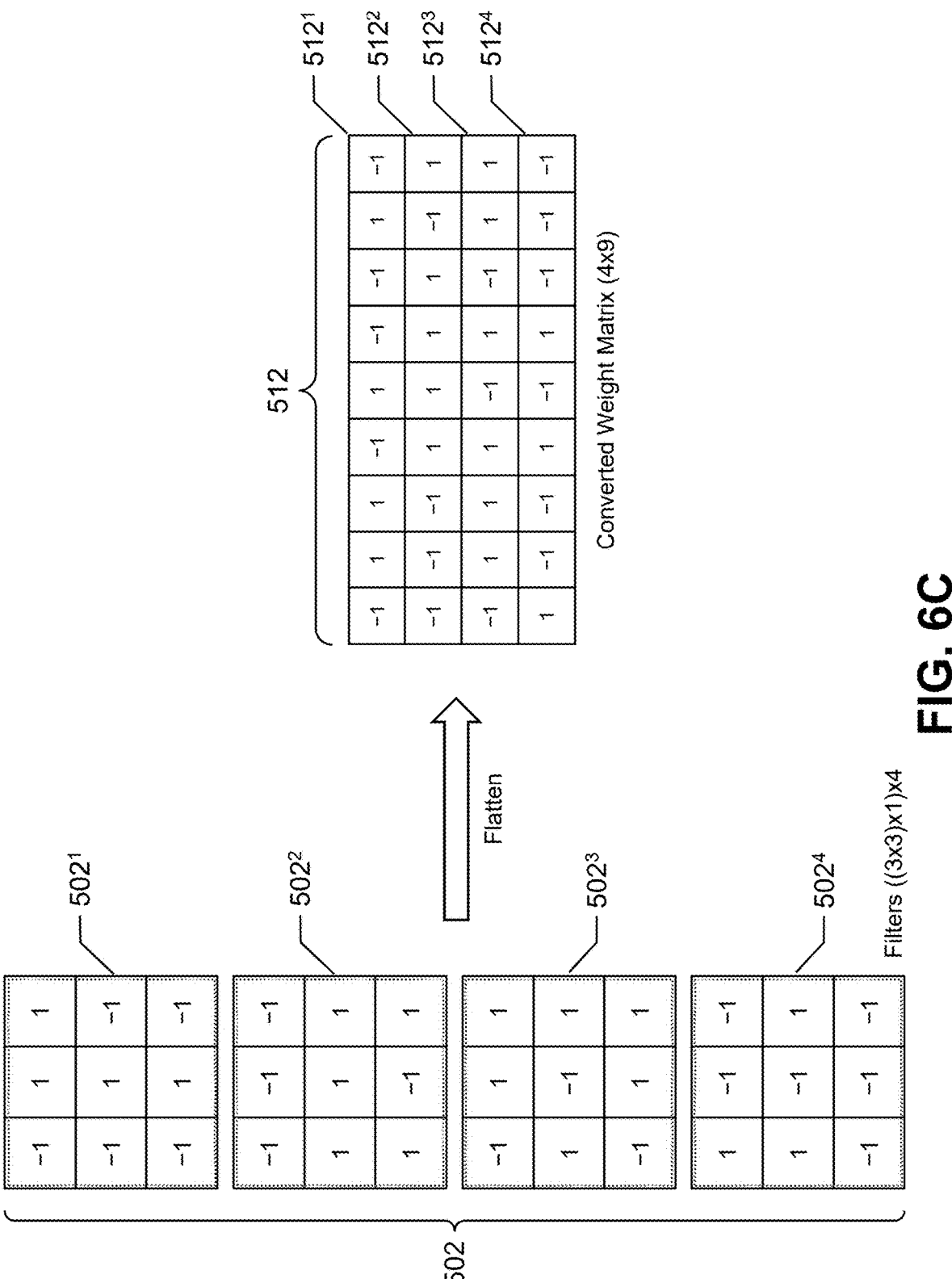
FIG. 6C depicts a filter and a converted weight set, in accordance with an embodiment of the present disclosure.

FIG. 6C depicts filter 502 and converted weight matrix 512, in accordance with an embodiment of the present disclosure.

In this view, example values have been provided for filter 502, which has been flattened into converted weight matrix 512. Binary weights are 1-bit weights that have values of 1 or −1. Ternary weights are 2-bit weights that have values of −1, 0 or 1. More generally, 1-bit unsigned weights have values of 0 or 1, 2-bit unsigned weights have values of 0, 1, 2 or 3, 3-bit unsigned weights may have values of 0, 1, 2, 3, 4, 5, 6 or 7, 3-bit signed weights have values of −4, −3, −2, −1, 0, 1, 2 or 3, etc. While binary weights are depicted for the purposes of explanation, other sub-byte weights are also supported, such as, for example, 2-bit signed integer weights described below.

Figure 6D:
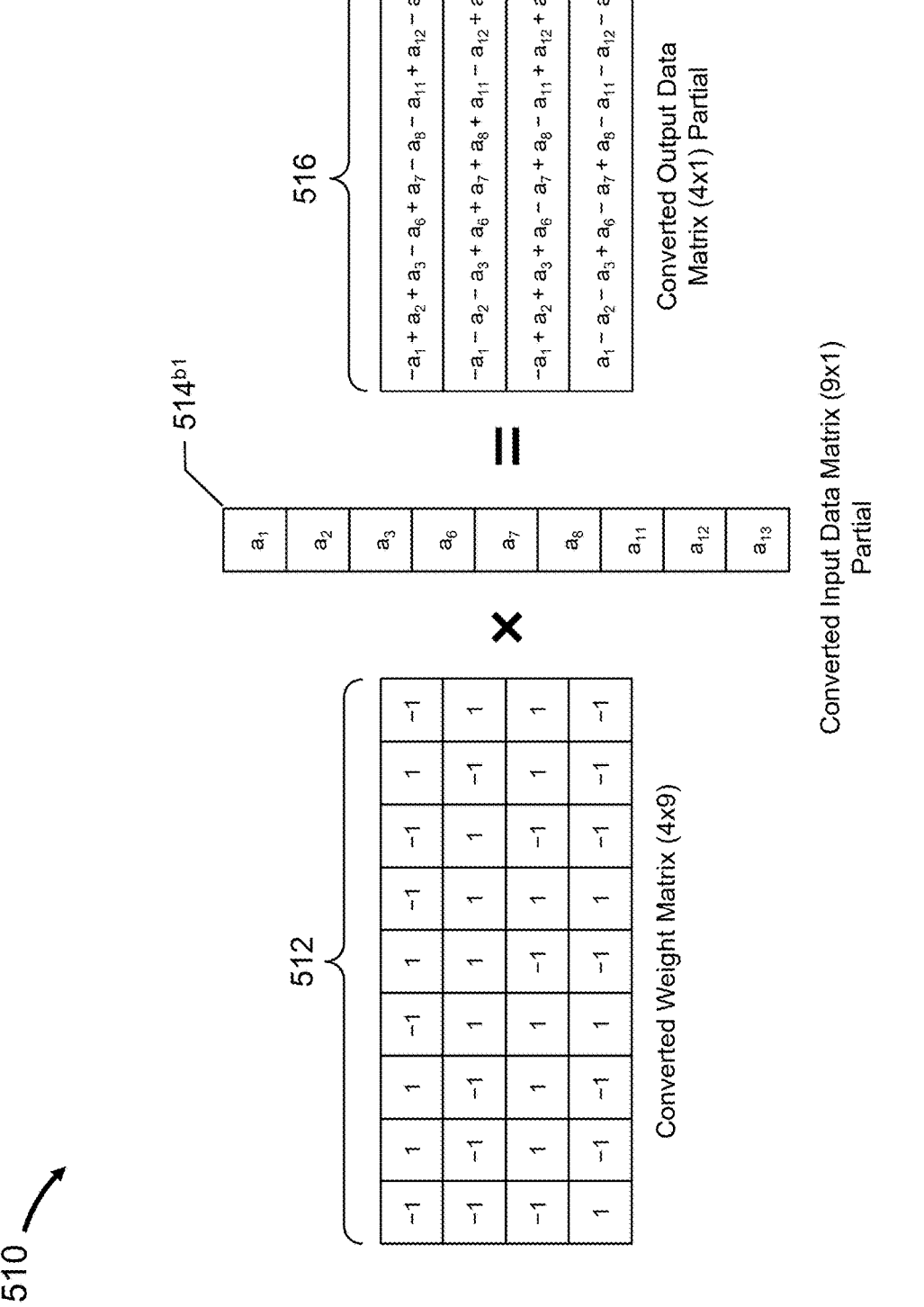
FIG. 6D illustrates another view of a converted convolutional layer calculation for a CNN, in accordance with an embodiment of the present disclosure.

FIG. 6D illustrates another view of converted convolutional layer calculation 510 for a CNN, in accordance with an embodiment of the present disclosure.

In this view, the example values for converted weight matrix 512 have been used to determine the first output elements $o^1_1$, $o^2_1$, $o^3_1$ and $o^4_1$ of converted output data matrices 506$^1$, 506$^2$, 506$^3$, and 506$^4$. More particularly, output element $o^1_1$ is equal to $-a_1 + a_2 + a_3 - a_6 + a_7 - a_8 - a_{11} + a_{12} - a_{13}$, output element $o^2_1$ is equal to $-a_1 - a_2 - a_3 + a_6 + a_7 + a_8 + a_{11} - a_{12} + a_{13}$, output element $o^3_1$ is equal to $-a_1 + a_2 + a_3 + a_6 - a_7 + a_8 - a_{11} + a_{12} + a_{13}$, and output element $o^4_1$ is equal to $a_1 - a_2 - a_3 + a_6 - a_7 + a_8 - a_{11} + -a_{12} + -a_{13}$.

Using the example weight values, converted convolutional layer calculation 510 convolves a set of four consecutive binary kernels against an input volume to generate four output elements forming a 4×1 column vector. Of these four output elements, both the first and the third element have an $a_2 + a_3$ term while the second and the fourth element have a negated version of the $a_2 + a_3$ term. Similarly, the first output element has an $a_6 + a_8$ term while the second, third and the fourth element have a negated version of the $a_6 + a_8$ term. Advantageously, the $a_2 + a_3$ term and the $-(a_6 + a_8)$ may be computed once and reused in the computation of second, third, and fourth output element.

Figure 7A:
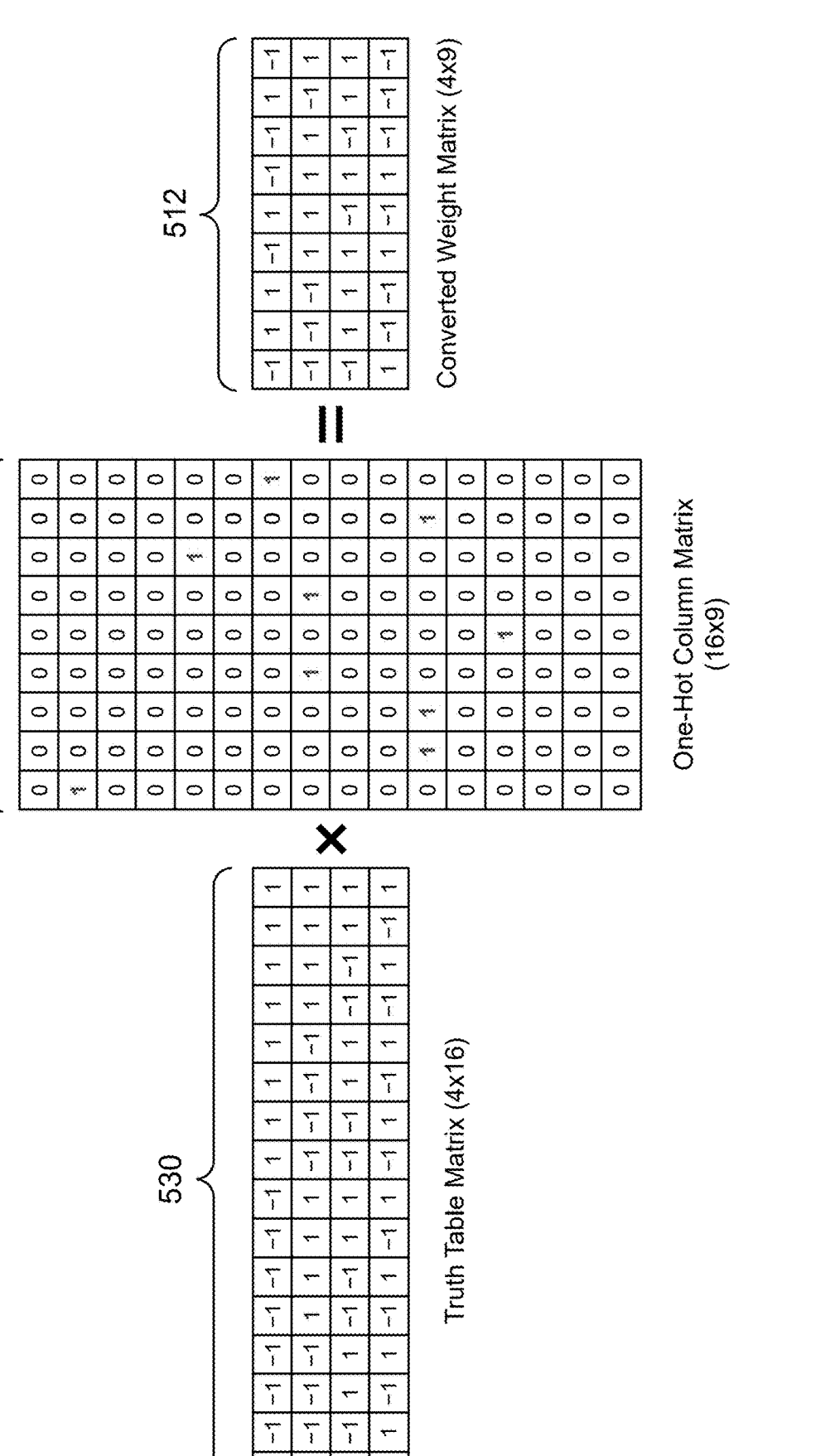
FIG. 7A depicts truth table matrix 530 and one-hot column matrix 540 for a modified converted convolutional layer calculation for a CNN, in accordance with an embodiment of the present disclosure.

FIG. 7A depicts truth table matrix 530 and one-hot column matrix 540 for a modified converted convolutional layer calculation for a CNN, in accordance with an embodiment of the present disclosure.

Generally, decomposing the weight matrix into a truth table matrix that is multiplied by a one-hot column matrix advantageously improves the scatter accumulate operation for the converted convolutional layer calculation. In this embodiment, converted weight matrix 512 has been decomposed into truth table matrix 530 and one-hot column matrix 540. The dimensions of truth table matrix 530 and one-hot column matrix 540 are based on the number of rows of converted weight matrix 512, i.e., converted weight matrix 512 has M rows, truth table matrix 530 has M rows and $2^M$ columns, and converted output data matrix 516 (partial), i.e., output data vector, has M rows. In this embodiment, M equals 4. In this embodiment, truth table matrix 530 is a 4×16 matrix and one-hot column matrix 540 is a 16×9 matrix; other matrix dimensions are also supported.

Each row of truth table matrix 530 has a different sequence of values, each value being −1 or 1. The first row of truth table matrix 530 includes the values −1, −1, −1, −1, −1, −1, −1, −1, 1, 1, 1, 1, 1, 1, 1, 1; the second row of truth table matrix 530 includes the values −1, −1, −1, −1, 1, 1, 1, 1, −1, −1, −1, −1, 1, 1, 1, 1; the third row of truth table matrix 530 includes the values −1, −1, 1, 1, −1, −1, 1, 1, −1, −1, 1, 1, −1, −1, 1, 1; and the fourth row of truth table matrix 530 includes the values −1, 1, −1, 1, −1, 1, −1, 1, −1, 1, −1, 1, −1, 1, −1, 1.

Each column of one-hot column matrix 540 includes one element having a value of 1 and the remaining elements having a value of 0. The position (row number) of 1 in the $i^{th}$ column of one-hot column matrix 540 is determined by the column number in truth table matrix 530, the value of which matches the $i^{th}$ column of the converted weight matrix 512. For example, the position (index) of the value of 1 in the second column of one-hot column matrix 540 is 10 (i.e., 11−1), since the values in the $11^{th}$ column of truth table matrix 530 (i.e., 1, −1, 1, −1) match the second column of the converted weight matrix 512 (i.e., 1, −1, 1, −1). Numbering starts at 0, so 1 is subtracted from the column numbers found.

The first column of one-hot column matrix 540 includes the values 0, 1, 0, 0, 0, 0, 0, 0, 0, 0, 0, 0, 0, 0, 0, 0; the second column of one-hot column matrix 540 includes the values 0, 0, 0, 0, 0, 0, 0, 0, 0, 0, 1, 0, 0, 0, 0, 0; the third column of one-hot column matrix 540 includes the values 0, 0, 0, 0, 0, 0, 0, 0, 0, 1, 0, 0, 0, 0, 0, 0; the fourth column of one-hot column matrix 540 includes the values 0, 0, 0, 0, 0, 0, 0, 1, 0, 0, 0, 0, 0, 0, 0, 0; the fifth column of one-hot column matrix 540 includes the values 0, 0, 0, 0, 0, 0, 0, 0, 0, 0, 0, 1, 0, 0, 0, 0; the sixth column of one-hot column matrix 540 includes the values 0, 0, 0, 0, 0, 0, 0, 1, 0, 0, 0, 0, 0, 0, 0, 0; the seventh column of one-hot column matrix 540 includes the values 0, 0, 0, 0, 1, 0, 0, 0, 0, 0, 0, 0, 0, 0, 0, 0; the eighth column of one-hot column matrix 540 includes the values 0, 0, 0, 0, 0, 0, 0, 0, 0, 0, 1, 0, 0, 0, 0, 0; and the ninth column of one-hot column matrix 540 includes the values 0, 0, 0, 0, 0, 0, 1, 0, 0, 0, 0, 0, 0, 0, 0, 0.

To verify the decomposition, multiplying truth table matrix 530 and one-hot column matrix 540 produces converted weight matrix 512.

Figure 7B:
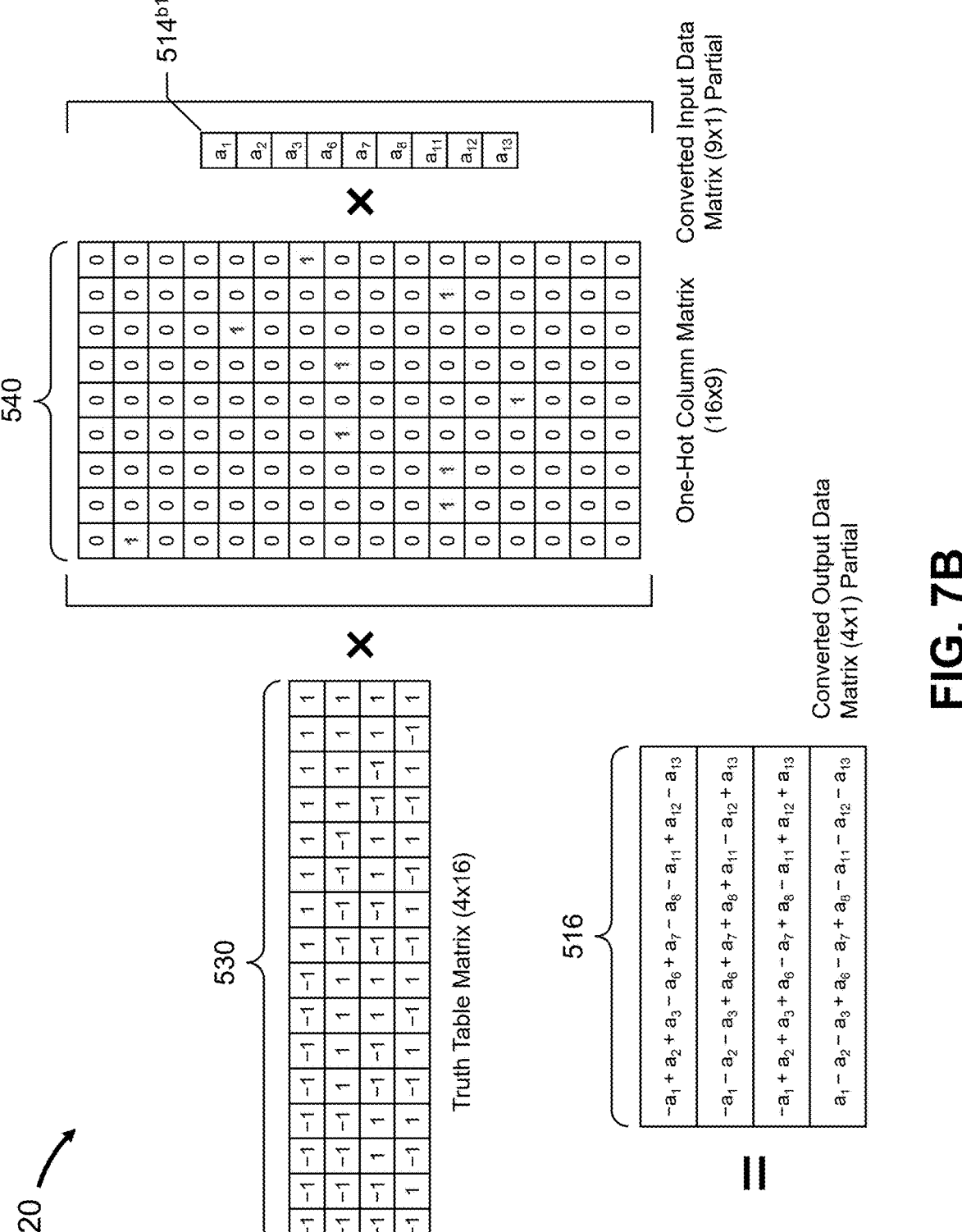
FIG. 7B depicts a modified converted convolutional layer calculation for a CNN, in accordance with an embodiment of the present disclosure.

FIG. 7B depicts modified converted convolutional layer calculation 520 for a CNN, in accordance with an embodiment of the present disclosure.

Substituting the multiplication of truth table matrix 530 and one-hot column matrix 540 for converted weight matrix 512 and rearranging the multiplication sequence based on the associative property for these matrices yields modified converted convolutional layer calculation 520. The brackets indicate that one-hot column matrix 540 and converted input data matrix 514$^{b1}$ (partial) are initially multiplied to generate intermediate column vector 550 (discussed below), and truth table matrix 530 and intermediate column vector 550 are then multiplied to generate converted output data matrix 516 (partial). In this embodiment, intermediate column vector 550 is a 16×1 matrix.

In other words, the matrix-vector multiplication between converted weight matrix 512 and converted input data matrix 514$^{b1}$ (partial) translates into a matrix-vector multiplication between one-hot column matrix 540 and converted input data matrix 514$^{b1}$ (partial), followed by another matrix-vector multiplication between truth table matrix 530 and the resulting intermediate column vector. Of these two matrix-vector multiplication operations, the first operation between one-hot column matrix 540 and converted input data matrix 514$^{b1}$ (partial) dominates the cost as it depends on the number of channels (i.e., C) of the input volume.

In this embodiment, a naïve matrix-vector multiplication operation between one-hot column matrix 540 and converted input data matrix 514$^{b1}$ (partial) requires 16·(3·3·1), i.e., 171, addition operations. Other embodiments may include different numbers of channels, C, such as 2, 3, 4, 8, 16, 32, 64, 128, 256, etc. For example, in one embodiment, M equals 4, C equals 256 and the naïve matrix-vector multiplication operation requires 16·(3·3·256), i.e., 36,864, addition operations.

Figure 7C:
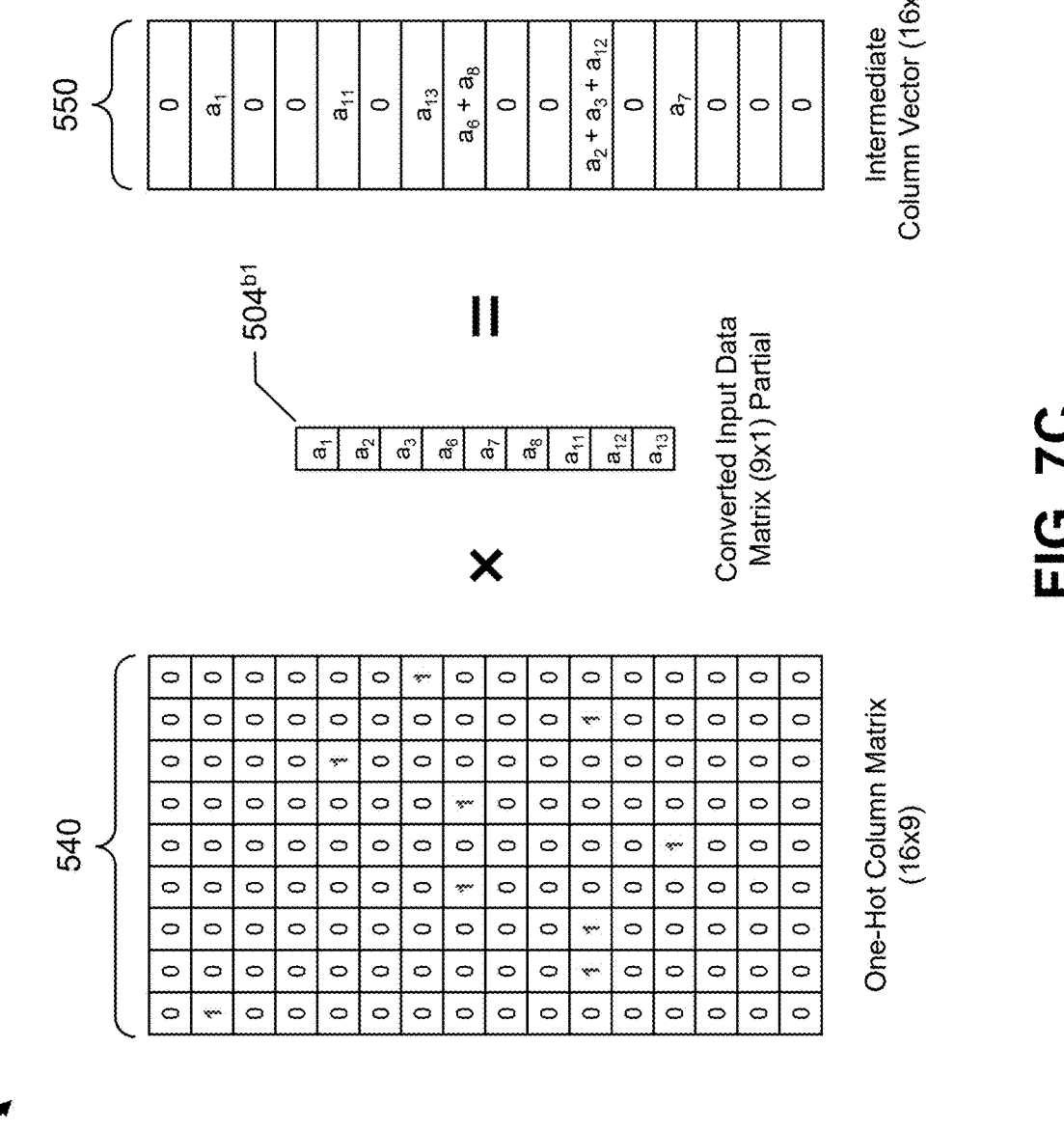
FIG. 7C depicts a matrix multiplication operation, in accordance with an embodiment of the present disclosure.

FIG. 7C depicts matrix multiplication operation 522, in accordance with an embodiment of the present disclosure.

Matrix multiplication operation 522 multiplies one-hot column matrix 540 and converted input data matrix 514$^{b1}$ (partial) to generate intermediate column vector 550.

Figure 7D:
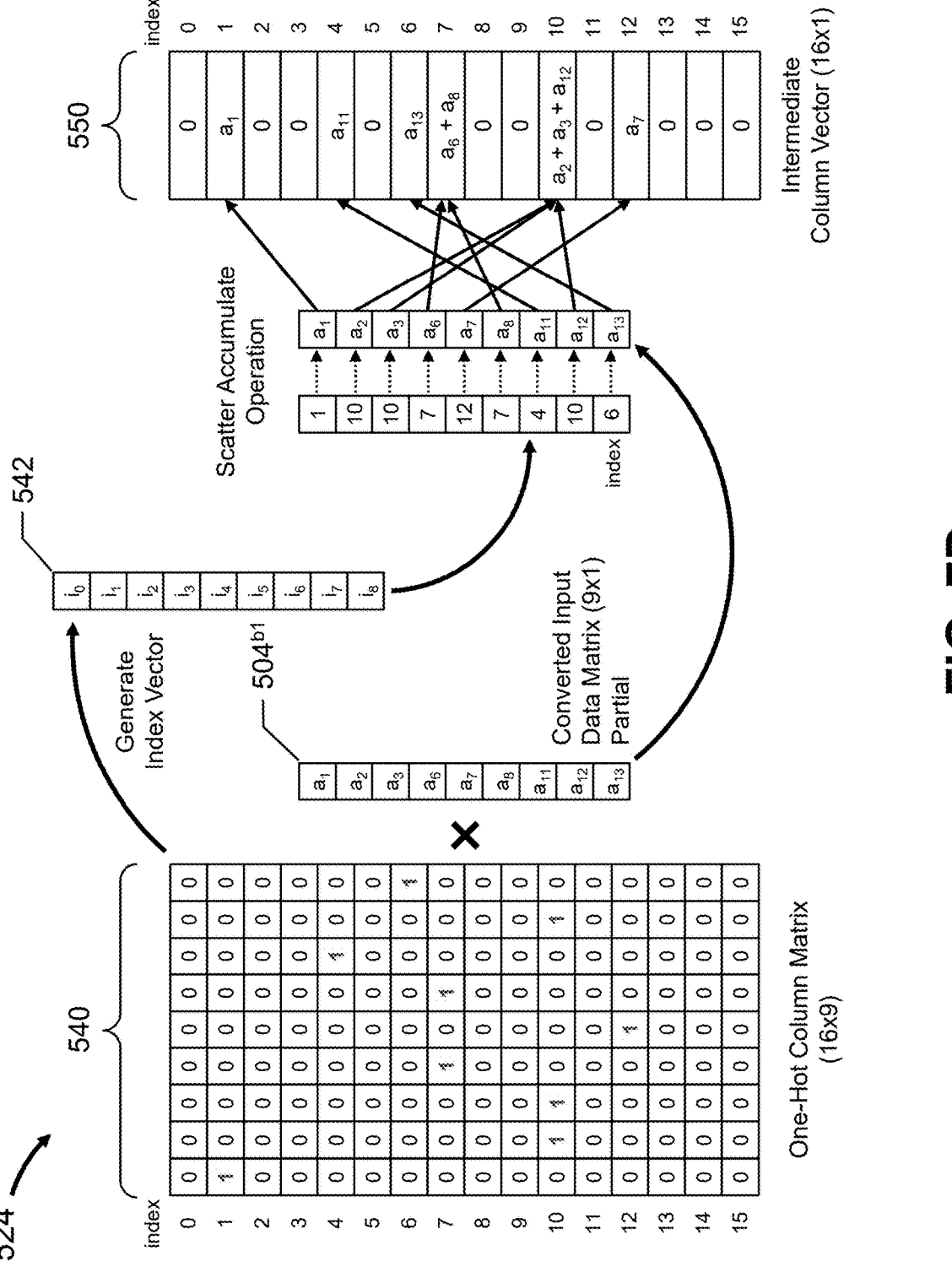
FIG. 7D depicts a scatter accumulate operation, in accordance with an embodiment of the present disclosure.

FIG. 7D depicts scatter accumulate operation 524, in accordance with an embodiment of the present disclosure.

The matrix decomposition/restructuring method disclosed herein advantageously leverages the scatter accumulate operation to perform the matrix-vector multiplication operation between one-hot column matrix 540 and converted input data matrix 514$^{b1}$ (partial) and provide a large operation count reduction as compared to an equivalent matrix-multiply kernel. In the embodiment in which C equals 1, the matrix-vector multiplication operation is performed by effectively using only (3·3·1), i.e., 9, addition operations. In the embodiment in which C equals 256, the matrix-vector multiplication operation is performed by effectively using only (3·3·256), i.e., 2,304, addition operations, etc.

With respect to the scatter accumulate operation, each element of index vector 542 corresponds to an element of converted input data matrix 514$^{b1}$ (partial), as discussed above in general terms. In this embodiment, index vector 542 includes 8 elements, i.e., $i_0$, $i_1$, $i_2$, $i_3$, $i_4$, $i_5$, $i_6$, $i_7$ and $i_8$; element $i_0$ corresponds to $a_1$, element $i_1$ corresponds to $a_2$, element $i_2$ corresponds to $a_3$, element is corresponds to $a_6$, element $i_4$ corresponds to $a_7$, element is corresponds to $a_8$, element is corresponds to $a_{11}$, element $i_7$ corresponds to $a_{12}$ and element is corresponds to $a_{13}$.

In one embodiment, index vector 542 is generated based on one-hot column matrix 540. In this embodiment, each element of index vector 542 has a value that is equal to a row number or row index of the element that has a value of 1 within a corresponding column of one-hot column matrix 540. In a row number embodiment, the range of row index values range is from 1 to 16, while in a row index embodiment, the range of row index values range is from 0 to 15. For example, the first column of one-hot column matrix 540 has a value of 1 in the second row (e.g., row index 1) so $i_0$ is equal to 1, the second column of one-hot column matrix 540 has a value of 1 in the $11^{th}$ row (e.g., row index 10) so $i_1$ is equal to 10, and so on for $i_2$ to $i_8$.

The index vector elements of the scatter accumulate operation are decimal values of the different columns of one-hot column matrix 540. These indices can be computed from converted weight matrix 512 without actually forming one-hot column matrix 540. The value of $i^{th}$ element in the index vector can be determined by the column number of truth table matrix 540, the value of which matches the $i^{th}$ column of converted weight matrix 512. For example, the second element of the index vector is 10 (i.e., 11−1), since the value in the $11^{th}$ column of truth table matrix 530 matches the second column of converted weight matrix 512. Given the number of rows of converted weight matrix 512, the values in truth table matrix 530 are constant. They are known in advance and do not change for different values of the converted weight matrix 512 and the corresponding one-hot column matrix 540.

Based on index vector 542, the scatter accumulate operation accumulates the elements of converted input data matrix 514$^{b1}$ (partial) into intermediate column vector 550. Element $a_1$ is accumulated to generate the second element (i.e., index value 1), element $a_{11}$ is accumulated to generate the fifth element (i.e., index value 4), element $a_{13}$ is accumulated to generate the seventh element (i.e., index value 6), elements $a_6$ and as are accumulated to generate the eighth element (i.e., index value 7), elements $a_2$, $a_3$ and $a_{12}$ are accumulated to generate the eleventh element (i.e., index value 10), and element $a_7$ is accumulated to generate the thirteenth element (i.e., index value 12).

Figure 7E:
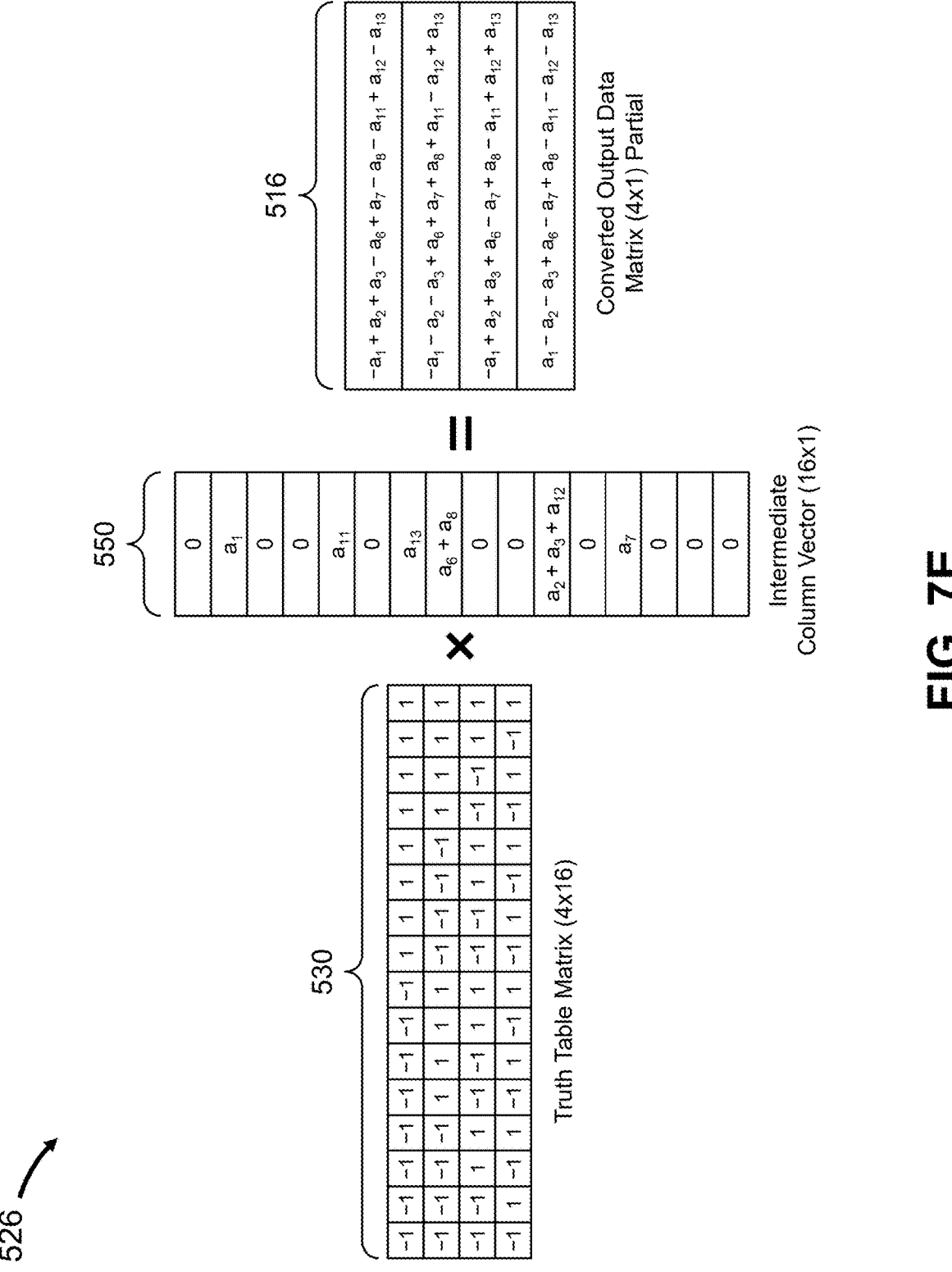
FIG. 7E depicts a modified converted convolutional layer calculation for a CNN, in accordance with an embodiment of the present disclosure.

FIG. 7E depicts modified converted convolutional layer calculation 526 for a CNN, in accordance with an embodiment of the present disclosure.

Substituting the multiplication of truth table matrix 530 and intermediate column vector 550 for the multiplication of converted weight matrix 512 and converted input data matrix 514$^{b1}$ (partial) yields modified converted convolutional layer calculation 526.

When the four consecutive weight sets 502$^i$ are processed by the matrix decomposition/restructuring method disclosed herein, memoization is advantageously exploited. In the 256 channel embodiment, the scatter accumulate operation between one-hot column matrix 540 and converted input data matrix 514$^{b1}$ (partial) requires 2,304 operations, whereas the matrix-vector multiplication between truth table matrix 530 and intermediate column vector 550 requires 64 operations, i.e., a reduction in the number of operations by a factor of 36.

Furthermore, since first half 534 of truth table matrix 530 is symmetric against second half 536, only 50% of the operations (i.e., 64/2=32) is required to multiply truth table matrix 530 and intermediate column vector 550. The matrix decomposition/restructuring method with memoization disclosed herein advantageously realizes the overall matrix vector multiplication using only 2,336 (i.e., 2304+32) operations as opposed to the 9,216 (i.e., 2304×4) operations that are required without memoization, i.e., a reduction in the number of operations by a factor of 3.94. Changing the number of the number of rows of converted weight matrix 512 (i.e., kernels) to which memoization is applied results in different savings as shown Tables 1 and 2 for binary and ternary matrices, respectively.

TABLE 1

| Binary Matrices | | | |
| --- | --- | --- | --- |
| Consecutive Rows Considered for Memoization | Operations Without Memoization | Operations With Memoization | Savings in Operation Count |
| 1 | 2307 | 2306 | 1.0 |
| 2 | 2322 | 2312 | 1.0 |
| 3 | 2385 | 2328 | 1.0 |
| 4 | 2628 | 2368 | 1.1 |
| 5 | 3519 | 2464 | 1.4 |
| 6 | 6678 | 2688 | 2.5 |
| 7 | 17613 | 3200 | 5.5 |
| 8 | 54792 | 4352 | 12.6 |

TABLE 2

| Ternary Matrices | | | |
| --- | --- | --- | --- |
| Consecutive Rows Considered for Memoization | Operations Without Memoization | Operations With Memoization | Savings in Operation Count |
| 1 | 2304 | 2305 | 1.0 |
| 2 | 4608 | 2313 | 2.0 |
| 3 | 6912 | 2344 | 2.9 |
| 4 | 9216 | 2466 | 3.7 |
| 5 | 11520 | 2911 | 3.9 |

TABLE 2-continued

| Ternary Matrices | | | |
| --- | --- | --- | --- |
| Consecutive Rows Considered for Memoization | Operations Without Memoization | Operations With Memoization | Savings in Operation Count |
| 6 | 13824 | 4491 | 3.1 |
| 7 | 16128 | 9958 | 1.6 |
| 8 | 18432 | 28548 | 0.6 |

The matrix decomposition/restructuring method advantageously realizes parsimonious memoization during matrix multiplication between sub-byte matrices and full-precision matrices (e.g., 8-bit integer, 32-bit floating point, etc.) without incurring storing and caching overhead by computing and saving the results of subexpressions only for common value patterns ($a_2+a_3$, $a_6+a_8$, etc.) that exist across a block of four consecutive rows of the repeating columns of the sub-byte matrix and then reusing the cached results when the value patterns that appear as rows of the sub-byte matrix are multiplied by the full-precision matrix.

Figure 8A:
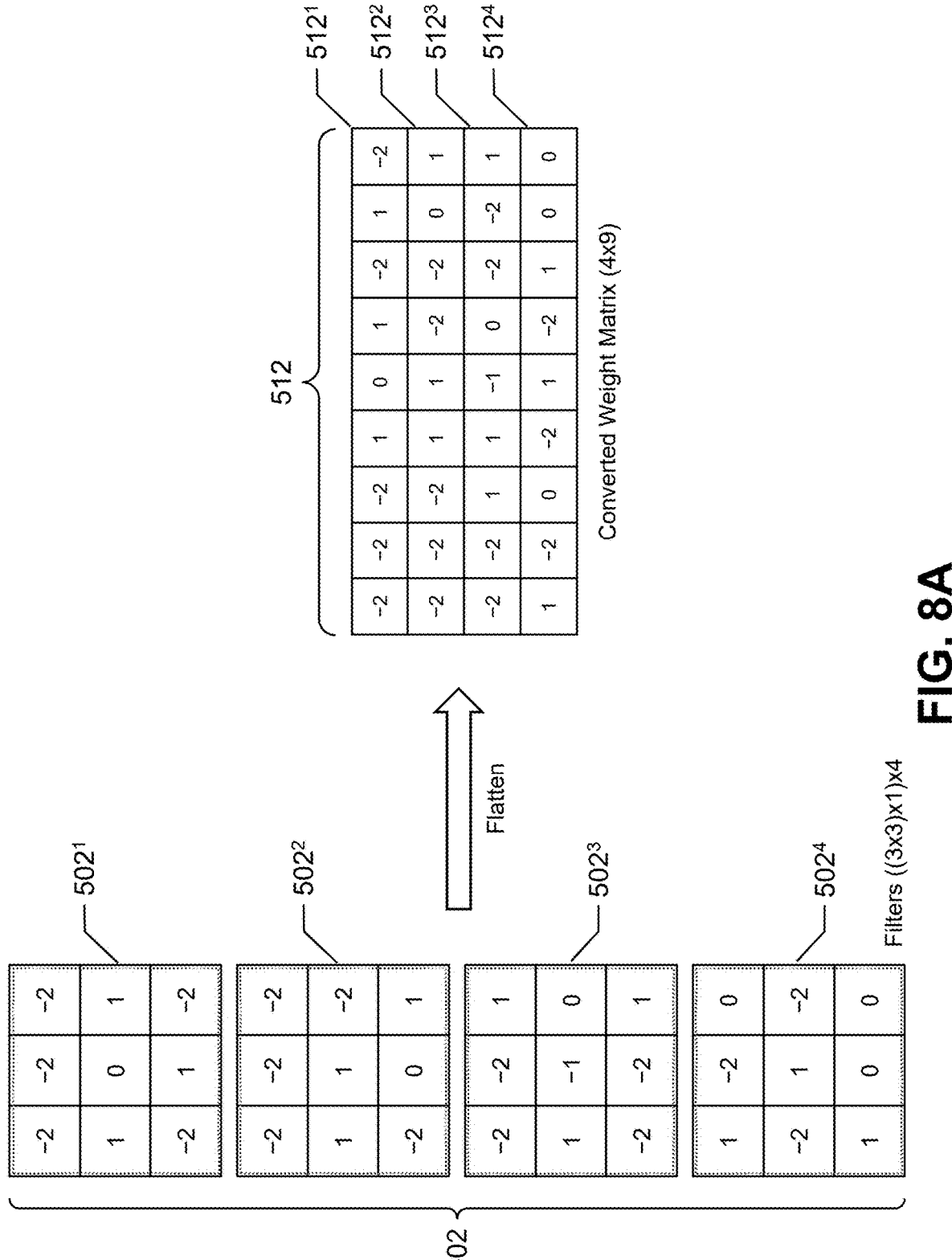
FIG. 8A depicts a filter and a converted weight matrix, in accordance with another embodiment of the present disclosure.

FIG. 8A depicts filter 502 and converted weight matrix 512, in accordance with another embodiment of the present disclosure.

In this embodiment, the weights are 2-bit signed integers, and example values have been provided for filter 502, which has been flattened into converted weight matrix 512 as described above.

Figure 8B:
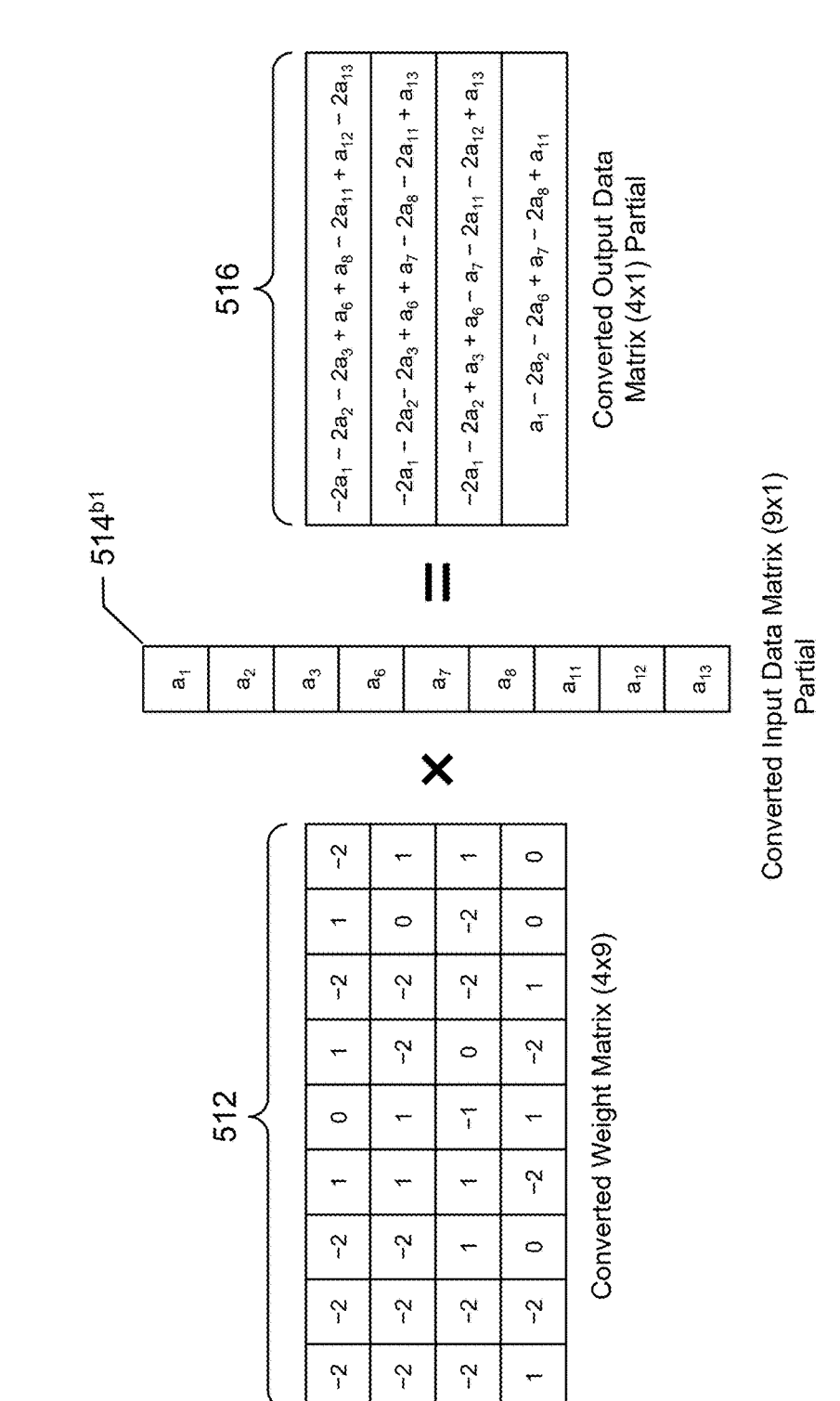
FIG. 8B illustrates another view of a converted convolutional layer calculation for a CNN, in accordance with an embodiment of the present disclosure.

FIG. 8B illustrates another view of converted convolutional layer calculation 510 for a CNN, in accordance with an embodiment of the present disclosure.

In this view, the example values for converted weight matrix 512 have been used to determine the first output elements $o^1_1$, $o^2_1$, $o^3_1$ and $o^4_1$ of converted output data matrices $506^1$, $506^2$, $506^3$, and $506^4$. More particularly, output element $o^1_1$ is equal to $-2a_1-2a_2-2a_3+a_6+a_8-2a_{11}+a_{12}-2a_{13}$, output element $o^2_1$ is equal to $-2a_1-2a_2-2a_3+a_6+a_7-2a_8-2a_{11}+a_{13}$, output element $o^3_1$ is equal to $-2a_1-2a_2+a_3+a_6-a_7-2a_{11}-2a_{12}+a_{13}$, and output element $o^4_1$ is equal to $a_1-2a_2-2a_6+a_7-2a_8+a_{11}$.

Using the example weight values, converted convolutional layer calculation 510 convolves a set of four consecutive binary kernels against an input volume to generate four output elements forming a 4×1 column vector. Of these four output elements, the fourth element has the $a_1+a_{11}$ term, while the first, second and third element have a negated and doubled (i.e., −2×) version of the $a_1+a_{11}$ term. Advantageously, the $a_1+a_{11}$ term may be computed once and reused in the computation of first, second and third output elements.

Figure 8C:
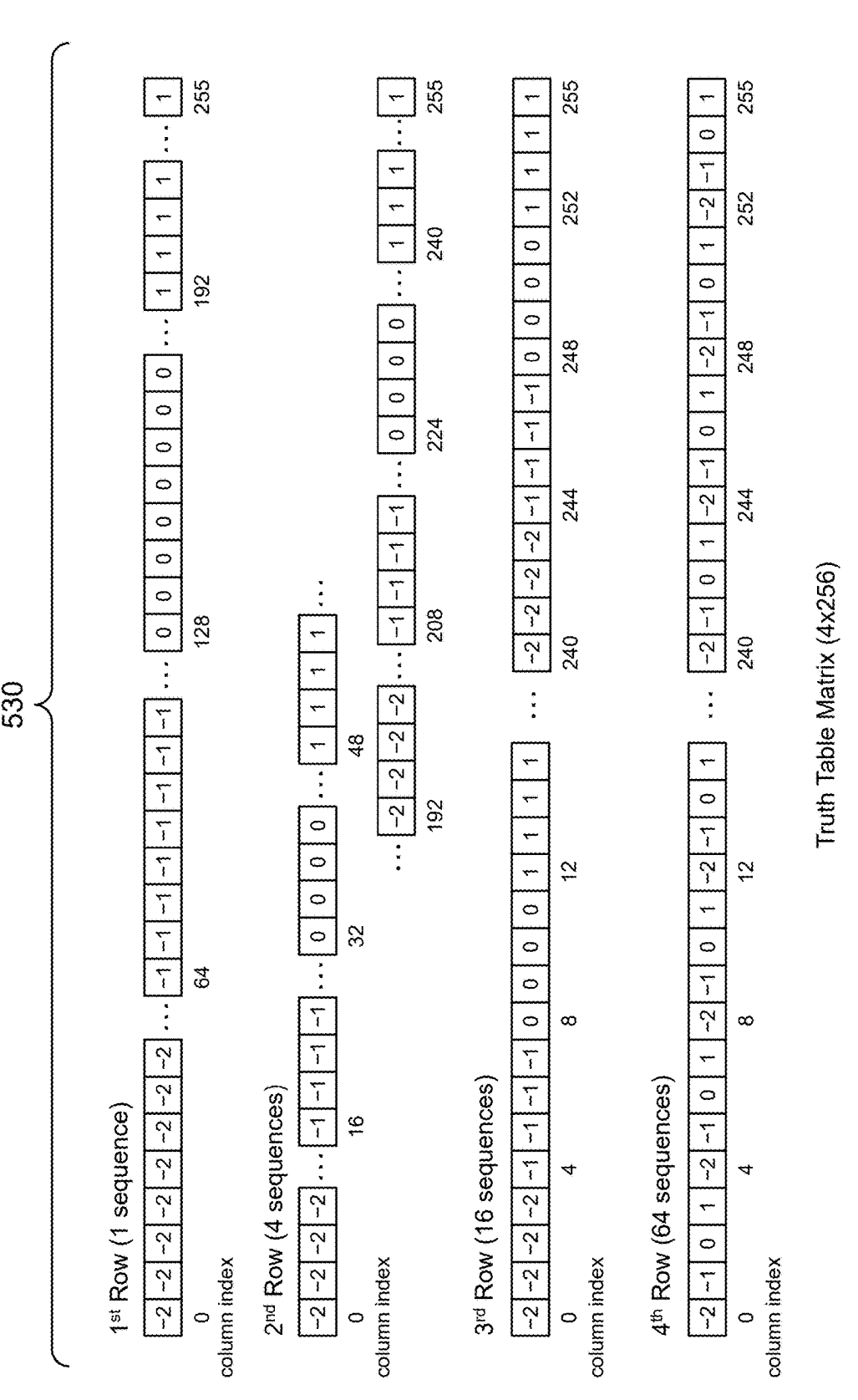
FIG. 8C depicts a truth table matrix for a modified converted convolutional layer calculation for a CNN, in accordance with an embodiment of the present disclosure.
Figure 8D:
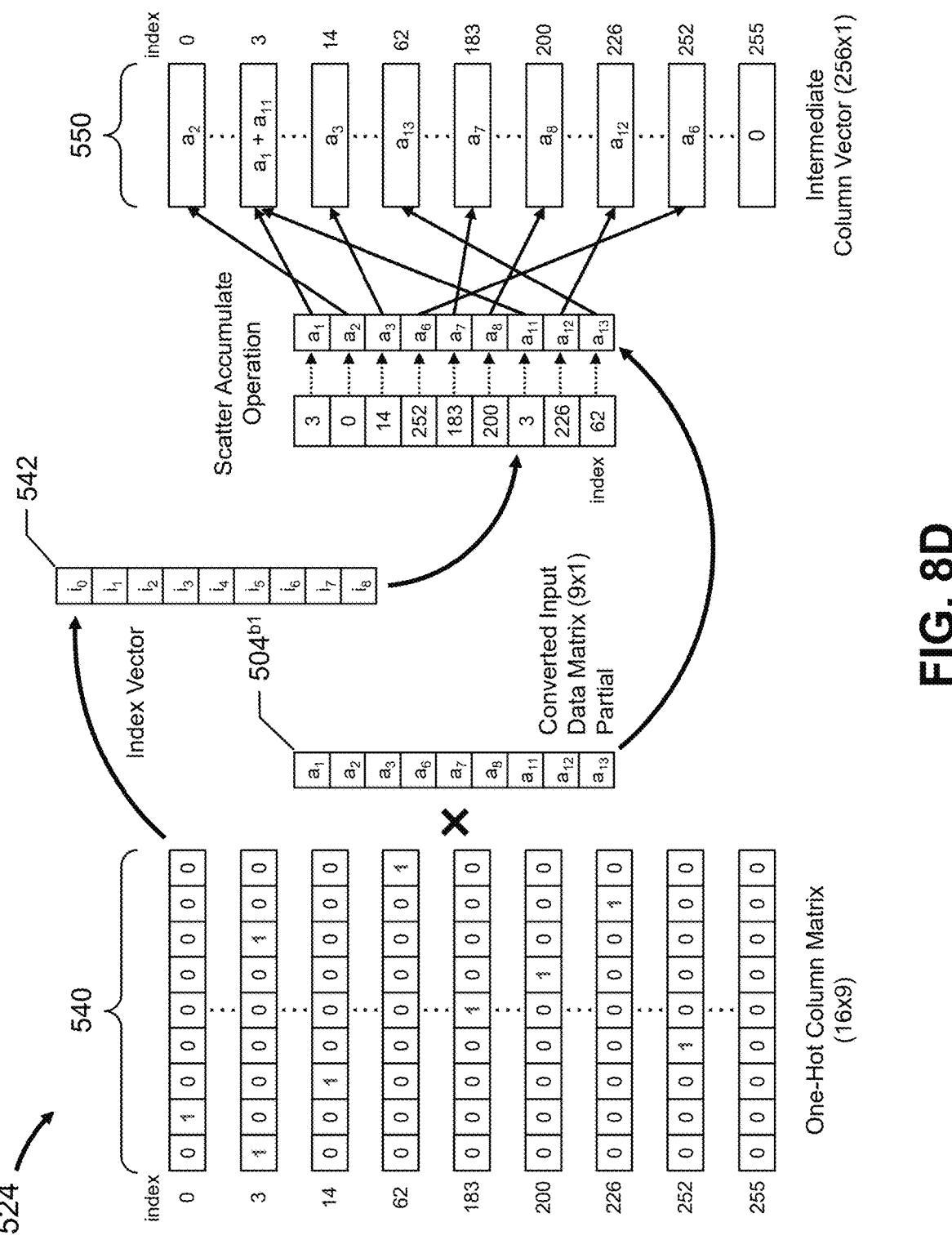
FIG. 8D depicts a scatter accumulate operation, in accordance with an embodiment of the present disclosure.

FIG. 8C depicts truth table matrix 530 for a modified converted convolutional layer calculation for a CNN, in accordance with an embodiment of the present disclosure. An embodiment of one-hot column matrix 540 is depicted in FIG. 8D.

As described above, decomposing the weight matrix into a truth table matrix that is multiplied by a one-hot column matrix advantageously improves the scatter accumulate operation for the converted convolutional layer calculation. In this embodiment, converted weight matrix 512 has been decomposed into truth table matrix 530 and one-hot column matrix 540. The dimensions of truth table matrix 530 and one-hot column matrix 540 are based on the number of rows of converted weight matrix 512, i.e., converted weight matrix 512 has M rows, truth table matrix 530 has M rows and $4^M$ columns, and converted output data matrix 516 (partial), i.e., output data vector, has M rows. In this embodiment, M equals 4 and the number of columns is based on 4 possible weight values (i.e., 2-bit signed integer weights) rather than 2 possible weight values (i.e., binary weights). In this embodiment, truth table matrix 530 is a 4×256 matrix and one-hot column matrix 540 is a 256×9 matrix; other matrix dimensions are also supported.

Each row of truth table matrix 530 has different sequences of values; each value within each sequence is −2, −1, 0 or 1.

The first row of truth table matrix 530 includes one sequence. The first 64 elements have a value of −2 (i.e., column indices 0 to 63), the next 64 elements have a value of −1 (i.e., column indices 64 to 127), the next 64 elements have a value of 0 (i.e., column indices 128 to 191), and the final 64 elements have a value of 1 (i.e., column indices 192 to 255).

The second row of truth table matrix 530 includes 4 sequences. The first sequence includes 64 elements—the first 16 elements have a value of −2 (i.e., column indices 0 to 15), the next 16 elements have a value of −1 (i.e., column indices 16 to 31), the next 16 elements have a value of 0 (i.e., column indices 32 to 47), and the final 16 elements have a value of 1 (i.e., column indices 48 to 63). The second sequence includes 64 elements that repeat the pattern of the first sequence (i.e., column indices 64 to 127). The third sequence includes 64 elements that repeat the pattern of the first sequence (i.e., column indices 128 to 191). The fourth sequence includes 64 elements that repeat the pattern of the first sequence (i.e., column indices 192 to 255).

The third row of truth table matrix 530 includes 16 sequences. The first sequence includes 16 elements—the first 4 elements have a value of −2 (i.e., column indices 0 to 3), the next 4 elements have a value of −1 (i.e., column indices 4 to 7), the next 4 elements have a value of 0 (i.e., column indices 8 to 11), and the final 4 elements have a value of 1 (i.e., columns 12 to 15). The second sequence includes 16 elements that repeat the pattern of the first sequence (i.e., column indices 16 to 31). And so on. The $16^{th}$ sequence includes 16 elements that repeat the pattern of the first sequence (i.e., column indices 240 to 255).

The fourth row of truth table matrix 530 includes 64 sequences. The first sequence includes 4 elements—the first element has a value of −2 (i.e., column index 0), the next element has a value of −1 (i.e., column index 1), the next element has a value of 0 (i.e., column index 2), and the final element has a value of 1 (i.e., column index 3). The second sequence includes 4 elements that repeat the pattern of the first sequence (i.e., column indices 4 to 7). And so on. The 64th sequence includes 4 elements that repeat the pattern of the first sequence (i.e., column indices 252 to 255).

Each column of one-hot column matrix 540 includes one element having a value of 1 and the remaining elements having a value of 0. The position (row number) of 1 in the $i^{th}$ column of one-hot column matrix 540 is determined by the column number in truth table matrix 530, the value of which matches the $i^{th}$ column of the converted weight matrix 512. For example, the position (index) of the value of 1 in the second column of one-hot column matrix 540 is 0 (i.e., 1−1), since the values in the first column of truth table matrix 530 (i.e., −2, −2, −2, −2) match the values in the second column of the converted weight matrix 512 (i.e., −2, −2, −2, −2). Index numbering starts at 0, so 1 is subtracted from the matching column number. In other words, the column index of the matching column of truth table matrix 530 is used; in this example, the first column of truth table matrix 530 has a column index of 0.

The first column of one-hot column matrix 540 has a value of 1 in the $4^{th}$ row (i.e., an index value of 3) and a value of 0 in all of the other rows. The second column of one-hot column matrix 540 has a value of 1 in the $1^{st}$ row (i.e., an index value of 0) and a value of 0 in all of the other rows. The third column of one-hot column matrix 540 has a value of 1 in the $15^{th}$ row (i.e., an index value of 14) and a value of 0 in all of the other rows. The fourth column of one-hot column matrix 540 has a value of 1 in the $253^{rd}$ row (i.e., an index value of 252) and a value of 0 in all of the other rows. The fifth column of one-hot column matrix 540 has a value of 1 in the $184^{th}$ row (i.e., an index value of 183) and a value of 0 in all of the other rows. The sixth column of one-hot column matrix 540 has a value of 1 in the $201^{st}$ row (i.e., an index value of 200) and a value of 0 in all of the other rows. The seventh column of one-hot column matrix 540 has a value of 1 in the $4^{th}$ row (i.e., an index value of 3) and a value of 0 in all of the other rows. The eighth column of one-hot column matrix 540 has a value of 1 in the $227^{th}$ row (i.e., an index value of 226) and a value of 0 in all of the other rows. The ninth column of one-hot column matrix 540 has a value of 1 in the $63^{rd}$ row (i.e., an index value of 62) and a value of 0 in all of the other rows.

FIG. 8D depicts scatter accumulate operation 524, in accordance with an embodiment of the present disclosure.

The matrix decomposition/restructuring method disclosed herein advantageously leverages the scatter accumulate operation to perform the matrix-vector multiplication operation between one-hot column matrix 540 and converted input data matrix 514$^{b1}$ (partial) and provide a large operation count reduction as compared to an equivalent matrix-multiply kernel. In the embodiment in which C equals 1, the matrix-vector multiplication operation is performed by effectively using only (3·3·1), i.e., 9, addition operations. In the embodiment in which C equals 256, the matrix-vector multiplication operation is performed by effectively using only (3·3·256), i.e., 2,304, addition operations, etc.

With respect to the scatter accumulate operation, each element of index vector 542 corresponds to an element of converted input data matrix 514$^{b1}$ (partial), as discussed above in general terms. In this embodiment, index vector 542 includes 8 elements, i.e., $i_0$, $i_1$, $i_2$, $i_3$, $i_4$, $i_5$, $i_6$, $i_7$ and is; element $i_0$ corresponds to $a_1$, element $i_1$ corresponds to $a_2$, element $i_2$ corresponds to $a_3$, element $i_3$ corresponds to $a_6$, element $i_4$ corresponds to $a_7$, element is corresponds to $a_8$, element is corresponds to $a_{11}$, element $i_7$ corresponds to $a_{12}$ and element $i_8$ corresponds to $a_{13}$.

In one embodiment, index vector 542 is generated based on one-hot column matrix 540. In this embodiment, each element of index vector 542 has a value that is equal to a row number or row index of the element that has a value of 1 within a corresponding column of one-hot column matrix 540. In a row number embodiment, the range of row index values range is from 1 to 256, while in a row index embodiment, the range of row index values range is from 0 to 255. For example, the first column of one-hot column matrix 540 has a value of 1 in the $4^{th}$ row (e.g., row index 3) so $i_0$ is equal to 3, the second column of one-hot column matrix 540 has a value of 1 in the $1^{st}$ row (e.g., row index 0) so $i_1$ is equal to 0, and so on for $i_2$ to $i_8$.

The index vector elements of the scatter accumulate operation are decimal values of the different columns of one-hot column matrix 540. These indices can be computed from converted weight matrix 512 without actually forming one-hot column matrix 540. The value of $i^{th}$ element in the index vector can be determined by the column number of truth table matrix 540, the value of which matches the $i^{th}$ column of converted weight matrix 512. For example, the second element of the index vector is 0 (i.e., 1–1), since the value in the $1^{st}$ column of truth table matrix 530 matches the second column of converted weight matrix 512. Given the number of rows of converted weight matrix 512, the values in truth table matrix 530 are constant. They are known in advance and do not change for different values of the converted weight matrix 512 and the corresponding one-hot column matrix 540.

Based on index vector 542, the scatter accumulate operation accumulates the elements of converted input data matrix 514$^{b1}$ (partial) into intermediate column vector 550. Element $a_2$ is accumulated to generate the $1^{st}$ element (i.e., index value 0), elements $a_1$ and $a_{11}$ are accumulated to generate the $4^{th}$ element (i.e., index value 3), element as is accumulated to generate the $1_5^{th}$ element (i.e., index value $1_4$), element $a_{13}$ is accumulated to generate the $63^{rd}$ element (i.e., index value 62), element $a_7$ is accumulated to generate the $184^{th}$ element (i.e., index value 183), element $a_8$ is accumulated to generate the $201^{st}$ element (i.e., index value 200), element $a_{12}$ is accumulated to generate the $227^{th}$ element (i.e., index value 226), and element $a_6$ is accumulated to generate the $253^{rd}$ element (i.e., index value 252).

Figure 8E:
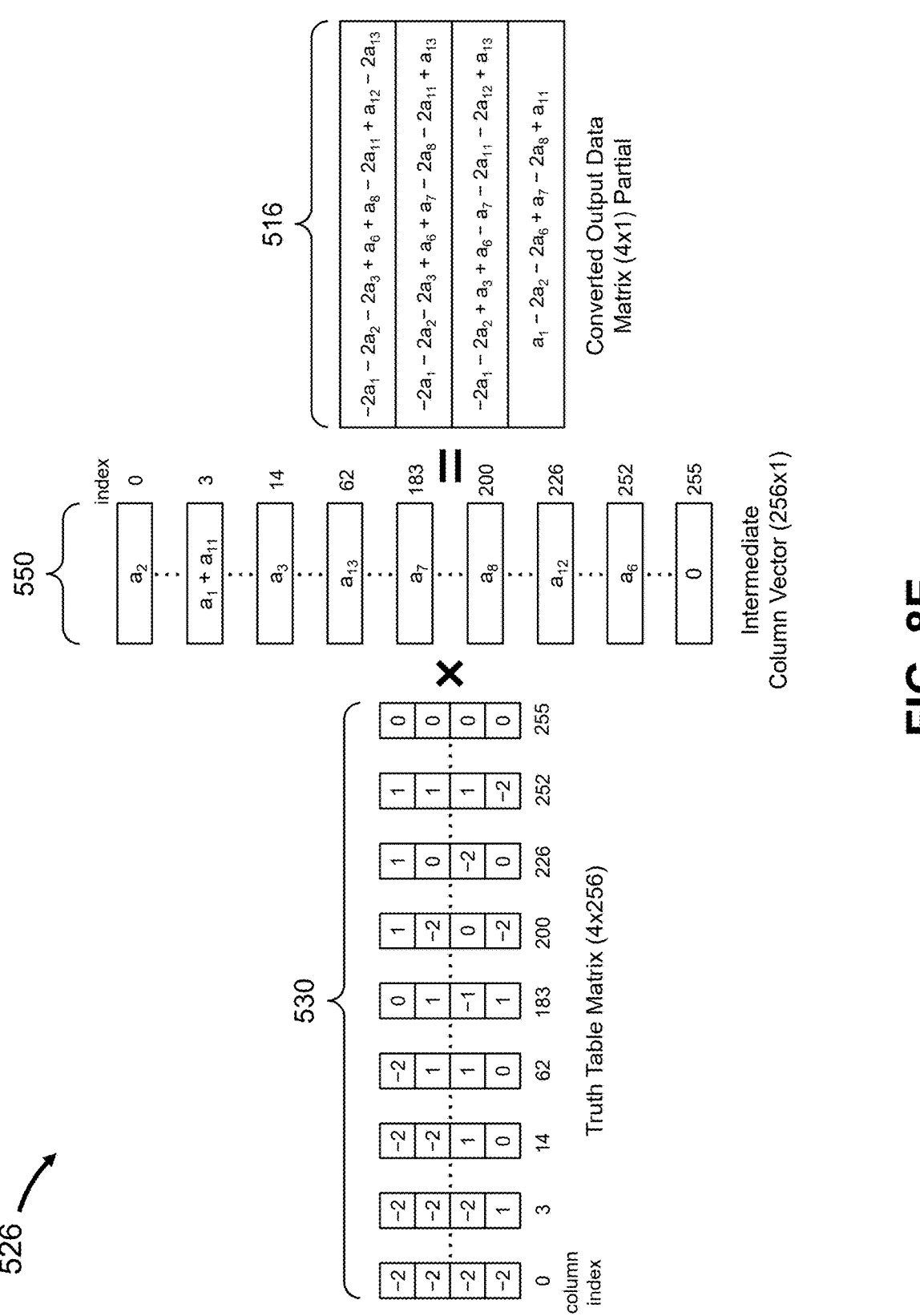
FIG. 8E depicts a modified converted convolutional layer calculation for a CNN, in accordance with an embodiment of the present disclosure.

FIG. 8E depicts modified converted convolutional layer calculation 526 for a CNN, in accordance with an embodiment of the present disclosure.

Substituting the multiplication of truth table matrix 530 and intermediate column vector 550 for the multiplication of converted weight matrix 512 and converted input data matrix 514$^{b1}$ (partial) yields modified converted convolutional layer calculation 526.

Figure 9:
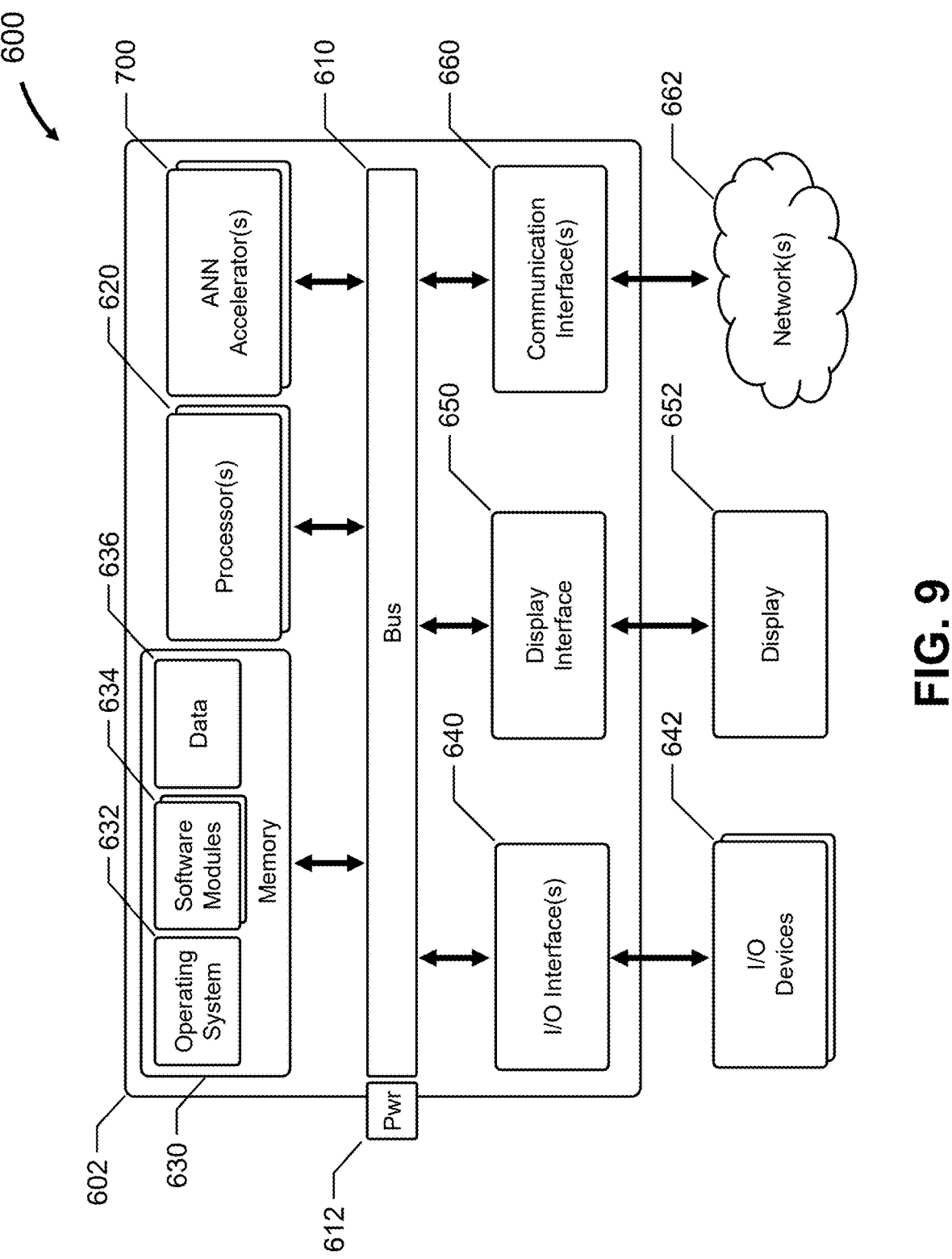
FIG. 9 depicts a block diagram of system, in accordance with an embodiment of the present disclosure.

FIG. 9 depicts a block diagram of system 600, in accordance with an embodiment of the present disclosure.

Computer 602 includes bus 610 coupled to one or more processors 620, memory 630, I/O interfaces 640, display interface 650, one or more communication interfaces 660 and one or more ANN accelerators 670. Generally, I/O interfaces 640 are coupled to I/O devices 642 using a wired or wireless connection, display interface 650 is coupled to display 652, and communication interface 660 is connected to network 662 using a wired or wireless connection.

Bus 610 is a communication system that transfers data between processor 620, memory 630, I/O interfaces 640, display interface 650, communication interface 660, ANN accelerator 670, as well as other components (not depicted). Power connector 612 is coupled to bus 610 and a power supply (not shown).

Processor 620 includes one or more general-purpose or application-specific microprocessors that executes instructions to perform control, computation, input/output, etc. functions for computer 602. Processor 620 may include a single integrated circuit, such as a micro-processing device, multiple cores, multiple integrated circuit devices and/or circuit boards working in cooperation, etc., to accomplish the functions of processor 620. In addition, processor 620 may execute computer programs or modules, such as operating system 632, software modules 634, etc., stored within memory 630. For example, software modules 634 may include an ML application, an ANN application, a CNN application, etc. Generally, processor 620 includes one or more instruction decoders; in many embodiments, processor 620 includes an instruction decoder configured to control processing circuitry to perform the scatter accumulate instruction.

Generally, storage element or memory 630 stores instructions for execution by processor 620 and data. Memory 630 may include a variety of non-transitory computer-readable medium that may be accessed by processor 620. In various embodiments, memory 630 may include volatile and nonvolatile medium, non-removable medium and/or removable medium. For example, memory 630 may include any combination of random access memory (RAM), dynamic RAM (DRAM), static RAM (SRAM), read only memory (ROM), flash memory, cache memory, and/or any other type of non-transitory computer-readable medium.

Memory 630 contains various components for retrieving, presenting, modifying, and storing data. For example, memory 630 stores software modules that provide functionality when executed by processor 620. The software modules include operating system 632 that provides operating system functionality for computer 602. Software modules 634 provide various functionality, such as image classification using convolutional neural networks, etc. Data 636 may include data associated with operating system 632, software modules 634, etc.

I/O interfaces 640 are configured to transmit and/or receive data from I/O devices 642. I/O interfaces 640 enable connectivity between processor 620 and I/O devices 642 by encoding data to be sent from processor 620 to I/O devices 642, and decoding data received from I/O devices 642 for processor 620. Generally, data may be sent over wired and/or wireless connections. For example, I/O interfaces 640 may include one or more wired communications interfaces, such as USB, Ethernet, etc., and/or one or more wireless communications interfaces, coupled to one or more antennas, such as WiFi, Bluetooth, cellular, etc.

Generally, I/O devices 642 provide input to computer 602 and/or output from computer 602. As discussed above, I/O devices 642 are operably connected to computer 602 using a wired and/or wireless connection. I/O devices 642 may include a local processor coupled to a communication interface that is configured to communicate with computer 602 using the wired and/or wireless connection. For example, I/O devices 642 may include a keyboard, mouse, touch pad, joystick, etc.

Display interface 650 is configured to transmit image data from computer 602 to monitor or display 652.

Communication interface 660 is configured to transmit data to and from network 662 using one or more wired and/or wireless connections. Network 662 may include one or more local area networks, wide area networks, the Internet, etc., which may execute various network protocols, such as, for example, wired and/or wireless Ethernet, Bluetooth, etc. Network 662 may also include various combinations of wired and/or wireless physical layers, such as, for example, copper wire or coaxial cable networks, fiber optic networks, Bluetooth wireless networks, WiFi wireless networks, CDMA, FDMA and TDMA cellular wireless networks, etc.

ANN accelerator 700 is configured to perform the scatter add operation and to support various applications implemented by software modules 634.

Figure 10:
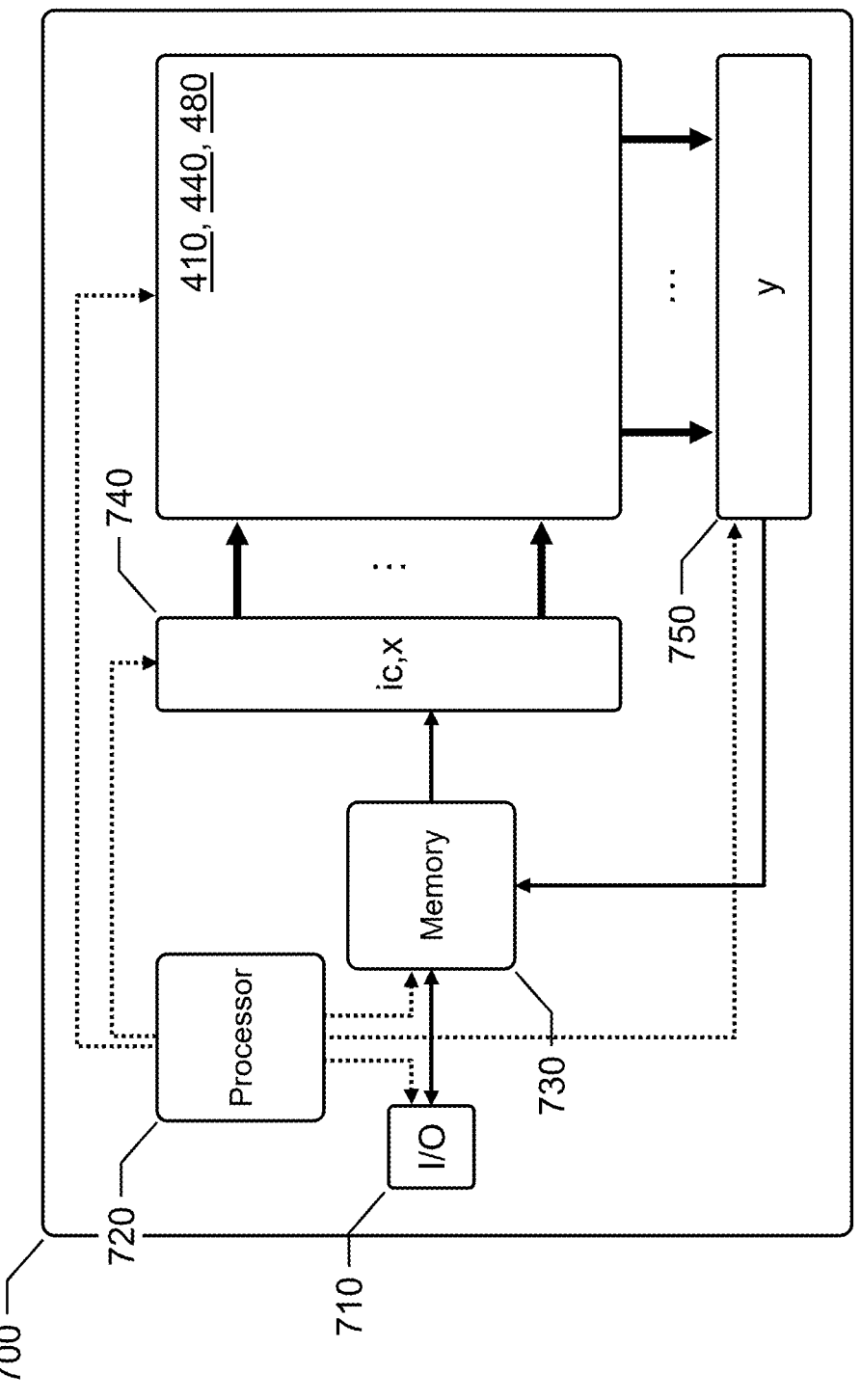
FIG. 10 depicts a block diagram of an ANN accelerator, in accordance with embodiments of the present disclosure.

FIG. 10 depicts a block diagram of ANN accelerator 700, in accordance with embodiments of the present disclosure.

ANN accelerator 700 includes I/O interface 710, processor 720, memory 730, register 740, register 750 and crossbar array 410, 440 or 480.

I/O interface 710 is coupled to bus 610, processor 720 and memory 730. I/O interface 710 includes a microcontroller that sends data to, and receives data and commands from, processor 620, memory 630, etc. Processor 720 is coupled to I/O interface 710, memory 730, register 740, register 750 and crossbar array 410, 440 or 480. Register 740 is coupled to memory 730 and crossbar array 410, 440 or 480. Register 750 is coupled to memory 730 and crossbar array 410, 440 or 480.

Processor 720 may be a processor, microprocessor, controller, microcontroller, field programmable gate array (FPGA), etc., that implements a set of instructions that controls the data flow and the operation of ANN accelerator 700. For example, processor 720 may implement load/store (L/S) instructions, memory mapped I/O (MMIO), direct memory access (DMA), etc., to process and load elements of the input vector and associated data into register 740, start the scatter add operation, read back the elements from register 750, etc. Generally, processor 720 includes one or more instruction decoders; in many embodiments, processor 720 includes an instruction decoder configured to control processing circuitry to perform the scatter accumulate instruction, and a crossbar array is not needed.

Generally, register 740 simultaneously provides input and associated data elements to each row of crossbar array 410, 440 or 480 (e.g., ic values, x values, etc.), and register 750 stores output data elements from the scatter add operation (e.g., y values, etc.).

Figure 11:
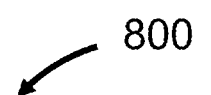
FIG. 11 depicts a flow diagram representing functionality associated with multiplying matrices, in accordance with embodiments of the present disclosure.
Figure 11:
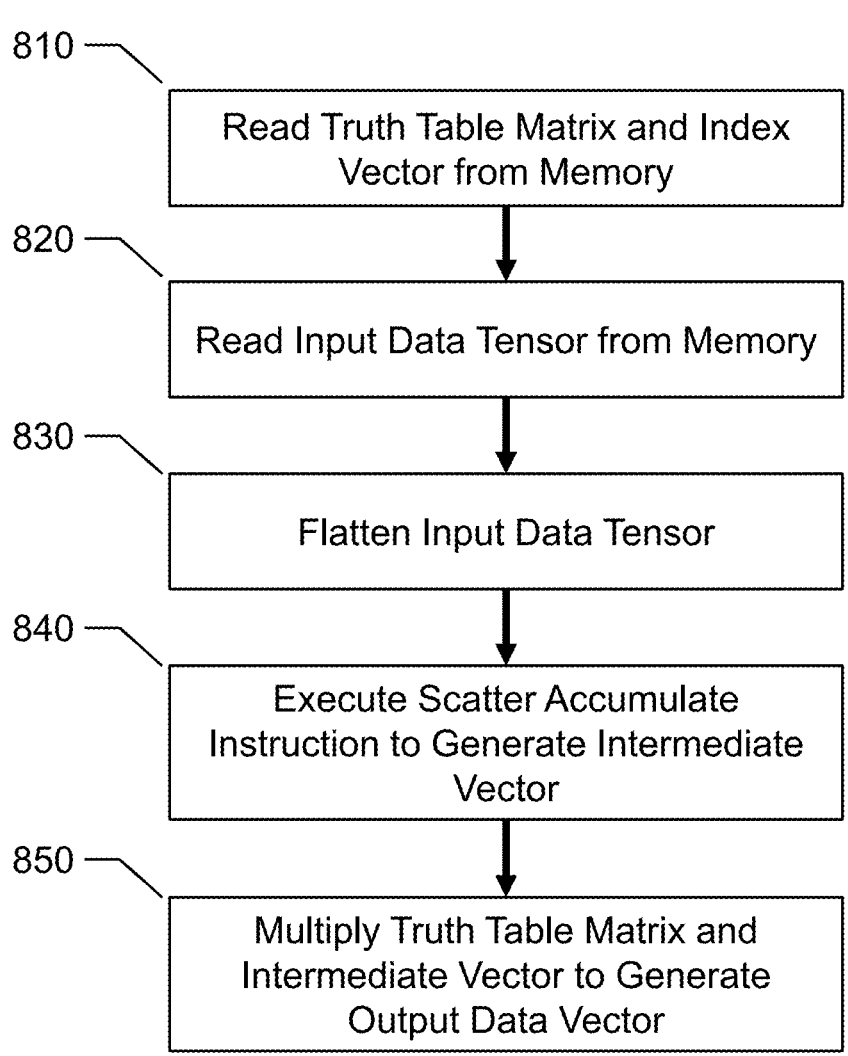

FIG. 11 depicts flow diagram 800 representing functionality associated with multiplying matrices, in accordance with embodiments of the present disclosure.

In many embodiments, the functionality at blocks 810, 820, 830, 840 and 850 is performed by a processor, such as, for example, processor 620, processor 720, etc. In certain embodiments, the functionality at blocks 810, 820, 830 and 850 is performed by a processor, such as, for example, processor 620, processor 720, etc., and the functionality at block 840 is performed by crossbar array 410, 440 or 480.

At 810, a truth table matrix and an index vector are read from memory. The truth table matrix and the index vector are generated based on a flattened weight matrix formed from a weight tensor having a weight matrix for each input channel, as described above. Each weight tensor forms one row of the flattened weight matrix.

At 820, an input data tensor is read from memory. The input data tensor has an input data matrix for each input channel.

At 830, at least a portion of the input data tensor is flattened into an input data vector, as described above.

At 840, a scatter accumulate instruction is executed on the index vector and the input data vector to generate an intermediate vector, as described above.

At 850, the truth table matrix and the intermediate vector are multiplied to generate an output data vector, as described above.

In certain embodiments, the functionality at blocks 810, 820 and 830 may be performed by a server processor and the functionality at blocks 840 and 850 may be performed by processor 620. In these embodiments, the server sends the index vector and the input data vector to system 100 via network 662; system 100 may be an edge or mobile device, such as, for example, a smart phone, tablet, etc.

The embodiments described herein are combinable.

In one embodiment, a system includes a processor configured to read, from a memory, a truth table matrix and an index vector, where the truth table matrix and the index vector are generated based on a flattened weight matrix formed from a weight tensor having a weight matrix for each input channel, and where each weight tensor forms one row of the flattened weight matrix; read, from the memory, an input data tensor having an input data matrix for each input channel; flatten at least a portion of the input data tensor into an input data vector; execute a scatter accumulate instruction on the index vector and the input data vector to generate an intermediate vector; and multiply the truth table matrix and the intermediate vector to generate an output data vector.

In another embodiment of the system, each weight has a value of 1 or −1; each truth table element has a value of 1 or −1; each row of the truth table matrix has a different sequence of values; and a first half of the truth table matrix is symmetric with respect to a second half of the truth table matrix.

In another embodiment of the system, the flattened weight matrix has M rows, the truth table matrix has M rows and 2 columns, and the output data vector has M rows.

In another embodiment of the system, the index vector is generated by generating a one-hot column matrix based on the flattened weight matrix, the one-hot column matrix having $2^M$ rows and a plurality of columns, each column including one element having a value of 1 and the remaining elements having a value of 0; and generating the index vector based on the elements of the one-hot column matrix having a value of 1.

In another embodiment of the system, each element of the index vector has a value that is equal to a row index of the element that has a value of 1 within a corresponding column of the one-hot column matrix.

In another embodiment, the system further includes an ANN accelerator including a processor configured to execute the scatter accumulate instruction.

In another embodiment, the system further includes an ANN accelerator including a crossbar array configured to execute the scatter accumulate instruction, where the crossbar array includes a plurality of rows, a plurality of columns, a plurality of intersections, and an accumulator for each column.

In another embodiment of the system, the crossbar array includes a conditional adder or a programmable impedance node at each intersection; or a programmable impedance node at each intersection, a plurality of blocks for each column, and an adder for each block.

In one embodiment, a method includes reading, from a memory, a truth table matrix and an index vector, where the truth table matrix and the index vector are generated based on a flattened weight matrix formed from a weight tensor having a weight matrix for each input channel, and where each weight tensor forms one row of the flattened weight matrix; reading, from the memory, an input data tensor having an input data matrix for each input channel; flattening at least a portion of the input data tensor into an input data vector; executing a scatter accumulate instruction on the index vector and the input data vector to generate an intermediate vector; and multiplying the truth table matrix and the intermediate vector to generate an output data vector.

In another embodiment of the method, each weight has a value of 1 or −1; each truth table element has a value of 1 or −1; each row of the truth table matrix has a different sequence of values; and a first half of the truth table matrix is symmetric with respect to a second half of the truth table matrix.

In another embodiment of the method, the flattened weight matrix has M rows, the truth table matrix has M rows and $2^N$ columns, and the output data vector has M rows.

In another embodiment of the method, generating a one-hot column matrix based on the flattened weight matrix, the one-hot column matrix having $2^M$ rows and a plurality of columns, each column including one element having a value of 1 and the remaining elements having a value of 0; and generating the index vector based on the elements of the one-hot column matrix having a value of 1.

In another embodiment of the method, each element of the index vector has a value that is equal to a row index of the element that has a value of 1 within a corresponding column of the one-hot column matrix.

In another embodiment of the method, the scatter accumulate instruction is executed by an ANN processor or an ANN accelerator crossbar array that includes a plurality of rows, a plurality of columns, a plurality of intersections, and an accumulator for each column.

In another embodiment of the method, a conditional adder or a programmable impedance node at each intersection; or a programmable impedance node at each intersection, a plurality of blocks for each column, and an adder for each block.

In one embodiment, an apparatus includes an instruction decoder configured to decode instructions; and processing circuitry configured to perform data processing in response to instructions decoded by the instruction decoder, where, in response to a scatter accumulate instruction, the instruction decoder is configured to control the processing circuitry to perform a scatter accumulate operation on an index vector and an input vector to generate an intermediate vector.

In another embodiment of the apparatus, the processing circuitry includes a first register configured to store the input vector, a second register configured to store the index vector, and a third register configured to store the intermediate vector; and the scatter accumulate operation includes adding the input vector stored in the first register into the third register based on the index vector stored in the second register.

In another embodiment of the apparatus, in response to the scatter accumulate instruction, the instruction decoder is further configured to control the processing circuitry to perform first and second scatter accumulate operations on first and second index vectors and first and second input vectors to generate first and second intermediate vectors, respectively.

In another embodiment of the apparatus, the processing circuitry includes a first register configured to store the first input vector or the second input vector, a second register having a first portion configured to store the first index vector and a second portion configured to store the second index vector, and a third register configured to store the first intermediate vector or the second intermediate vector; the first scatter accumulate operation includes adding the first input vector stored in the first register into the third register based on the first index vector stored in the first portion of the second register; and the second scatter accumulate operation includes adding the second input vector stored in the first register into the third register based on the second index vector stored in the second portion of the second register.

In another embodiment of the apparatus, the index vector is generated based on a flattened weight matrix formed from a weight tensor having a weight matrix for each input channel; each weight tensor forms one row of the flattened weight matrix; the input vector is formed by flattening at least a portion of an input data tensor; and the input data tensor has an input data matrix for each input channel.

While implementations of the disclosure are susceptible to embodiment in many different forms, there is shown in the drawings and will herein be described in detail specific embodiments, with the understanding that the present disclosure is to be considered as an example of the principles of the disclosure and not intended to limit the disclosure to the specific embodiments shown and described. In the description above, like reference numerals may be used to describe the same, similar or corresponding parts in the several views of the drawings.

In this document, relational terms such as first and second, top and bottom, and the like may be used solely to distinguish one entity or action from another entity or action without necessarily requiring or implying any actual such relationship or order between such entities or actions. The terms "comprises," "comprising," "includes," "including," "has," "having," or any other variations thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference throughout this document to "one embodiment," "certain embodiments," "an embodiment," "implementation(s)," "aspect(s)," or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth. References to items in the singular should be understood to include items in the plural, and vice versa, unless explicitly stated otherwise or clear from the text.

Recitation of ranges of values herein are not intended to be limiting, referring instead individually to any and all values falling within the range, unless otherwise indicated, and each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," "for example," or the like) provided herein, is intended merely to better illuminate the embodiments and does not pose a limitation on the scope of the embodiments. No language in the specification should be construed as indicating any unclaimed element as essential to the practice of the embodiments.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

In the following description, it is understood that terms such as "first," "second," "top," "bottom," "up," "down," "above," "below," and the like, are words of convenience and are not to be construed as limiting terms. Also, the terms apparatus, device, system, etc. may be used interchangeably in this text.

The many features and advantages of the disclosure are apparent from the detailed specification, and, thus, it is intended by the appended claims to cover all such features and advantages of the disclosure which fall within the scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A system, comprising:
an artificial neural network (ANN) accelerator including a crossbar array and a processor,
where the processor is coupled to the crossbar array and is configured to:
    read, from a memory, a truth table matrix and an index vector, where the truth table matrix and the index vector are generated based on a flattened weight matrix formed from a weight tensor having a weight matrix for each input channel, and where the weight tensor forms one row of the flattened weight matrix;
    read, from the memory, an input data tensor having an input data matrix for each input channel;
    flatten at least a portion of the input data tensor into an input data vector;
    control the crossbar array to execute a scatter accumulate instruction on the index vector and the input data vector to generate an intermediate vector; and
    multiply the truth table matrix and the intermediate vector to generate an output data vector,
where the crossbar array includes a plurality of rows, a plurality of columns, a plurality of intersections, and an accumulator for each column, and the crossbar array is configured to execute the scatter accumulate instruction.

2. The system according to claim 1, where:
each weight has a value of 1 or −1;
each truth table element has a value of 1 or −1;
each row of the truth table matrix has a different sequence of values; and
a first half of the truth table matrix is symmetric with respect to a second half of the truth table matrix.

3. The system according to claim 2, where the flattened weight matrix has M rows, the truth table matrix has M rows and $2^M$ columns, and the output data vector has M rows.

4. The system according to claim 3, where the index vector is generated by:
generating a one-hot column matrix based on the flattened weight matrix, the one-hot column matrix having $2^M$ rows and a plurality of columns, each column including one element having a value of 1 and the remaining elements having a value of 0; and
generating the index vector based on the elements of the one-hot column matrix having a value of 1.

5. The system according to claim 4, where each element of the index vector has a value that is equal to a row index of the element that has a value of 1 within a corresponding column of the one-hot column matrix.

6. The system according to claim 1, where the crossbar array includes:

a conditional adder or a programmable impedance node at each intersection; or a programmable impedance node at each intersection, a plurality of blocks for each column, and an adder for each block.

7. A method, comprising:

reading, from a memory, a truth table matrix and an index vector, where the truth table matrix and the index vector are generated based on a flattened weight matrix formed from a weight tensor having a weight matrix for each input channel, and where the weight tensor forms one row of the flattened weight matrix;

reading, from the memory, an input data tensor having an input data matrix for each input channel;

flattening at least a portion of the input data tensor into an input data vector;

executing a scatter accumulate instruction on the index vector and the input data vector to generate an intermediate vector by a crossbar array coupled to a processor, the crossbar array including a plurality of rows, a plurality of columns, a plurality of intersections, and an accumulator for each column; and multiplying the truth table matrix and the intermediate vector to generate an output data vector, where the crossbar array is a crossbar array of an artificial neural network (ANN) accelerator.

8. The method according to claim 7, where:

each weight has a value of 1 or −1;

each truth table element has a value of 1 or −1;

each row of the truth table matrix has a different sequence of values; and a first half of the truth table matrix is symmetric with respect to a second half of the truth table matrix.

9. The method according to claim 8, where the flattened weight matrix has M rows, the truth table matrix has M rows and $2^M$ columns, and the output data vector has M rows.

10. The method according to claim 9, where the index vector is generated by:

generating a one-hot column matrix based on the flattened weight matrix, the one-hot column matrix having $2^M$ rows and a plurality of columns, each column including one element having a value of 1 and the remaining elements having a value of 0; and generating the index vector based on the elements of the one-hot column matrix having a value of 1.

11. The method according to claim 10, where each element of the index vector has a value that is equal to a row index of the element that has a value of 1 within a corresponding column of the one-hot column matrix.

12. The method according to claim 7, where the ANN accelerator crossbar array includes:

a conditional adder or a programmable impedance node at each intersection; or a programmable impedance node at each intersection, a plurality of blocks for each column, and an adder for each block.

13. An apparatus, comprising:

a crossbar array coupled to the processing circuitry and including a plurality of rows, a plurality of columns, a plurality of intersections, and an accumulator for each column;

an instruction decoder configured to decode instructions; and processing circuitry configured to perform data processing in response to instructions decoded by the instruction decoder, where, in response to a first scatter accumulate instruction, the instruction decoder is configured to control the crossbar array to perform a first scatter accumulate operation on an index vector and an input vector to generate an intermediate vector, where the index vector is generated based on a flattened weight matrix formed from a weight tensor having a weight matrix for each input channel; the weight tensor forms one row of the flattened weight matrix; the input vector is formed by flattening at least a portion of an input data tensor; and the input data tensor has an input data matrix for each input channel, and where the crossbar array is a crossbar array of an artificial neural network (ANN) accelerator.

14. The apparatus according to claim 13, further comprising:

a first register configured to store the input vector;

a second register configured to store the index vector; and a third register configured to store the intermediate vector, where the first scatter accumulate operation includes adding the input vector stored in the first register into the third register based on the index vector stored in the second register.

15. The apparatus according to claim 13, where, in response to a second scatter accumulate instruction, the instruction decoder is further configured to control the processing circuitry to perform the second scatter accumulate operation on a second index vector and a second input vector to generate a second intermediate vectors.

16. The apparatus according to claim 15, further comprising:

a first register configured to store the first input vector and the second input vector, a second register having a first portion configured to store the first index vector and a second portion configured to store the second index vector, and a third register configured to store the first intermediate vector or the second intermediate vector, where the first scatter accumulate operation includes adding the first input vector stored in the first register into the third register based on the first index vector stored in the first portion of the second register, and the second scatter accumulate operation includes adding the second input vector stored in the first register into the third register based on the second index vector stored in the second portion of the second register.

* * * * *